US012320908B2

(12) United States Patent
Ainapure et al.

(10) Patent No.: US 12,320,908 B2
(45) Date of Patent: Jun. 3, 2025

(54) LOCATION SYSTEM CONGESTION MANAGEMENT

(71) Applicant: SIGNIFY HOLDING B.V., Eindhoven (NL)

(72) Inventors: Ameya Ainapure, Atlanta, GA (US); Bruce Andrew Carl Douglas, Fayetteville, GA (US); Peyton Riley, Suwanee, GA (US); Paul Dunn, Austell, GA (US); Leonardo Matute, Atlanta, GA (US)

(73) Assignee: SIGNIFY HOLDING B.V., Eindhoven (NL)

(*) Notice: Subject to any disclaimer, the term of this patent is extended or adjusted under 35 U.S.C. 154(b) by 385 days.

(21) Appl. No.: 17/610,542

(22) PCT Filed: May 13, 2020

(86) PCT No.: PCT/EP2020/063258
§ 371 (c)(1),
(2) Date: Nov. 11, 2021

(87) PCT Pub. No.: WO2020/229505
PCT Pub. Date: Nov. 19, 2020

(65) Prior Publication Data
US 2022/0299591 A1    Sep. 22, 2022

Related U.S. Application Data

(60) Provisional application No. 62/849,718, filed on May 17, 2019, provisional application No. 62/849,047, (Continued)

(51) Int. Cl.
*G01S 5/02* (2010.01)
*G01S 5/00* (2006.01)
(Continued)

(52) U.S. Cl.
CPC .......... *G01S 5/0252* (2013.01); *G01S 5/0009* (2013.01); *G01S 5/02216* (2020.05); *H04B 17/318* (2015.01); *H04W 4/80* (2018.02)

(58) Field of Classification Search
CPC ................................ G06Q 10/08; G01S 11/06
See application file for complete search history.

(56) References Cited

U.S. PATENT DOCUMENTS 10,360,421 B1    7/2019  Farrell
10,599,174 B2    3/2020  Baker et al.
(Continued)

FOREIGN PATENT DOCUMENTS

WO    2015162295 A1    10/2015
WO    2018024522 A1    2/2018
WO    2018024527 A1    2/2018

*Primary Examiner* — Fabricio R Murillo Garcia

(57) ABSTRACT

Location-based systems, such as a Real-time Location System (RTLS), are used to locate and track assets such as equipment, people, etc. In order to accomplish high accuracy in determining locations of assets, the information sent to the location server from sensors should be accurate, relevant, sufficient, and timely. The limitations of a low bandwidth network between the sensors and the location server may pose challenges to reliably determining locations of assets. This invention is related to a hybrid lighting and location system, which involves the use of a system control device and lighting devices that may include integrated sensors, transceivers, etc. Different embodiments are disclosed on apparatus, methods and systems to resolve the potential network congestion in such a hybrid system.

3 Claims, 29 Drawing Sheets

Related U.S. Application Data filed on May 16, 2019, provisional application No. 62/849,049, filed on May 16, 2019.

(51) Int. Cl.
*H04B 17/318* (2015.01)
*H04W 4/80* (2018.01)

(56) References Cited

U.S. PATENT DOCUMENTS

| | | | |
|---|---|---|---|
| 2016/0150537 A1* | 5/2016 | Jung | H04W 8/005 |
| | | | 455/452.1 |
| 2018/0059635 A1* | 3/2018 | Johnson | G06K 7/1417 |
| 2018/0260402 A1* | 9/2018 | Choi | G06F 16/955 |
| 2018/0324739 A1* | 11/2018 | Feil | H04W 64/00 |
| 2019/0020414 A1* | 1/2019 | Jiang | H04W 48/12 |
| 2019/0037672 A1* | 1/2019 | Peitz | H05B 47/19 |

* cited by examiner

LOCATION SYSTEM CONGESTION MANAGEMENT

CROSS-REFERENCE TO PRIOR APPLICATIONS

This application is the U.S. National Phase application under 35 U.S.C. § 371 of International Application No. PCT/EP2020/063258, filed on May 13, 2020, which claims the benefit of U.S. Provisional Application Ser. No. 62/849,718, filed on May 17, 2019, U.S. Provisional Application Ser. No. 62/849,049, filed on May 16, 2019, and U.S. Provisional Application Ser. No. 62/849,047, filed on May 16, 2019. These applications are hereby incorporated by reference herein.

TECHNICAL FIELD

The present disclosure relates generally to lighting and location-based systems, and more particularly to managing network congestion of location systems.

BACKGROUND

Location-based systems, such as a Real-time Location System (RTLS), are used to locate and track assets such as equipment, people, etc. For example, an asset tag attached to an asset (e.g., a laptop) may transmit a beacon signal, and sensors located at fixed locations may receive the beacon signal. Individual sensors may determine a signal strength of the beacon signal at reception and transmit the signal strength information to a location processor. The location processor may receive signal strength information from the sensors and determine the location of the asset.

In order to accomplish high accuracy in determining locations of assets, the information sent to the location processor from sensors should be accurate, relevant, sufficient, and timely. The limitations of a low bandwidth network between the sensors and the location server may pose challenges to reliably determining locations of assets. For example, an asset tag may transmit beacon signals to sensors at a much higher rate than the rate at which the sensors transmit signal strength and other information to the location server. Network congestions that result from some of the limitations of a low bandwidth network may make location information from the location server less reliable. Thus, solutions that enable determining locations of assets more reliably may be desirable.

BRIEF DESCRIPTION OF THE FIGURES

Reference will now be made to the accompanying drawings, which are not necessarily drawn to scale, and wherein.

Figure 1:
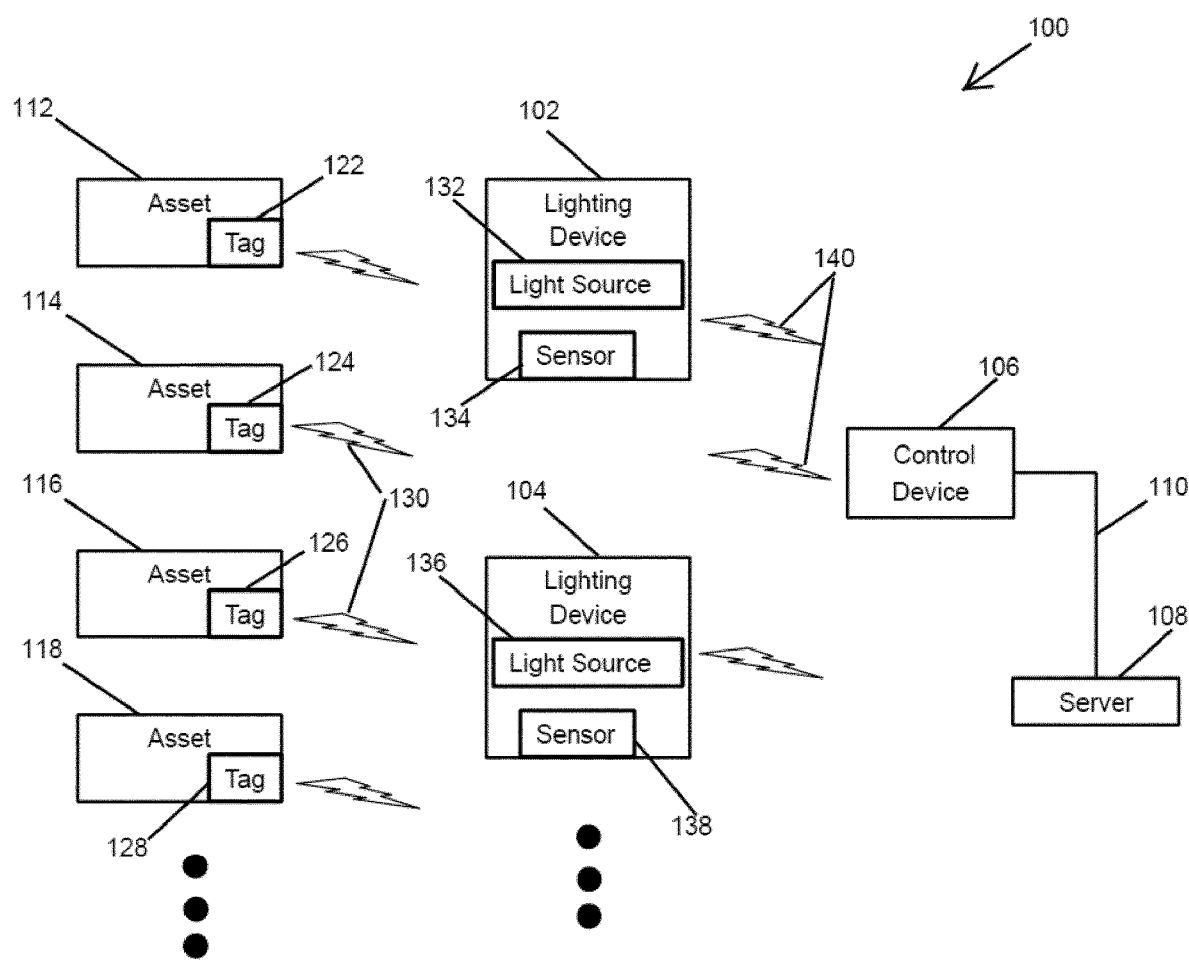
FIG. 1 illustrates a lighting and location system according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different figures designate like or corresponding but not necessarily identical elements.

DETAILED DESCRIPTION OF THE EXAMPLE EMBODIMENTS

In the following paragraphs, example embodiments will be described in further detail with reference to the figures. In the description, well-known components, methods, and/or processing techniques are omitted or briefly described. Furthermore, reference to various feature(s) of the embodiments is not to suggest that all embodiments must include the referenced feature(s).

Turning now to the figures, particular example embodiments are described. FIG. 1 illustrates a lighting and location system 100 according to an example embodiment. In some example embodiments, the lighting and location system 100 may be a real time location system that allows locations of assets/asset tags to be determined in "real time." As used throughout this specification, "real time" refers to a user's perspective of the system, and the time (e.g., a few milliseconds to a few seconds) between the time of transmission of relevant beacon signals and determining of the location of an asset/asset tag based on information related to one or more of the beacon signals is considered as "real time." For example, the lighting and location system 100 may include an RTLS and a lighting control system that both involve the use of a system control device and lighting devices that may include integrated sensors, transceivers, etc.

In some example embodiments, the system 100 includes lighting devices 102, 104, a control device 106, and assets 112-118. The system 100 may also include a server 108 that may be communicably coupled to the control device 106 via a connection 110. For example, the connection 110 may represent one or more electrical cables, a local area network, the internet, etc. To illustrate, the server 108 may be a local server or a remote server (e.g., a cloud server). The control device 106 can also be referred to as a wireless access control device.

In some example embodiments, the lighting device 102 may include a light source 132 and a sensor 134, and the lighting device 104 may include a light source 136 and a sensor 138. For example, the light source 132, 136 may each include a light emitting diode (LED) light source and/or another type of light source that can emit an illumination light. The lighting devices 102, 104 may be lighting fixtures or another type of lighting device.

In some example embodiments, each asset 112-118 may be a person or an object, such as a computer, a medical device, a package, etc. The assets 112-118 may have or include an asset tag 122-128, respectively. For example, the asset tags 122-128 may each be attached to a respective one of the assets 112-118. Each asset tag 122-128 may include a transmitter to transmit wireless signals such as beacon signals that include identification (ID) information of the asset 112-118 and/or of the asset tag 122-128. For example, the asset tags 122-128 may transmit beacon signals, such as beacon signals 130, that may be compliant with a wireless standard, such as IEEE 802.15.1 (Bluetooth Low Energy (BLE)), etc.

In some example embodiments, the lighting devices 102, 104 may communicate with the control device 106 via wireless signals, such as wireless signals 140, that may be compliant with a wireless standard, such as IEEE 802.15.1 (ZigBee), etc. For example, the lighting devices 102, 104 may transmit to the control device 106 information obtained from or generated based on the beacon signals transmitted by the asset tags 122-128. The control device 106 may include a receiver to receive the information from the lighting devices 102, 104 and may process the information to compute/determine the location of the assets 122-128. Alternatively, the control device 106 may receive the information from the lighting devices 102, 104 and pass the information to the server 108 that may compute/determine the location of the assets 122-128.

In some example embodiments, the lighting devices 102, 104 may transmit to the control device 106 information related to lighting, such as status information, dim level, etc. The lighting devices 102, 104 may also receive commands, information, etc. transmitted by the control device 106. For example, the control device 106 may include a transmitter to transmit lighting control commands (e.g., on, off, dim level, etc.), time information, etc. via the wireless signals such as the wireless signals 140.

In some example embodiments, the lighting device 102 may wirelessly receive beacon signals (e.g., BLE beacon signals) transmitted by one or more of the asset tags 122-128 and process the received beacon signals. For example, the sensor 134 of the lighting device 102 may include a wireless receiver that can receive beacon signals. To illustrate, the lighting device 102 may receive the beacon signals via the sensor 134, and a processor of the lighting device 102 may process the received beacon signals. For example, the processor of the lighting device 102 may extract ID information from the beacon signals and determine signal strengths (e.g., receive signal strength indicator (RSSI) values) of the beacon signals. The lighting device 102 may transmit ID information and the signal strength information to the control device 106 via the wireless signals (e.g., ZigBee signals).

In some example embodiments, the lighting device 102 may process the beacon signals received from the asset tags 122-128 and determine whether to transmit information related to some or all of the beacon signals to the control device 106. For example, the lighting device 102 may determine whether respective ID information of received beacon signals is valid and transmit to the control device 106 information related to beacon signals that have valid ID information. If the ID information of a beacon signal is not valid (e.g., does not match ID of an asset or asset tag known to the lighting device 102), the lighting device 102 may not perform further processing of the beacon signal.

Alternatively or in addition, the lighting devices 102 may transmit information related to beacon signals that have a signal strength that is equal to or above a threshold signal strength and may drop/discard (e.g., not transmit) information related to beacon signals that have a signal strength below the threshold signal strength. Alternatively or in addition, the lighting device 102 may select one beacon signal (i.e., a representative beacon signal) from among one or more beacon signals received from a particular asset tag (e.g., the asset tag 122) within a time window (e.g., 3 seconds) and transmit to the control device 106 information related to the representative beacon signal and drop/discard information related to other beacons signals received within the time window from the particular asset tag (e.g., the asset tag 122). For example, the lighting device 102 may select a representative beacon signal based on one or more criteria such as signal strengths (e.g., RSSI values), last arriving within the time window, etc.

In some example embodiments, the lighting device 102 may prioritize information related to beacon signals received from the asset tags 122-128 and transmit information related to some of the asset tags and drop/discard information related to the remaining asset tags. To illustrate, the lighting device 102 may perform a prioritization operation after having selected/identified a representative beacon signal from each asset tag 122-128 that transmitted one or more beacon signals within a time window. The lighting device 102 may prioritize the representative beacon signals based on signal strengths (e.g., RSSI values) or other criteria. The lighting device 104 may operate in a similar manner as described with respect to the lighting device 102.

In some example embodiments, the lighting devices 102, 104 may transmit to the control device 106 a time stamp along with information related to beacon signals. For example, the time stamp may indicate the time of the transmission of information related to one or more beacons signals that are received within a time window. The times of transmission by the lighting devices 102, 104 may be synchronized among the lighting devices 102, 104 and the control device 106 based on system time information transmitted by the control device 106, for example, periodically.

In some example embodiments, instead of or in addition to the time stamp described above, the lighting devices 102, 104 may transmit to the control device 106 time interval information along with other information related to beacon signals received by the lighting devices 102, 104. To illustrate, a time window (e.g., 3 seconds) within which some beacon signals are received by the lighting devices 102, 104 may have intervals (e.g., four intervals of 750 millisecond each). For example, the time interval information transmitted by the lighting device 102 with respect to a beacon signal may indicate the interval during which the particular beacon signal was received by the lighting device 102 within the time window.

By discarding (i.e., not transmitting) beacon signals that do not include valid ID information, by selecting a representative beacon signal for an asset tag within a time window and discarding other beacons from the asset tag received within the same time window, by prioritizing beacon signals and discarding information related to lower priority beacon signals, and by transmitting transmission time stamp and receive time interval information, the system 100 provides an efficient location system (e.g., RTLS) performance.

In some example embodiments, the system 100 may include more than two lighting devices that operate as described with respect to the lighting devices 102, 104 without departing from the scope of this disclosure. In some example embodiments, the system 100 may include more assets than shown without departing from the scope of this disclosure. In some example embodiments, the lighting devices 102, 104 may include other components than shown without departing from the scope of this disclosure. In some example embodiments, the system may include other components that shown without departing from the scope of this disclosure. In some example embodiments, one or more of the assets 112-118 and the respective asset tag 122-128 may be a single device, such as a mobile phone, a table, a laptop, etc., where the asset tag is integrated in the asset.

Figure 2:
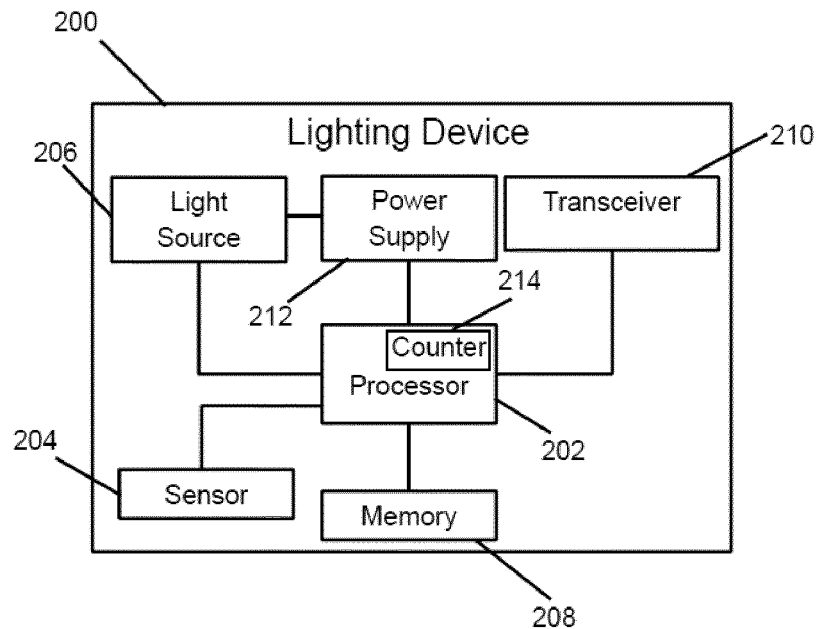
FIG. 2 illustrates a lighting device according to an example embodiment.

FIG. 2 illustrates a lighting device 200 according to an example embodiment. For example, the lighting devices of the lighting and location system 100 of FIG. 1 including the lighting devices 102, 104 may each correspond to the lighting device 200. In some example embodiments, the lighting device 200 may include a processor 202, a light source 206, a sensor 204, a transceiver 210, a memory device 208, and a power supply 212. Referring to FIGS. 1 and 2, the lighting device 200 may receive wireless beacon signals from the asset tags 122-128, and the lighting device 200 may communicate with the control device 106 using wireless signals.

In some example embodiments, the sensor 204 may include a receiver that can receive wireless beacon signals, such as the wireless beacon signals 130. For example, the sensors 134, 138 of the lighting devices 102, 104 shown in FIG. 1 may correspond to the sensor 204. To illustrate, the sensor 204 may receive BLE beacon signals or other beacon signals that include identification information of the transmitting asset tag or tags. In some example embodiments, the sensor 204 may receive beacon signals wirelessly and provide the beacon signals to the processor 202 without processing the contents of the beacon signals. Alternatively, the sensor 204 may process the beacon signals (e.g., extract ID information, determine signal strength, etc.) and provide information determined from the beacon signals to the processor 202.

In some example embodiments, the processor 202 may control operations of the lighting device 200. For example, the processor 202 may perform operations described above with respect to the lighting devices 102, 104. In general, the processor 202 may receive information from the sensor 204 and from the transceiver 114 and may perform operations based on the received information. For example, the processor 202 may control the light source 206 (e.g., LED light source), which may correspond to the light sources 132, 136 shown in FIG. 1, to control the illumination light provided by the light source 206. For example, the processor 202 may control the light source 206 based on received lighting commands, a timer, an occupancy sensor, etc. The processor 202 may also control transmissions of information by the transceiver 114. For example, the processor 202 may receive beacon signals from the asset tags 122-128 via the sensor, process the beacon signals, and transmit information related to at least some of the beacon signals to the control device 106. The processor 202 may control the transmission of time stamp and time interval information to the control device 106 via the transceiver 210.

In some example embodiments, the processor 202 may include one or more microcontrollers/microprocessors and other hardware and software components and may execute software code stored in the memory device 208 to perform operations described herein. For example, the processor 202 may execute software code stored in the memory device 208 to extract ID information from received beacon signals, to determine signal strength (e.g., RSSI value) of the received beacon signals, and control the light source, the processing of beacon signals, and the reception and transmission of information via the sensor 204 and the transceiver 210. For example, the processor 202 may include a hardware or software counter 214 to count time (e.g., in milliseconds), and the information from the counter 214 may be used to transmit time stamp and time interval information described above. The processor 202 may also use data stored in the memory device 208 in performing some of the information described herein. For example, the processor 202 may check whether ID information of a beacon signal is valid by checking the extracted ID information against a list of valid ID values stored in the memory device 208. To illustrate, the memory device 116 may include volatile and non-volatile memory components.

In some example embodiments, the transceiver 210 may include one or more receivers that can receive wireless signals and one or more transmitters that can transmit wireless signals. For example, the transceiver 210 may receive and transmit wireless signals that are compliant with one or more communication standards. To illustrate, the wireless signals received and transmitted by the transceiver 210 may be compliant with an IEEE 802.11 (Wi-Fi) standard, an IEEE 802.15.4 (ZigBee) standard, or another standard. In certain example embodiments, the wireless signals received and transmitted by the transceiver are one or more of a wireless personal area network technology capable of covering ranges from a few centimeters to a few meters.

In some example embodiments, the power supply 212 may provide power to the processor 202 and to other components of the lighting device 200. The processor 202 may control the power supply 212, for example, based on command/information received via the transceiver 210. For example, the processor 202 may control the power provided to the light source 206 by controlling the power supply 212. In some example embodiments, the light source 210 may provide an indicator light in addition to an illumination light to illuminate an area.

In some example embodiments, the lighting device 200 may include other components, different components, or a different configuration of components than shown without departing from the scope of this disclosure.

Figure 3:
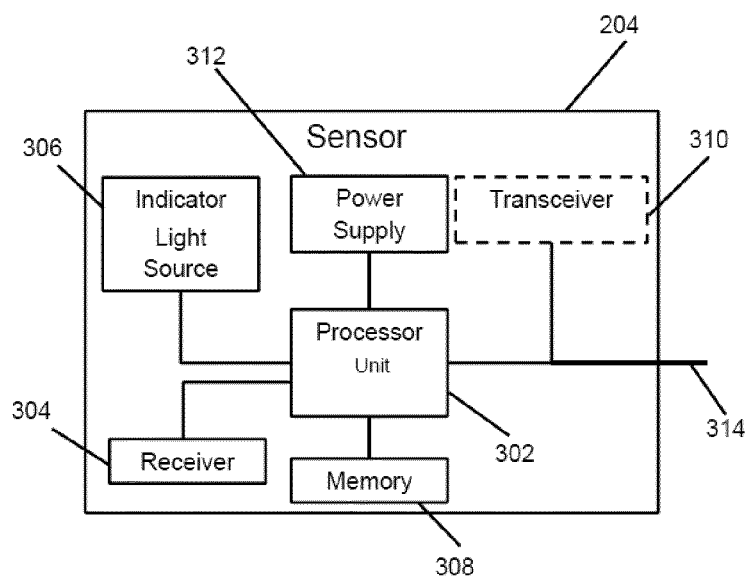
FIG. 3 illustrates a sensor of the lighting device of FIG. 2 according to another example embodiment.

FIG. 3 illustrates the sensor 204 of the lighting device 200 of FIG. 2 according to another example embodiment. In some example embodiments, the sensor 204 includes a processor unit 302, a receiver 304, an indicator light source 306, a memory device 308, and a power supply 312. For example, the processor unit 302 may include a microcontroller/microprocessor and other supporting components to process beacon signals received by the receiver 304 from the asset tags 122-128 shown in FIG. 1. The processor unit 302 may execute code stored in the memory device 308 to perform some operations, such as the processing of beacon signals. For example, the processor unit 304 may perform some of the operations described above with respect to the processor 202 of the lighting device 200 shown in FIG. 2. The processor 302 may communicate with the processor 202 via a connection 314. For example, the processor 302 may provide to the processor 202 information (e.g., ID information, signal strength, etc.) resulting from the processing of beacon signals via a connection 314, and the processor 202 may transmit the received information to the control device 106 via the transceiver 210. Alternatively, the processor unit 302 transmit the information to the control device 106 via the transceiver 310.

In some alternative embodiments, the receiver 304 may receive beacon signals and provide the beacon signals to the processor 202 without processing the signals to determine/extract ID information, check whether the ID information is valid, determine signal strength, etc. For example, the processor 202 may receive the signals and perform operations such as determine/extract ID information, etc.

In some example embodiments, the controller may control the indicator light source 306 to provide indicator light(s). For example, the indicator light(s) may convey status information, etc.

In some example embodiments, the power supply 312 may provide power that is appropriate for the components of the sensor 204. For example, the power supply 312 may be receive AC or DC power and generate power that is compatible with the processor unit 302, the receiver 304, etc.

In some alternative embodiments, one or more components of the sensor 204 may be omitted without departing from the scope of this disclosure. In some alternative embodiments, the processor unit 302 or the functions of the processor unit 302 may be integrated in the processor 202. For example, the sensor 304 may include the sensor 304 and other components and functions may be integrated in the processor 202. In some example embodiments, the sensor 204 may include other components. In some example embodiments, the sensor 204 may include a transceiver instead of or in addition to the receive 304 for two-way communication with the asset tags 122-128 or other devices using wireless signals (e.g., BLE).

Figure 4A:
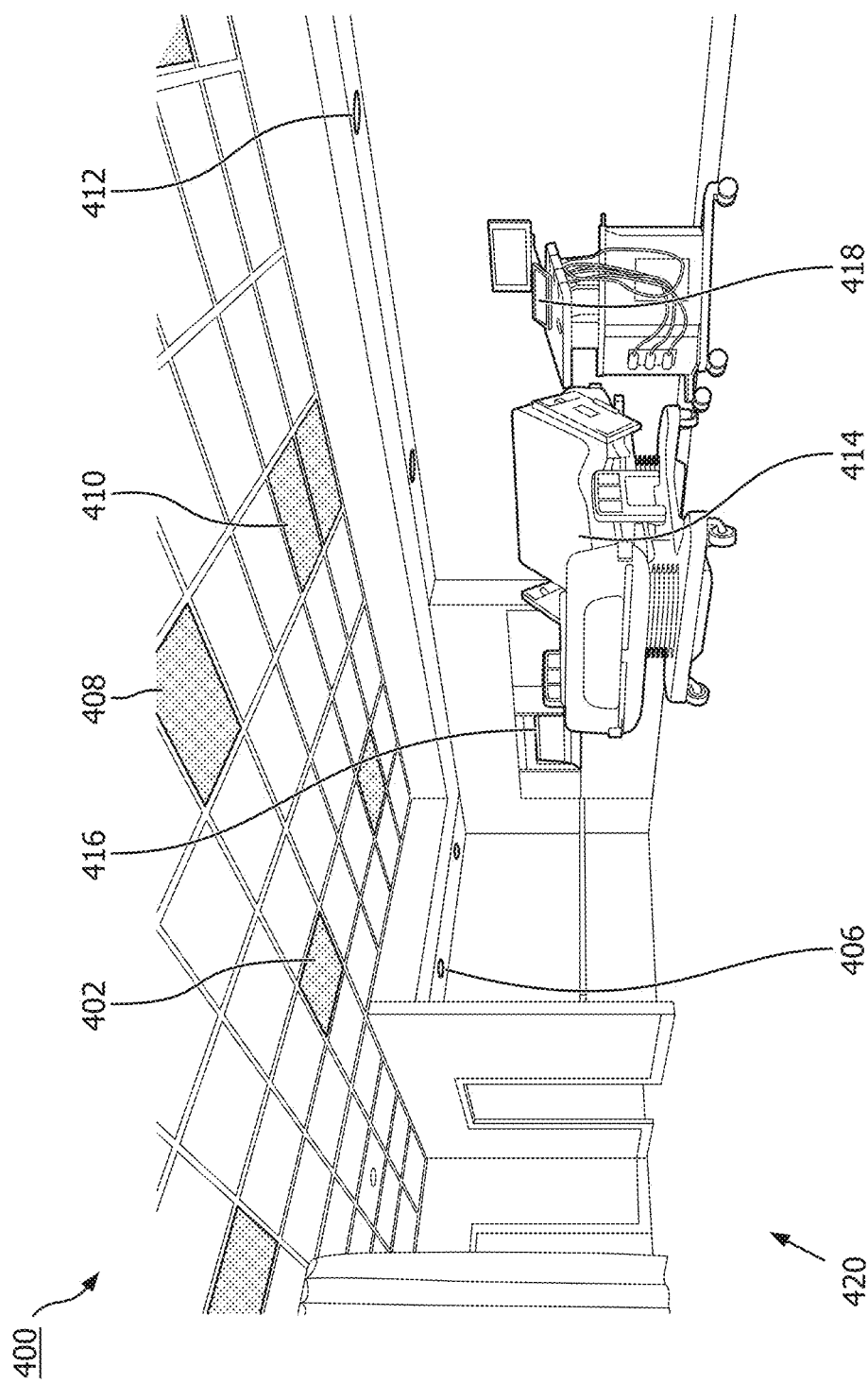
FIG. 4A illustrates a lighting and location system according to another example embodiment.

FIG. 4A illustrates a lighting and location system 400 according to another example embodiment. In some example embodiments, the lighting and location system 400 may be a real time location system that allows locations of assets/asset tags to be determined in "real time." Referring to FIGS. 1-4, in some example embodiments, the system 400 includes lighting fixtures 402-412 that are installed in an area 420. For example, the lighting fixtures 402-412 may each correspond to the lighting device 200 of FIG. 2. The area 420 may be a hospital room that includes trackable assets such as a portable bed 414, a monitor 416, and a cart 418. For example, each of the portable bed 414, the monitor 416, and the medical device 418 may include an integrated or external asset tag that transmits beacon signals that may be received by the lighting fixtures 402-412 in a similar manner as described above. For example, the asset tags of the portable bed 414, the monitor 416, and the cart 418 may transmit BLE beacon signals that may be received by the respective sensor of the lighting fixtures 402-412. The respective processor of the lighting fixtures 402-412 may process the beacon signals and transmit to a control device (e.g., the control device 106), using wireless signals (e.g., ZigBee compliant signals), information related to the beacon signals and optionally time stamp and time interval information.

The lighting fixtures 402-412 may include different types of lighting fixtures such as troffers, recessed fixtures, etc. Because the lighting fixtures 402-412 are distributed throughout the area 420, the locations of assets such as the portable bed 414, the monitor 416, and the cart 418 may be determined and tracked by the system 400, which may be an RTLS, while adequate illumination light is provided to the area 420 by the light sources of the lighting fixtures 402-412. In some alternative embodiments, the system 400 may include more or fewer lighting fixtures, assets, etc. than shown without departing from the scope of this disclosure.

Figure 5A:
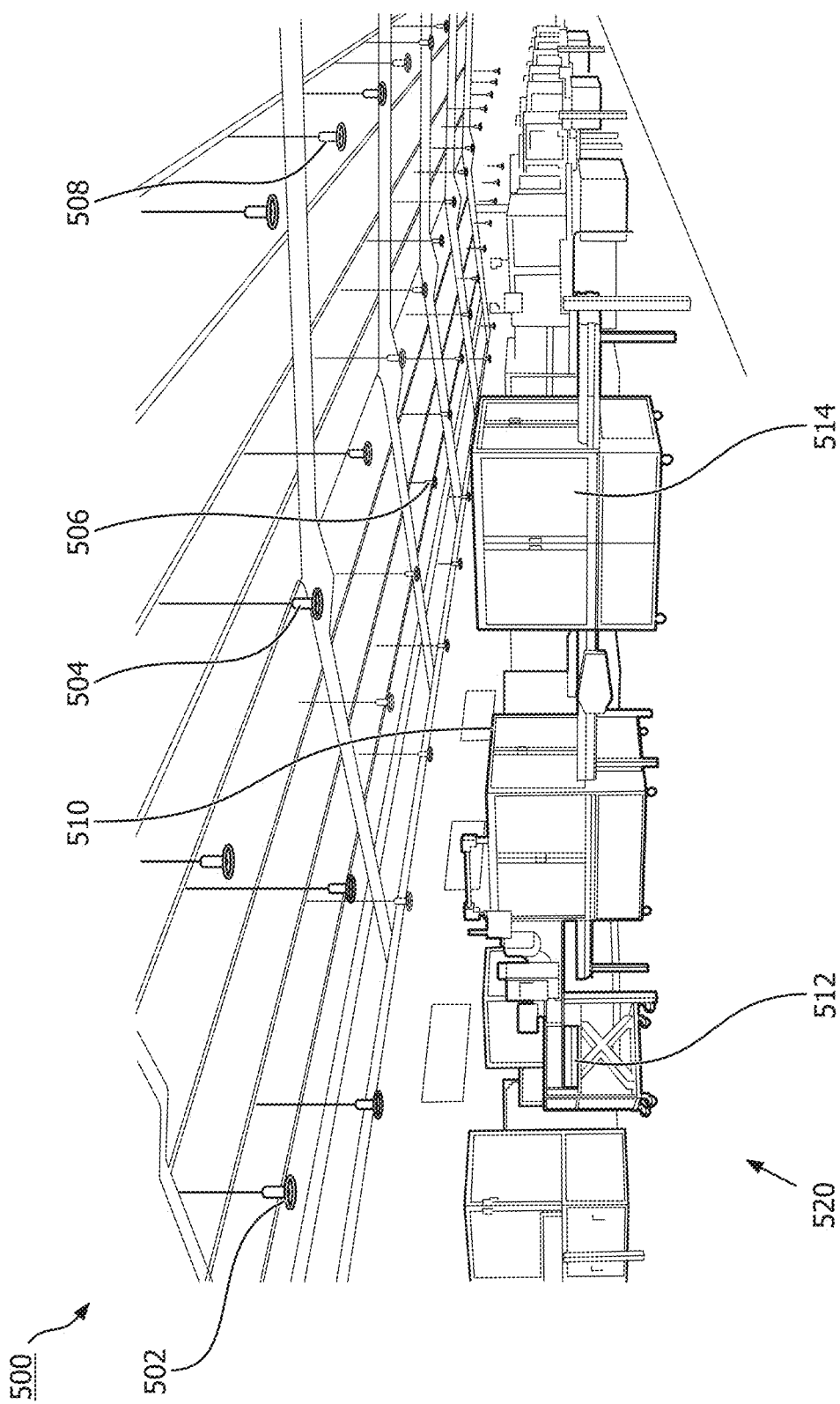
FIG. 5A illustrates a lighting and location system according to another example embodiment.

FIG. 5A illustrates a lighting and location system 500 according to another example embodiment. In some example embodiments, the lighting and location system 500 may be a real time location system that allows locations of assets/asset tags to be determined in "real time." Referring to FIGS. 1-3 and 5, in some example embodiments, the system 500 includes lighting fixtures 502-508 that are installed in an area 520. For example, the lighting fixtures 502-508 may each correspond to the lighting device 200 of FIG. 2. The area 520 may be a manufacturing facility that includes trackable assets such as units 510-514. For example, each of the units 510-514 may include an integrated or external asset tag that transmits beacon signals that may be received by the lighting fixtures 502-508 in a similar manner as described above. For example, the asset tags of the units 510-514 may transmit BLE beacon signals that may be received by the respective sensor of the lighting fixtures 502-508. The respective processor of the lighting fixtures 502-508 may process the beacon signals and transmit to a control device (e.g., the control device 106), using wireless signals (e.g., ZigBee compliant signals), information related to the beacon signals and optionally time stamp and time interval information.

The lighting fixtures 502-508 may include different types of lighting fixtures such as suspended fixtures, high bay fixtures, etc. Because the lighting fixtures 502-508 are distributed throughout the area 520, the locations of assets such as the units 510-514 may be determined and tracked by the system 500, which may be an RTLS, while adequate illumination light is provided to the area 520 by the light sources of the lighting fixtures 502-508. In some alternative embodiments, the system 500 may include more or fewer lighting fixtures, assets, etc. than shown without departing from the scope of this disclosure.

Figure 5B:
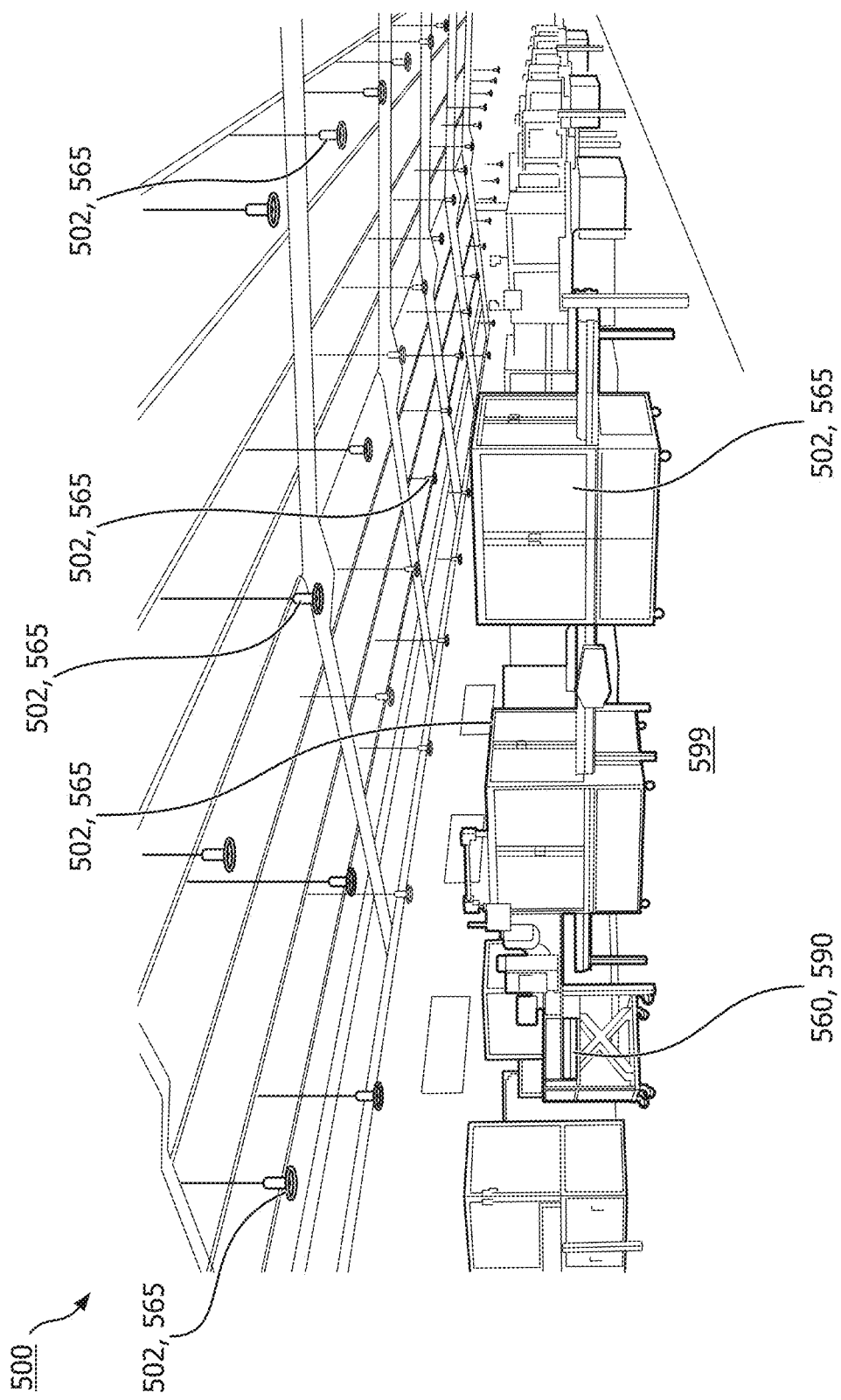
FIG. 5B illustrates a lighting and location system according to another example.
Figure 6:
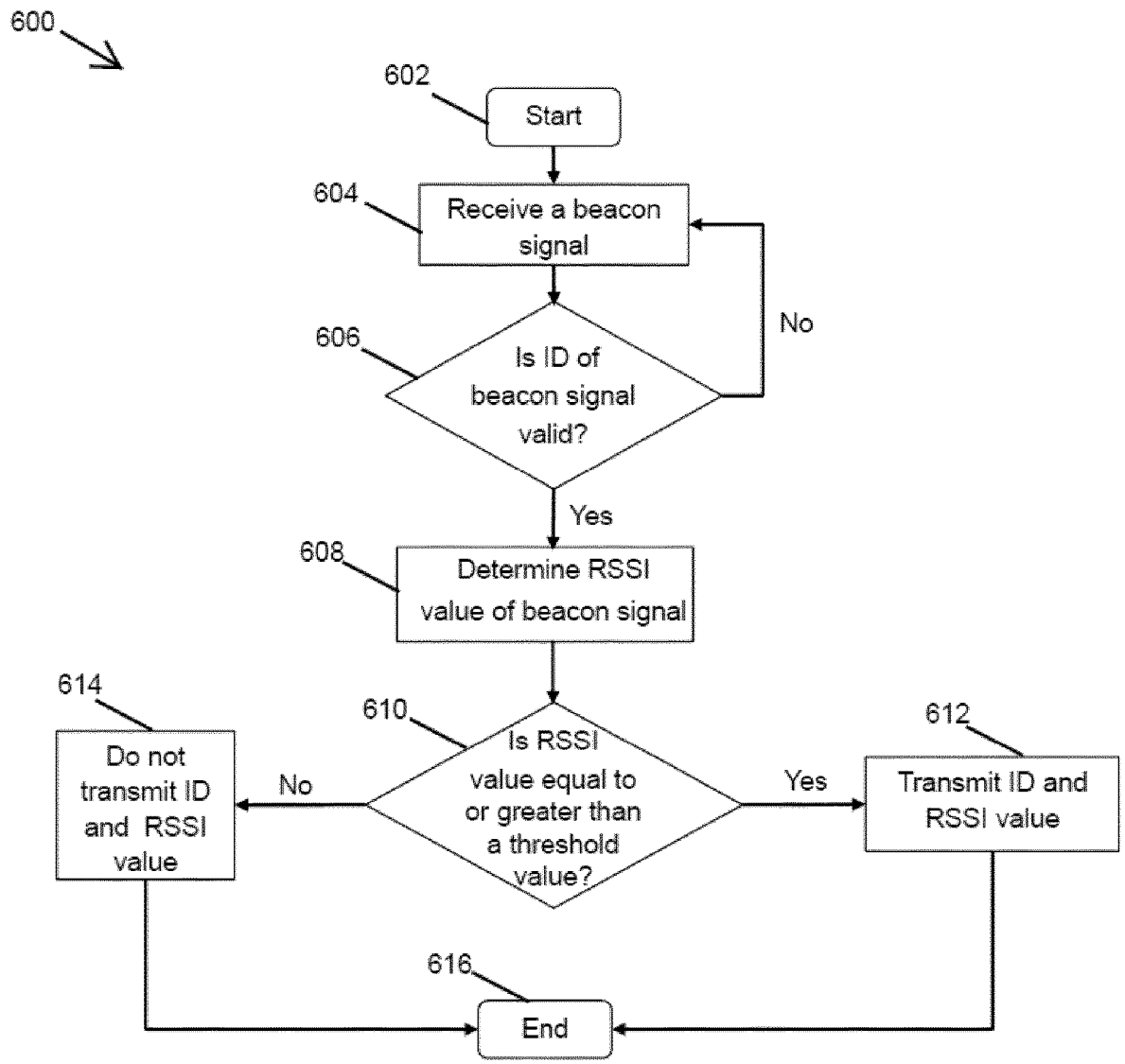
FIG. 6 illustrates a flowchart of a method of operating a lighting and location system based on identification information and signal strength information filtering of beacon signals according to an example embodiment.

FIG. 6 illustrates a flowchart of a method 600 of operating a lighting and location system based on identification information and signal strength information filtering of beacon signals according to an example embodiment. Referring to FIGS. 1-6, in some example embodiments, the method 600 starts at step 602 and continues to step 604, where a sensor of a lighting device (e.g., the sensor 204 of the lighting device 200) receives a beacon signal (e.g., a BLE beacon signal). At step 606, a processor of the lighting device (e.g., the processor 202 or the processor unit 302 of the lighting device 200) determines whether the ID information in the beacon signal is valid. For example, the processor may determine whether the ID information is valid by checking against a list of valid ID information. At step 608, the processor may determine the RSSI value (or other signal strength value) of the beacon signal. At step 610, the processor may determine whether the RSSI value is equal to or greater than a threshold value (e.g., −80 dBm). At step 612, the processor may transmit the ID information and the RSSI value if the processor determines that the RSSI value is equal to or greater than a threshold value. At step 614, the processor may discard/drop or otherwise not transmit the ID information and the RSSI value to the control device 106 if the processor determines that the RSSI value is less than the threshold value. At step 616, the method 600 ends. The method 600 may be repeated on other beacon signals and some operations may be performed simultaneously on or based on multiple beacon signals.

In some example embodiments, some of the steps of the method 600 may be performed in a different order than described above without departing from the scope of this disclosure. In some alternative embodiments, the method 600 may include more or fewer steps without departing from the scope of this disclosure.

Figure 7:
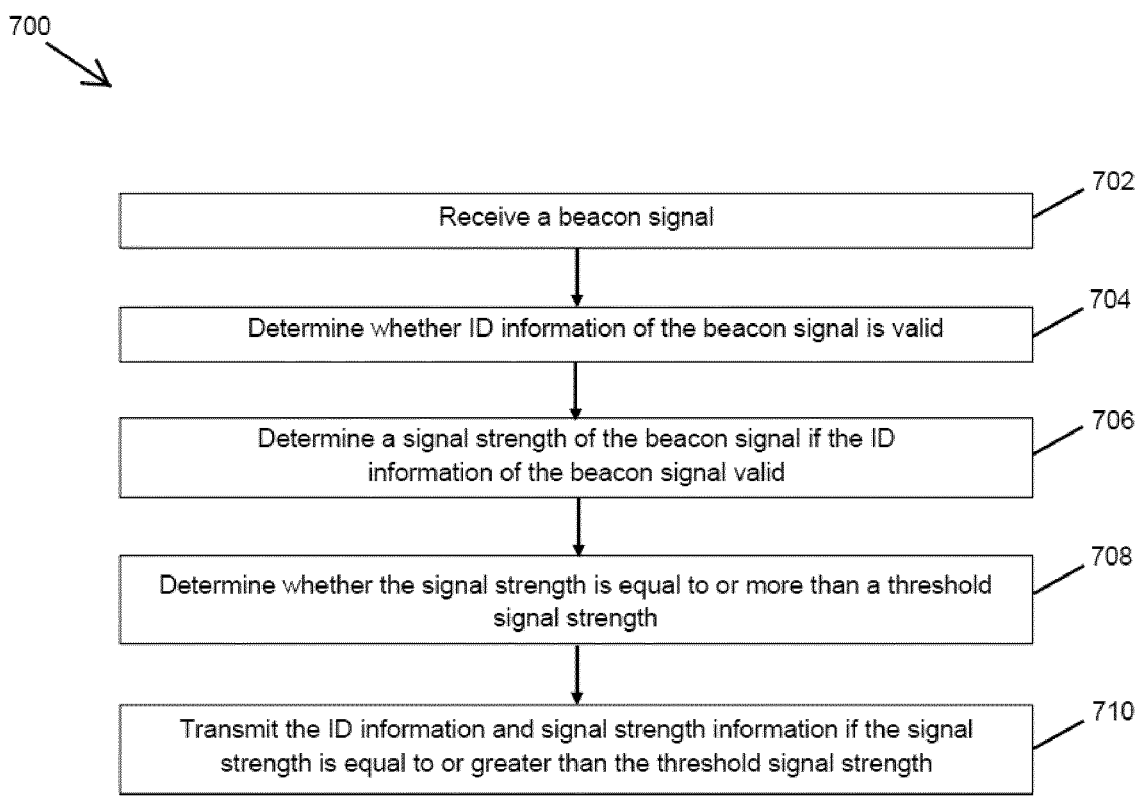
FIG. 7 illustrates a method of operating a lighting and location system based on identification information and signal strength information filtering of beacon signals according to an example embodiment.

FIG. 7 illustrates a method 700 of operating a lighting and location system based on identification information and signal strength information filtering of beacon signals according to an example embodiment. Referring to FIGS. 1-7, in some example embodiments, at step 702, the method 700 includes receiving a beacon signal (e.g., BLE beacon signal) by a sensor (e.g., the sensor 206) of a lighting device (e.g., the lighting device 200). At step 704, the method 700 includes determining, by a processor (e.g., the processor 202 or the processor 302) of the lighting device whether ID information of the beacon signal is valid. For example, the processor may obtain/extract the ID information from the received beacon signal and compare it against known valid ID information.

At step 706, the method 700 includes determining, by the processor, a signal strength (e.g., RSSI value) of the beacon signal if the ID information of the beacon signal valid. At step 708, the method 700 includes determining, by the processor, whether the signal strength is equal to or more than a threshold signal strength. For example, a threshold RSSI value may be −70 dBm, and the processor 206 may determine whether the RSSI value (e.g., −65 dBm or −90 dBm) of the received beacon signal is below the threshold RSSI value. At step 710, the method 700 includes, if the signal strength is equal to or greater than the threshold signal strength, transmitting, by a transmitter (e.g., the transceiver 210) the ID information and signal strength information (e.g., RSSI value). For example, the processor 206 may control the transceiver 210 to transmit the ID information and the RSSI value to the control device 106. Information related to beacon signals that have a power strength below threshold power strength may be not be transmitted to the control device 106 for the purpose of determining locations of assets associated with the assets tags that transmitted the beacon signals. For example, the processor 202 may drop/discard ID and signal strength information related to these beacon signals.

By filtering out ID and signal strength information related to beacon signals that have a power strength below a threshold power strength, information that has little or no value in determining locations of assets is kept from taking up network bandwidth. Thus, network bandwidth may be conserved for the transmission of more useful information to the control device 106, and network congestion may be reduced.

In some example embodiments, some of the steps of the method 700 may be performed in a different order than described above without departing from the scope of this disclosure. In some alternative embodiments, the method 700 may include more or fewer steps without departing from the scope of this disclosure.

Figure 8:
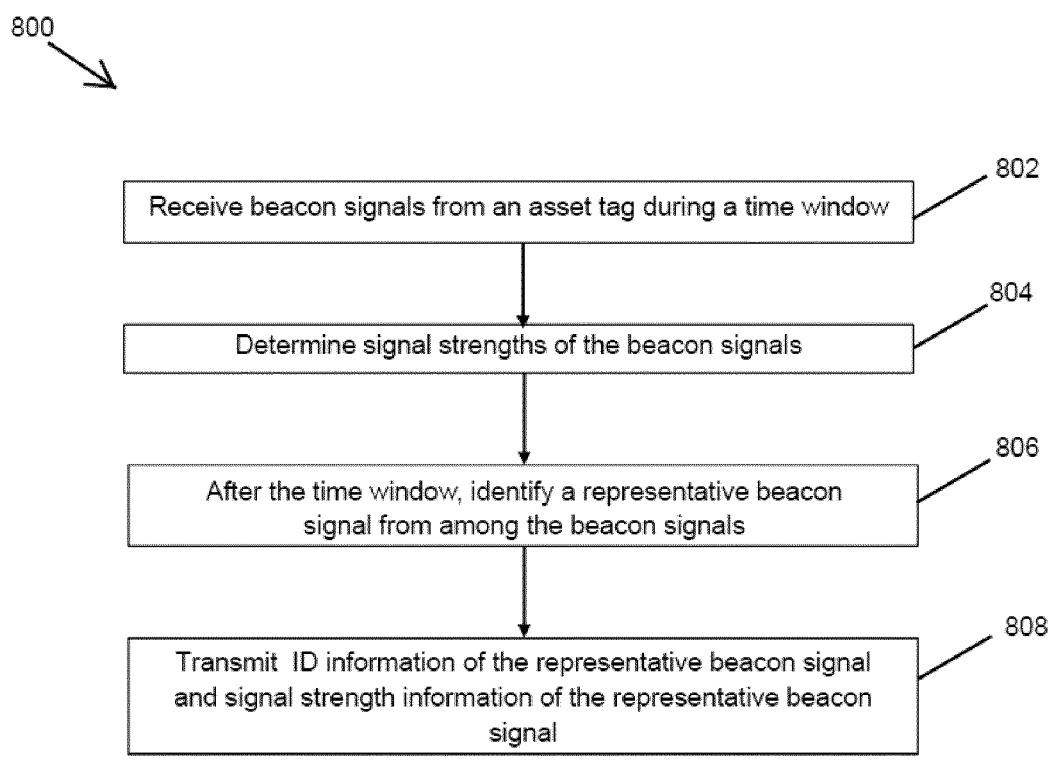
FIG. 8 illustrates a method of operating a lighting and location system based on representative beacon signals on a per time window basis according to another example embodiment.

FIG. 8 illustrates a method 800 of operating a lighting and location system based on representative beacon signals on a per time window basis according to another example embodiment. Referring to FIGS. 1-8, in some example embodiments, at step 802, the method 800 includes receiving, by a sensor (e.g., the sensor 204 of the lighting device 200) beacon signals from an asset tag (e.g., the asset tag 124) during a time window. For example, the sensor 204 may receive the BLE beacon signals during multiple time windows (e.g., 3-second windows), where beacon signals that are received during the same time window are processed together. During a particular time window, the sensor 204 may receive beacon signals from one or more of the asset tags 122-128.

At step 804, the method 800 includes determining, by the processor (e.g., the processor 202), signal strengths of the beacon signals received during the time window. For example, the processor 202 may determine signal strengths of the beacon signals received by the sensor 204 during the time period.

At step 806, the method 800 includes, after the time window, identifying a representative beacon signal from among the beacon signals received from the asset tag (e.g., the asset tag 124). For example, at the end of the time window, the processor 202 may identify/select, based on one or more criteria, a representative beacon signal from among the beacon signals received from the asset tag 124 during the particular time window. For example, identifying/selecting ID and other information related to a particular beacon signal may be equivalent to identifying/selecting a representative beacon signal. To illustrate, the processor 202 may identify/select a representative beacon signal by identifying/selecting the strongest signal strength (e.g., highest RSSI value) from among the signal strengths of the beacon signals received from the particular asset tag 124 within the particular time window. As another example, the processor 202 may identify/select the beacon signal that was received last from the particular asset tag (e.g., the asset tag 124) within the particular time window.

At step 808, the method 800 includes transmitting, by a transmitter (e.g., the transceiver 210) the ID information of the representative beacon signal and signal strength information of the representative beacon signal. For example, the processor 206 may control the transceiver 210 to transmit the information to the control device 106 using, for example, ZigBee-compliant signals such as the signals 140 shown in FIG. 1. The processor 202 may not send information related to other beacon signals received from the same asset tag within the same time window. The control device 106 may determine the location of the asset associated with the particular asset tag based on at least the information related to the representative beacon signal.

In some example embodiments, the sensor 204 may receive one or more beacon signals from multiple asset tags (e.g., the asset tags 122-128) within the same time window, and the processor 202 may identify/select a representative beacon signal with respect to each asset tag and the particular time window in the same manner as described above. The processor 202 may identify/select a representative beacon signal for different time windows on a per time window basis with respect to individual asset tags from which the sensor 204 receives one or more beacon signals. The processor 202 may control the transceiver 210 to transmit information related to a representative beacon signal on a per time window and per asset/asset tag basis. In general, the length of the time window depends on the size of the network (e.g., number of assets, number of lighting devices, etc.), available network bandwidth, and tolerable lag in the particular lighting and location system.

Instead of continuously transmitting ID and signal strength information related to all beacon signals that are received from an asset tag, transmitting ID and signal strength information related to one beacon signal (e.g., most relevant beacon signal) on a per time window and per asset/asset tag basis may help conserve network bandwidth and reduce network congestion.

In some example embodiments, some of the steps of the method 800 may be performed in a different order than described above without departing from the scope of this disclosure. In some alternative embodiments, the method 800 may include more or fewer steps without departing from the scope of this disclosure.

Figure 9:
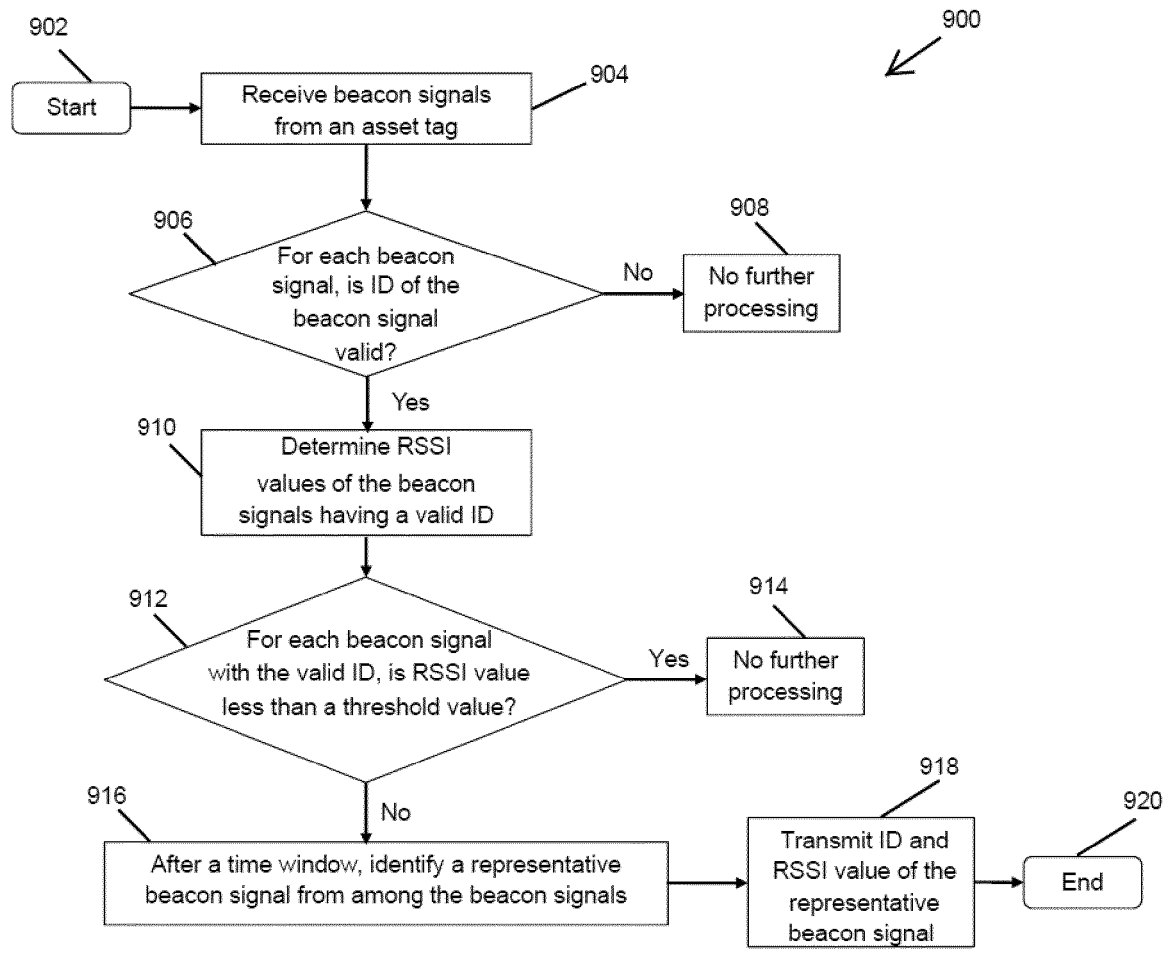
FIG. 9 illustrates a flowchart of a method of operating a lighting and location system based on a combination of steps of the methods of FIGS. 6-8 according to another example embodiment.

FIG. 9 illustrates a flowchart of a method 900 of operating a lighting and location system based on a combination of steps of the methods of FIGS. 6-8 according to another example embodiment. In some example embodiments, the method 900 may be a combination of some of the steps of the methods 600-800. Referring to FIGS. 1-9, in some example embodiments, the method 900 starts at step 902 and continues to step 904, where the method 900 includes receiving, by the sensor 204, beacon signals (e.g., the beacon signals 130) from an asset tag (e.g., the asset tag 126). At step 906, the method 900 includes, for each beacon signal, determining, by the processor 202, whether the ID information of the beacon signal valid in a similar manner as described above. At step 908, the method 900 includes stopping the processing of one or more of the beacon signals that do not have a valid ID.

At step 910, the method 900 includes determining, by the processor 202, RSSI values of the beacon signals that have ID information that is valid. At step 912, the method 900 includes, for each beacon signal with the valid ID, determining, by the processor 202, whether the RSSI value of the beacon signal is less than a threshold value (e.g., −60 dBm). At step 914, the method 900 includes stopping further processing of beacon signals that have an RSSI value (e.g., −80 dBm) that is less than the threshold value.

At step 916, the method 900 includes, after a time window (e.g., 2-seconds window) in which beacon signals are received, identifying, by the processor 202, a representative beacon signal from among the beacon signals that are received from the particular asset tag. As described above, for a particular time window, the processor 202 may identify/select a respective representative beacon signal for multiple assets/asset tags on a per asset/asset tag basis. At step 918, the method 900 includes transmitting, by the transceiver 210, ID information and RSSI value (or other signal strength value) of the representative beacon signal. For example, the information related to the representative beacon signal may be transmitted to the control device 106 using ZigBee complaint signals. For each asset/asset tag, information related to other beacon signals received during the same time window as the representative beacon signal may be dropped/discarded (e.g., not transmitted to the control device 106). At step 920, the method 900 may end.

In some example embodiments, the method 900 may be repeated continuously for other time windows. To be clear, the time windows during which the lighting device 200 may receive beacon signals are consecutive time windows regardless of whether beacon signals are received during a particular time window.

In some example embodiments, some of the steps of the method 900 may be performed in a different order than described above without departing from the scope of this disclosure. In some alternative embodiments, the method 900 may include more or fewer steps without departing from the scope of this disclosure.

Figure 10:
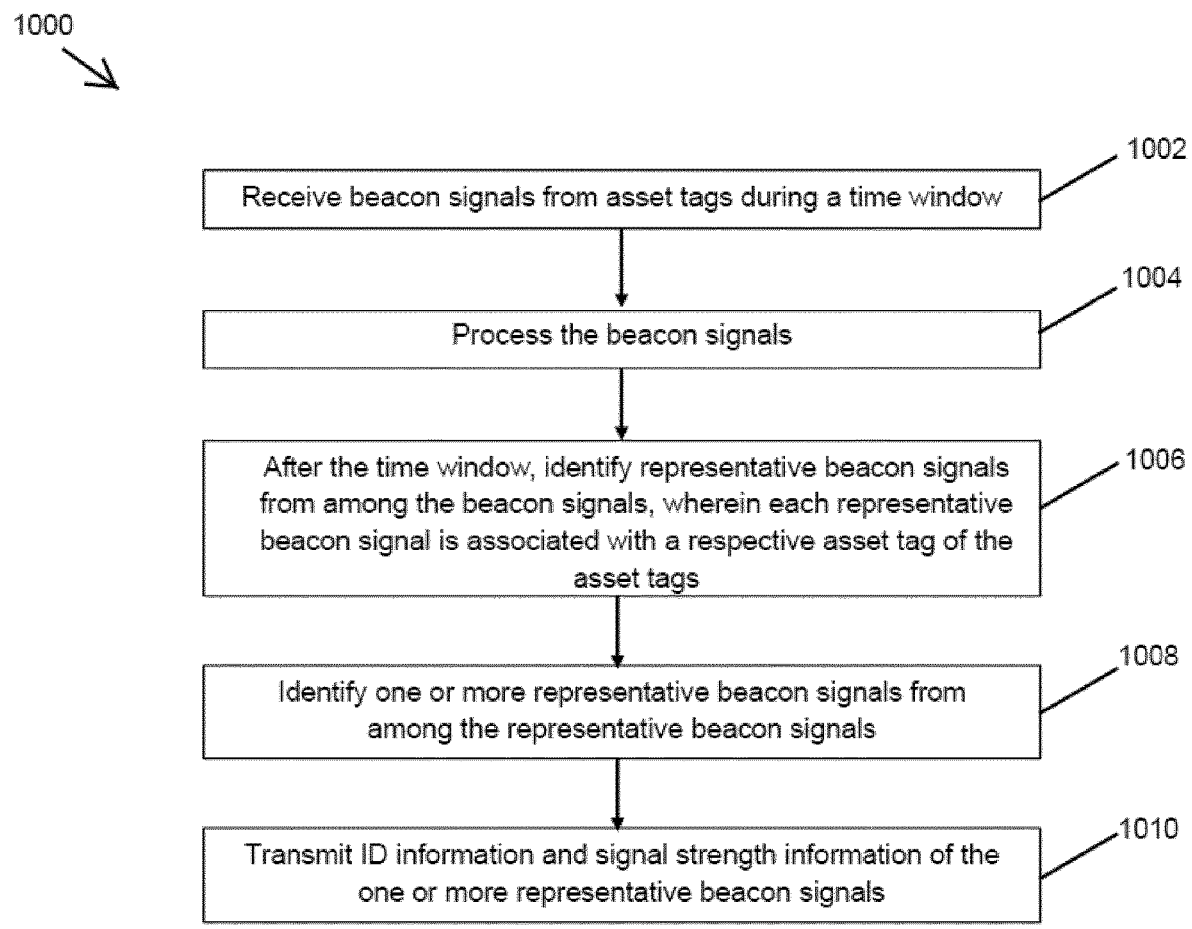
FIG. 10 illustrates a method of operating a lighting and location system based on the prioritization of representative beacon signals from different asset tags according to another example embodiment.

FIG. 10 illustrates a method 1000 of operating a lighting and location system based on the prioritization of representative beacon signals from different asset tags according to another example embodiment. In some example embodiments, the method 1000 may be a combination of some of the steps of the methods 600-900. Referring to FIGS. 1-10, in some example embodiments, at step 1002, the method 1000 includes receiving, by the sensor 204, beacon signals from asset tags 122-128 during a time window (e.g., 3 seconds). At step 1004, the method 1000 includes processing, by the processor 202, the beacon signals. For example, operations, such as filtering out beacon signals that do not have valid ID or that have signal strength less that is than a threshold signal strength as described with respect to the methods 600, 700, and 900, may be performed at step 1004.

At step 1006, the method 1000 includes, after the time window (i.e., at the end of the time window), identifying, by the processor 202, representative beacon signals from among the beacon signals, where each representative beacon signal is associated with a respective asset tag of the asset tags as described above. At step 1008, the method 1000 includes identifying, by the processor 202, one or more representative beacon signals from among the representative beacon signals. At step 1010, the method 1000 includes transmitting ID information and signal strength information of the one or more representative beacon signals In some example embodiments, some of the steps of the method 1000 may be performed in a different order than described above without departing from the scope of this disclosure. In some alternative embodiments, the method 1000 may include more or fewer steps without departing from the scope of this disclosure.

Figure 11:
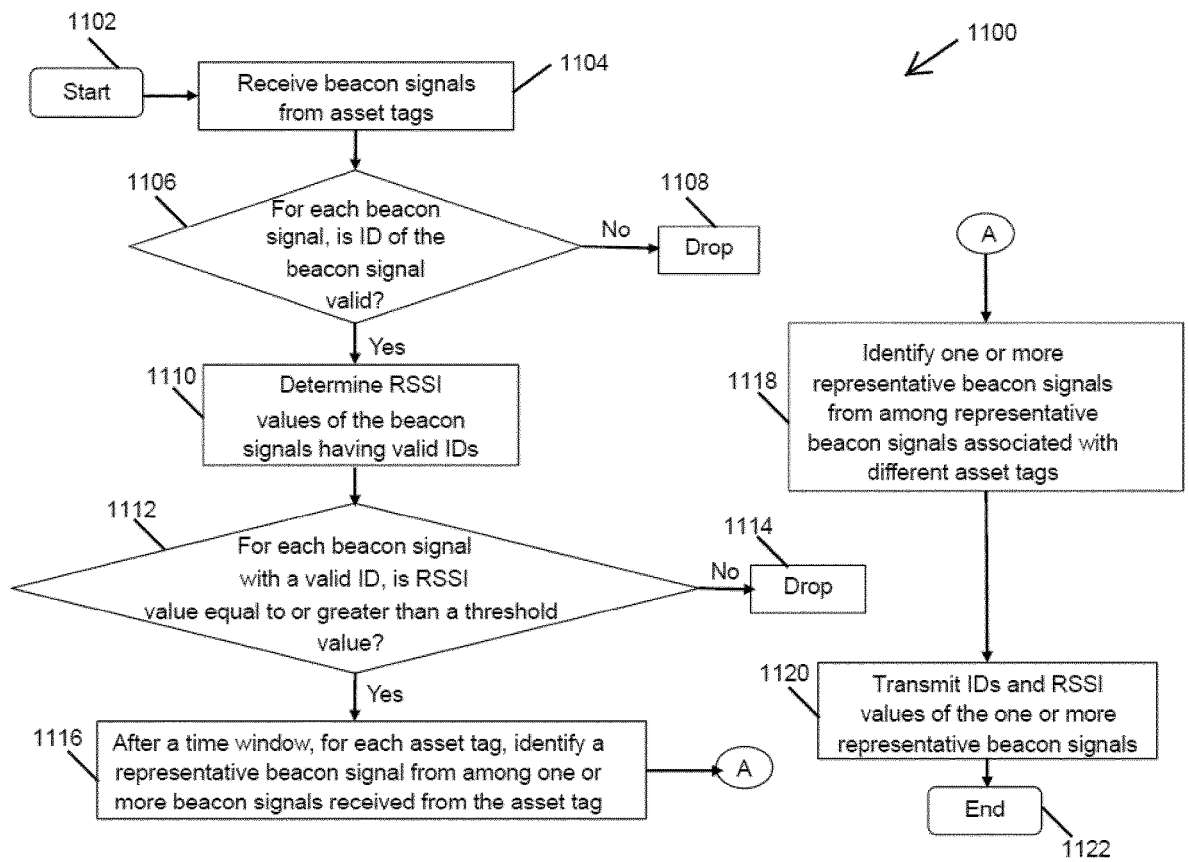
FIG. 11 illustrates a flowchart of a method of operating a lighting and location system based on the prioritization of representative beacon signals from different asset tags according to another example embodiment.

FIG. 11 illustrates a flowchart a method 1100 of operating a lighting and location system based on the prioritization of representative beacon signals from different asset tags according to another example embodiment. Referring to FIGS. 1-11, in some example embodiments, after a representative beacon signal (e.g., as represented by information related to a representative beacon signal) is identified/selected with respect to multiple assets/asset tags, such as the asset tags 122-128, the representative beacon signals may be prioritized, and information related to higher priority representative beacon signals may be transmitted to the control device 106, and information related to remaining (i.e., lower priority) representative beacon signals may be dropped/discarded (e.g., not transmitted) to the control device 106.

To illustrate, at step 1102, the method 1100 starts at step 1102 and continues with step 1104, where the method 1100 includes receiving, by the sensor 204, beacon signals from asset tags 122-128. At step 1106, the method 1100 includes, for each beacon signal, determining, by the processor 202, whether the ID information of the beacon signal valid in a similar manner as described above. At step 1108, the method 1100 includes stopping the processing of one or more of the beacon signals that do not have a valid ID.

At step 1110, the method 1100 includes determining, by the processor 202, RSSI values of the beacon signals that have ID information that is valid. At step 1112, the method 1100 includes, for each beacon signal with the valid ID, determining, by the processor 202, whether the RSSI value of the beacon signal is equal to or greater than a threshold value (e.g., −60 dBm). At step 1114, the method 1100 includes stopping further processing of beacon signals that have an RSSI value (e.g., −80 dBm) that is less than the threshold value.

At step 1116, the method 1100 includes, after a time window (e.g., at an end of a 3-second window) in which beacon signals are received from asset tags, for each asset tag, identifying, by the processor 202, a representative beacon signal from among the beacon signals that are received from the particular asset tag. Step 1116 may be performed with respect to each asset tag from which one or more beacon signals are received within the time window. That is, for a particular time window, the processor 202 may identify/select a respective representative beacon signal with respect to multiple assets/asset tags on a per asset/asset tag basis.

At step 1118, the method 1100 includes identifying, by the processor 202, one or more representative beacon signals from among representative beacon signals associated with different asset tags. For example, the representative beacon signals identified/selected from beacon signals transmitted by the different asset tags may be prioritized to identify the more relevant representative beacon signals for the purpose of determining locations of assets/asset tags. For example, the representative beacon signals may be prioritized based on signal strength or another parameter. To illustrate, some (e.g., half) of the representative beacon signals may be determined as being higher priority representative beacon signals and the remaining representative beacon signals may be determined as being lower priority.

At step 1120, the method 1100 includes transmitting, by the transceiver 210, ID information and RSSI values (or other signal strength value) related to the one or more representative beacon signals that are higher priority than remaining one or more representative beacon signals. For example, the ID information and RSSI values may be transmitted to the control device 106 using ZigBee signals. At step 1122, the method 1100 may end.

In some example embodiments, the method 1100 may be repeated continuously for other time windows. To be clear, the time windows during which the lighting device 200 may receive beacon signals are consecutive time windows regardless of whether beacon signals are received during a particular time window. By transmitting most relevant information to the control device 106, network bandwidth may be conserved for the transmission of more useful information to the control device 106, and network congestion may be reduced.

In some example embodiments, some of the steps of the method 1100 may be performed in a different order than described above without departing from the scope of this disclosure. In some alternative embodiments, the method 1100 may include more or fewer steps without departing from the scope of this disclosure.

Figure 12:
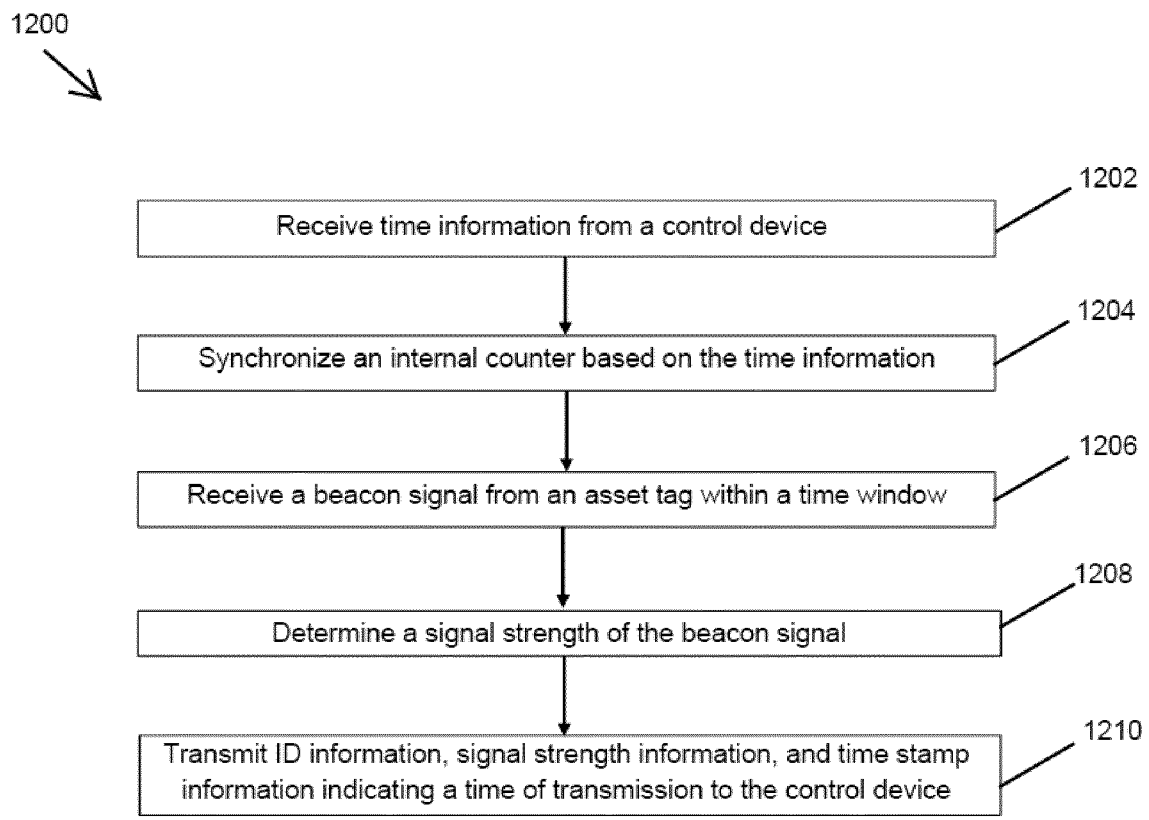
FIG. 12 illustrates a method of operating a lighting and location system including using transmission time stamps according to another example embodiment.

FIG. 12 illustrates a method 1200 of operating a lighting and location system including using transmission time stamps according to another example embodiment. In some example embodiments, including information that indicates the time of transmission of information to the control device 106 may result in a more reliable determination of the locations of assets/assets tags. Referring to FIGS. 1-12, in some example embodiments, at step 1202, the method 1200 includes receiving, by the transceiver 210 of the lighting device 200, time information from the control device 210. To illustrate, the control device 106 may transmit system time information (e.g., a reference time in milliseconds, a counter reset, etc.) using a ZigBee compliant signal. At step 1204, the method 1200 includes synchronizing, by the processor 202, an internal counter, such as the counter 214, based on the time information. For example, if the time information includes a reference time, the counter 214 may count up (e.g., in milliseconds) starting from the reference time upon receipt of the time information from the control device 106. Alternatively, if the time information includes counter reset indicator, the counter 214 may reset to and start counting up from a reset value (e.g., zero or another value) upon receiving time information.

At step 1206, the method 1200 includes receiving, by the sensor 204, a beacon signal (e.g., a BLE beacon signal) from an asset tag (e.g., the asset tag 128) within a time window as described above. At step 1208, the method 1200 includes determine, by the processor 202, a signal strength (e.g., RSSI value) of the beacon signal as described above. The sensor 204 may receive multiple beacon signals from the asset tag or from multiple asset tags and determine signal strengths of the beacon signals.

At step 1210, the method 1200 includes transmitting by the transceiver 210 ID information, signal strength information, and time stamp information indicating a time of transmission of the information to the control device 106. The processor 202 may transmit the information to the control device 106 via the transceiver 210. For example, the time stamp may be transmitted in a header of a ZigBee signal packet on a per window basis. To illustrate, the time of transmission may represent the value or relevant partial value of the counter 214 at the time of the transmission of ID and signal strength information with respect to beacon signals received in a particular time window.

In some example embodiments, the method 1200 may include steps, such as checking for valid ID, checking whether a signal strength equals at least at threshold signal strength, selecting a representative beacon signal, selecting higher priority representative beacon signals from among representative beacon signals corresponding to different asset tags, etc. described above without departing from the scope of this disclosure.

The transmission of a time stamp along with other information may address some challenges encountered in typical RTLS, where dropped packets, retries/retransmissions, and lack of sequence can result in out-of-order receptions and processing of location related information. By transmitting a transmission time information at least on per time window basis, the control device 106 may reorder received information, on a per time window basis. By reordering the received information based on the order of transmission, the control device 106 may more reliably determine locations of assets/asset tags, particularly of moving assets.

In some example embodiments, some of the steps of the method 1200 may be performed in a different order than described above without departing from the scope of this disclosure. In some alternative embodiments, the method 1200 may include more or fewer steps without departing from the scope of this disclosure.

Figure 13:
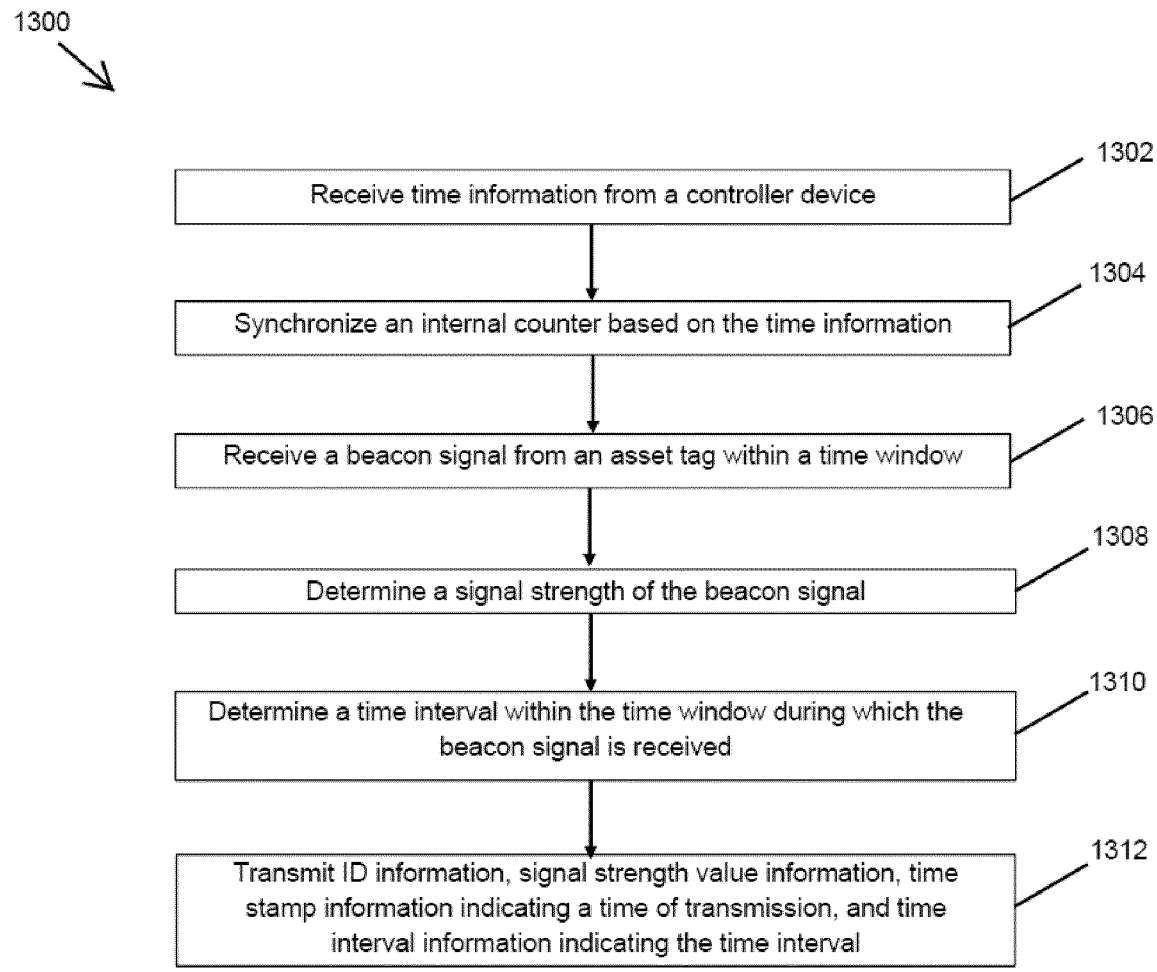
FIG. 13 illustrates a method of operating a lighting and location system including using transmission time stamps and time interval of time windows according to another example embodiment.

FIG. 13 illustrates a method 1300 of operating a lighting and location system including using transmission time stamps and time interval of time windows according to another example embodiment. Referring to FIGS. 1-13, in some example embodiments, including information that indicates the time of transmission of location information derived from beacon signals may result in a more reliable determination of the locations of assets/assets tags. In some example embodiments, time information indicative the time interval in which at a beacon signal is received may be useful. For example, because beacon signals from one or more asset tags are received and processed during a time window (e.g., 3 seconds) before information related to a beacon signal received during the time window is transmitted to the control device 106, information that indicates the time interval of the time window during which the beacon signal is received by the sensor 204 may be useful to the control device 106 to more accurately determine the location of the asset tag that transmitted the beacon signal. For example, a time window may have four time intervals of equal duration, and the processor 202 may transmit the time interval information.

Referring to FIGS. 1-13, in some example embodiments, at step 1302, the method 1300 includes receiving, by the transceiver 210 of the lighting device 200, time information from the control device 206. To illustrate, the control device 106 may transmit system time information (e.g., a reference time in milliseconds, a counter reset, etc.) using a ZigBee compliant signal. At step 1304, the method 1300 includes synchronizing, by the processor 202, the internal counter 214 based on the time information. For example, if the time information includes a reference time, the counter 214 may count up (e.g., in milliseconds) starting from the reference time upon receipt of the time information from the control device 106. Alternatively, if the time information includes counter reset indicator, the counter 214 may reset to and start counting up from a reset value (e.g., zero or another value) upon receiving time information.

At step 1306, the method 1300 includes receiving, by the sensor 204, a beacon signal (e.g., a BLE beacon signal) from an asset tag (e.g., the asset tag 126) within a time window as described above. At step 1308, the method 1300 includes determining, by the processor 202, a signal strength (e.g., RSSI value) of the beacon signal as described above. The sensor 204 may receive multiple beacon signals from the asset tag or from multiple asset tags and determine signal strengths of the beacon signals.

At step 1310, the method 1300 includes determining, by the processor 202, a time interval within the time window during which the beacon signal is received. For example, the time window may be 3 seconds, and each time interval may be 750 milliseconds. Upon the beacon signal being received by the sensor 204, the processor 202 may record the time (e.g., the value of the counter 214). At step 1312, the method 1300 includes transmitting ID information, signal strength information, time stamp information indicating a time of transmission, and time interval information indicating the time interval (e.g., 2 bits to represent one of four time intervals of the time window).

In some example embodiments, the method 1300 may include steps, such as checking for valid ID, checking whether a signal strength equals at least at threshold signal strength, selecting a representative beacon signal, selecting higher priority representative beacon signals from among representative beacon signals corresponding to different asset tags, etc. described above without departing from the scope of this disclosure.

In some example embodiments, some of the steps of the method 1300 may be performed in a different order than described above without departing from the scope of this disclosure. In some alternative embodiments, the method 1300 may include more or fewer steps without departing from the scope of this disclosure.

Although the processor 202 of the lighting device 200 is generally described herein as performing operations such as processing beacon signals, in alternative embodiments, the processor unit 302 of the sensor 204 may perform some the operations without departing from the scope of this disclosure.

Although the control device 106 is generally described herein as determining locations of assets/assets based on information from lighting devices, in alternative embodiments, the server 108 instead of the control device 106 may determine locations without departing from the scope of this disclosure. For example, the control device 106 may pass information received from the lighting devices to the server 108 and may pass information received from the server to the lighting devices.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

In addition to the aforementioned main aspect of this invention, congestion suppression or avoidance in the addressed system may also be further enhanced according to a second aspect (managing communication of electronical devices for RTLS) or a third aspect (Frequency optimization for communication signals of a real-time location system) as disclosed below. Some or all of the embodiments, examples, system setups as disclosed in the main aspect, second aspect, and third aspect may also be used in combination, such that one or more embodiments/examples/system setups from one aspect may be combined with one or more embodiments/examples/system setups from another aspect.

Second Aspect: Managing Communication of Electronical Devices for RTLS

The examples discussed herein are directed to systems, methods, and devices for managing communication of electrical devices for real-time location systems. While examples are described herein as using multiple light fixtures to locate an object in a volume of space, examples can use one or more of a number of other electrical devices in addition to, or as an alternative to, light fixtures. Such other electrical devices can include, but are not limited to, a light switch, a control panel, a thermostat, an electrical wall outlet, a sensor device (e.g., a smoke detector, a $CO_2$ monitor, a motion detector, a broken glass sensor), an integrated sensor device (defined below), and a camera.

Further, any of a number of location methods can be used with examples to locate one or more objects in real-time (using RLTS). Examples of such location methods can include, but are not limited to, received signal strength indicator (RSSI), time-of-flight (ToF), angle of arrival (AoA), and angle of departure (AoD). Any of these methods can involve measurements of one or more other parameters with respect to communication signals. Examples of such other parameters can include, but are not limited to, signal strength, distance of travel, angle, and time of travel.

Examples can be used for a volume of space having any size and/or located in any environment (e.g., indoor, outdoor, hazardous, non-hazardous, high humidity, low temperature, corrosive, sterile, high vibration). Further, while signals described herein are radio frequency (RF) signals, examples can be used with any of a number of other types of signals and/or platforms, including but not limited to visible light signals, LiFi, WiFi, Bluetooth, Bluetooth Low Energy (BLE), RFID, ultraviolet waves, microwaves, and infrared signals. For example, RF signals transmitted using BLE are sent and received at approximately 2.4 GHz.

While examples are directed to managing communications within a system for real-time location based on the detection of occupancy within portions of a volume of space, examples can also manage communication within a system for real-time location based on one or more additional or alternative conditions. Examples of such other conditions can include, but are not limited to, movement, ambient light levels, and temperature.

When an electrical device in an example system is a light fixture (also called a luminaire), the light fixture can be any of a number of types of light fixtures, including but not limited to a troffer, a pendant light fixture, a floodlight, a spotlight, an emergency egress fixture, an exit sign, a down can light fixture, and a high bay light fixture. Regardless of the type of light fixture, such a light fixture can use one or more of a number of different types of light sources, including but not limited to light-emitting diode (LED) light sources, fluorescent light sources, organic LED light sources, incandescent light sources, and halogen light sources. Therefore, light fixtures described herein, even in hazardous locations, should not be considered limited to a particular type of light source.

Examples provide various methods to locate an object in a volume of space in an efficient manner that uses relatively little bandwidth. Examples can be used to locate an object in real time in two dimensions or in three dimensions using RTLS. In addition, examples provide a high level of data security if such security is desired by a user. Examples are also more reliable compared to location methods used in the current art, using low amounts of power on demand. Examples can be installed with new electrical (e.g., lighting, security, entertainment, HVAC) systems. Alternatively, examples can be programmed into existing electrical systems and related equipment with little to no need to add or modify existing hardware.

In certain examples, electrical devices used for real-time location of an object are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures (e.g., light fixtures), wiring, and electrical connections. Use of examples described herein meet (and/or allow a corresponding device to meet) such standards when required. In some (e.g., PV solar) applications, additional standards particular to that application may be met by the electrical devices described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, examples shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Examples of managing communication of electrical devices for real-time location systems will be described more fully hereinafter with reference to the accompanying drawings, in which examples of managing communication of electrical devices for real-time location systems are shown. Managing communication of electrical devices for real-time location systems may, however, be embodied in many different forms and should not be construed as limited to the examples set forth herein. Rather, these examples are provided so that this disclosure will be thorough and complete, and will fully convey the scope of managing communication of electrical devices for real-time location systems to those or ordinary skill in the art. Like, but not necessarily the same, elements (also sometimes called components) in the various figures are denoted by like reference numerals for consistency.

Figure 14A:
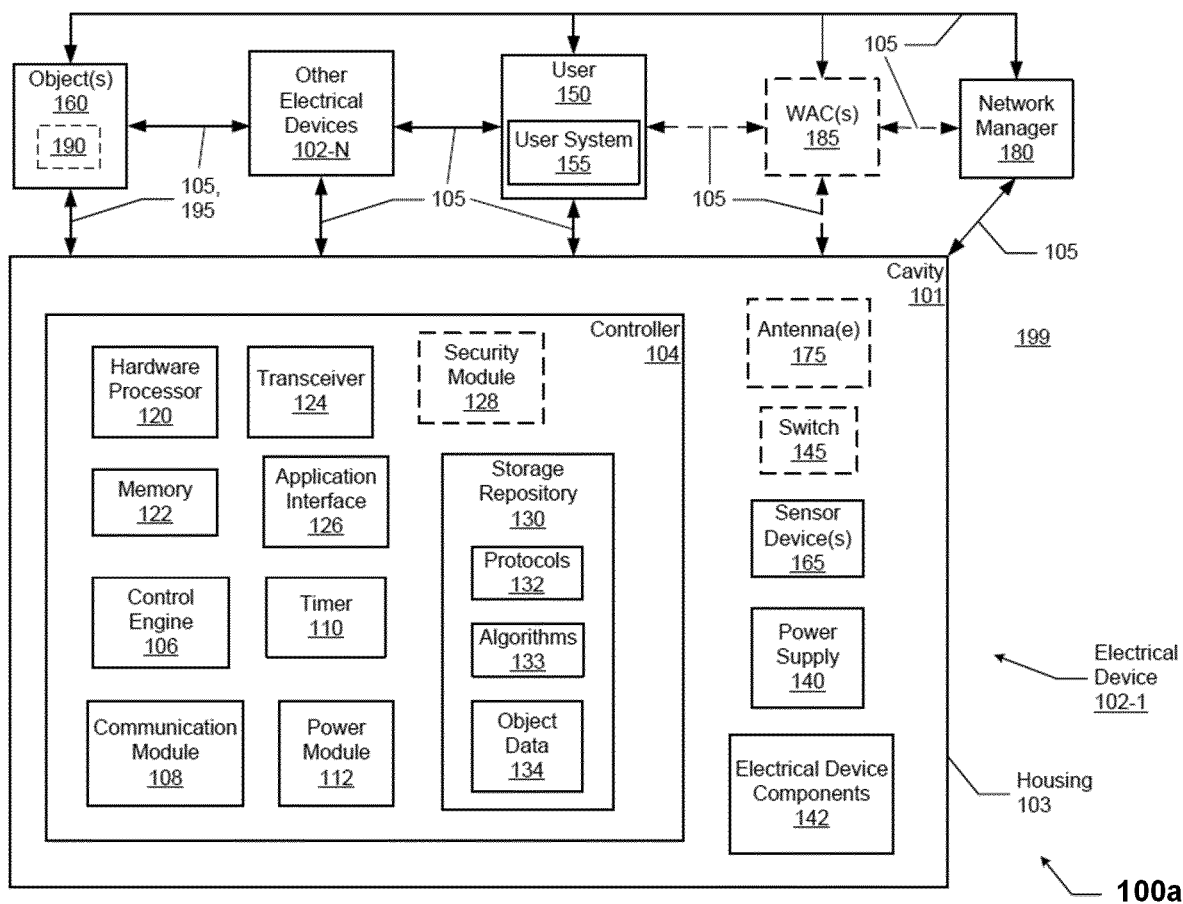
FIG. 14A shows a diagram of a system in accordance with one example.

FIG. 14A shows a diagram of a system 100*a* that includes multiple electrical devices 102 and one or more objects 160 in a volume of space 199 in accordance with certain examples. The system 100a can also include one or more users 150 (each of which can include one or more user systems 155), a network manager 180, and one or more wireless access controllers 185 (WACs 185). Each electrical device 102 (e.g., electrical device 102-1) can include a controller 104, one or more sensor devices 165, one or more optional antennae 175, an optional switch 145, a power supply 140, and a number of electrical device components 142. The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128.

The components shown in FIG. 14A are not exhaustive, and in some examples, one or more of the components shown in FIG. 14A may not be included in an example electrical device 102. Any component of the example electrical device 102 can be discrete or combined with one or more other components of the electrical device 102. For example, each electrical device 102 in the system 100a can have its own controller 104. Alternatively, one controller 104 can be used to control multiple electrical devices 102 in the system. An electrical device 102 is any device that uses electricity, at least in part, to operate. A list of some potential electrical devices 102 is described above. The electrical device 102-1 can be of the same type (e.g., a light fixture) or a different type (e.g., a security camera) relative to one or more of the other electrical devices 102-N.

A user 150 may be any person that interacts with an electrical device 102 and/or object 160 in the volume of space 199. Specifically, a user 150 may program, operate, and/or interface with one or more components (e.g., a controller 104, the network manager 180) associated with the system 100a using examples. Examples of a user 150 can include, but are not limited to, an employee, an engineer, an electrician, a technician, an operator, a consultant, a contractor, an asset, the network manager 180, and a manufacturer's representative. In some cases, a user 150 can also be an object 160.

The user 150 can use a user system 155, which may include a display (e.g., a GUI). The user 150 (including a user system 155) interacts with (e.g., sends data to, receives data from) the controller 104 of the electrical device 102-1 via the application interface 126 (described below). The user 150 (including a user system 155) can also interact with the network manager 180, one or more of the sensor devices 165, one or more of the other electrical devices 102-N, and/or one or more of the objects 160. Interaction (including transmission of communication signals 195) between the users 150 (including a user system 155) and the electrical device 102-1, the other electrical devices 102-N, the network manager 180, the sensor devices 165, and the objects 160 can be facilitated using communication links 105. (At times, the combination of the electrical device 102-1 and the other electrical devices 102-N can be referred to simply as the electrical devices 102 (in plural) or an electrical device 102 (in singular).)

Each communication link 105 can include wired (e.g., Class 1 electrical cables, Class 2 electrical cables, electrical connectors) and/or wireless (e.g., Wi-Fi, visible light communication, cellular networking, Bluetooth, Bluetooth Low Energy (BLE), Zigbee, WirelessHART, ISA100, Power Line Carrier, RS485, DALI) technology. For example, a communication link 105 can be (or include) one or more electrical conductors that are coupled to the housing 103 of an electrical device 102 and to the network manager 180. The communication links 105 can transmit signals (e.g., power signals, communication signals 195, control signals, data) between the electrical devices 102, the user 150 (including a user system 155), the sensor devices 165, the objects 160, and/or the network manager 180. For example, the electrical devices 102 of the system 100a can interact with the one or more objects 160 by transmitting communication signals 195 over one or more communication links 105, as discussed below. The signals transmitted over the communication links 105 are made up of bits of data.

The network manager 180 is a device or component that controls all or a portion of the system 100a that includes the controller 104 of at least one of the electrical devices 102 and the optional WACs 185. The network manager 180 can be substantially similar to the controller 104 described below. Alternatively, the network manager 180 can include one or more of a number of features in addition to, or altered from, the features of the controller 104 described below. There can be more than one network manager 180 and/or one or more portions of a network manager 180.

In some cases, a network manager 180 can be called a gateway, an insight manager, or a RTLS engine. The network manager 180 can receive data from the WACs 185 and processes this data (e.g., using algorithms 133 and/or protocols 132) to determine the location of one or more objects 160 in real time. The network manager 180 can be located in the volume of space 199 or remotely from the volume of space 199. The network manager 180 can use the various communications received from the WACs 185 to locate an object 160 in two dimensions or in three dimensions within the volume of space 199. In certain examples, the network manager 180 determines how often one or more particular sensor devices 165, directly or indirectly (as through the controller 104), reports as to whether occupancy (e.g., an object) is detected by that sensor device 165.

Each optional WAC 185 (sometimes more simply called an access controller, as a generic term and/or when wired communication links 105 are involved) performs a number of different functions. For example, a WAC 185 can help communicate with and control the controller 104 of one or more electrical devices 102 to help control the operation of those electrical devices 102. For RTLS applications, the WAC 185 can be responsible for pairing with the sensor devices 165 (e.g., Zigbee-enabled), providing configuration data to the sensor devices 165, synchronizing the timing of those sensor devices 165, supporting the firmware of those sensor devices 165, upgrading those sensor devices 165, receiving location/telemetry data (e.g., using a Zigbee-enabled communication links 105) from the sensor devices 165, and/or performing any other function with respect to those sensor devices 165 to support RTLS activities.

When a WAC 185 receives data (e.g., packed egress data that arrives as ingress data) from a sensor device 165, the WAC 185 can convert the data into a different format (e.g., ECAPI). The WAC 185 can then send the newly-formatted data to the network manager 180. To help diagnose issues, a WAC 185 can maintain counters for each paired sensor device 165 and include, for example, the number of received packed data messages from a particular sensor device 165, the number of formatted messages successfully transmitted to the network manager 180 that pertain to the packed data from a particular sensor device 165, and the number of formatted messages pertaining to the packed data from a particular sensor device 165 that failed to transmit to the network manager 180.

In some cases, a WAC 185 maintains the average and maximum latency introduced between the receipt of a message from a sensor device 165 and transmission of a formatted message to the network manager 180. The WAC 185 can also notify the network manager 180 when the average or maximum latency exceeds a threshold value. Further, a WAC 185 can communicate to the network manager 180 when there is a significant discrepancy (e.g., as determined by the WAC 185) between the ingress and egress packets with respect to a sensor device 165. When there are multiple WACs 185, they can all be time-synchronized with each other. In some cases, a WAC 185 can be substantially similar to the controller 104 described below. Alternatively, a WAC 185 can include one or more of a number of features in addition to, or altered from, the features of the controller 104 described below. A WAC 185 can be located in the volume of space 199 or remotely from the volume of space 199.

In some cases, as stated above, a WAC 185 is optional, in which case the controller 104 (or a sensor device 165 if the sensor device 165 is integrated) can communicate directly with the network manager 180, in addition to communicating directly with the objects 160, the other electrical devices 102-N, and/or the users 150. In certain examples, the WAC 185 determines how often one or more particular sensor devices 165, directly or indirectly (as through the controller 104), reports as to whether occupancy (e.g., an object) is detected by that sensor device 165.

As defined herein, an object 160 can be any unit or group of units. An object 160 can move on its own, is capable of being moved, or is stationary, at least for a time. Examples of an object 160 can include, but are not limited to, a person (e.g., a user 150, such as a visitor or an employee) or group of people, an animal, or some other living creature that is capable of movement. A system 100*a* can have one object 160 or multiple objects 160 in the volume of space 199.

In some cases, an object 160 can include an optional communication device 190 (also sometimes called a tag, a beacon, or other name known in the art, depending on the configuration of the communication device 190), which can receive communication signals 195 (e.g., RF signals) from and/or send communication signals 195 to one or more electrical devices 102. The communication device 190 of an object 160 can broadcast communication signals 195 that can be received by any electrical devices 102 within range of the broadcast or send communication signals 195 addressed to electrical devices 102.

An optional communication device 190 can include one or more of a number of components (e.g., transceiver, antenna, switch, power module) and/or have the functionality described below with respect to a controller 104 and/or an associated electrical device 102. For example, a communication device 190 can include a control engine, a transceiver, and an antenna (substantially similar to the corresponding components described below with respect to the controller 104) to allow the communication device 190 to send communication signals 195 to and/or receive communication signals 195 from one or more electrical devices 102 in the system 100*a*.

Using examples, a communication device 190 of an object 160 can be in sleep mode for a predefined interval, at which point it stays awake for a period of time or until the communication device 190 receives a Communication signal 195 broadcast by one or more electrical devices 102. When this occurs, the communication device 190 can turn on long enough to interpret the initial communication signal 195, and then generate and send its own communication signal 195 to one or more of the electrical devices 102 in response to the initial communication signal 195. This response communication signal 195 can include a UUID as well as a reference (e.g., signal code) to the initial communication signal 195 and/or the electrical device 102 that sent the initial communication signal 195, if any. Once the response communication signal 195 is sent by a communication device 190, the communication device 190 can go back into sleep mode, thereby reserving a considerable amount of power.

The optional communication device 190 can use one or more of a number of communication protocols in sending communication signals 195 to and/or receiving communication signals 195 from the electrical devices 102. In certain examples, an object 160 (or a portion thereof, such as the communication device 190) can include a battery (a form of power supply or power module) that is used to provide power, at least in part, to some or all of the rest of the object 160, including the communication device 190.

A user 150 (including a user system 155), the network manager 180, one or more sensor devices 165, one or more optional WACs 185, one or more optional communication devices 190, and/or the other electrical devices 102-N can interact with the controller 104 of the electrical device 102-1 using the application interface 126 in accordance with one or more examples. Specifically, the application interface 126 of the controller 104 receives data (e.g., information, communications, instructions) from and sends data (e.g., information, communications, instructions) to the user 150 (including a user system 155), the network manager 180, the sensor devices 165, one or more optional WACs 185, one or more optional communication devices 190, and/or one or more of the other electrical devices 102-N.

The user 150 (including a user system 155), the network manager 180, the sensor devices 165, one or more optional WACs 185, one or more optional communication devices 190, and/or one or more of the other electrical devices 102-N can include an interface to receive data from and send data to the controller 104 in certain examples. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150 (including a user system 155), the network manager 180, the sensor devices 165, one or more optional WACs 185, one or more optional communication devices 190, and/or one or more of the other electrical devices 102-N can use their own system or share a system in certain examples. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 15.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some examples. The software of one system can be a part of, or operate separately but in conjunction with, the software of another system within the system 100a.

The electrical device 102-1 can include a housing 103. The housing 103 can include at least one wall that forms a cavity 101. In some cases, the housing 103 can be designed to comply with any applicable standards so that the electrical device 102-1 can be located in a particular environment (e.g., a hazardous environment). The housing 103 of the electrical device 102-1 can be used to house one or more components of the electrical device 102-1, including one or more components of the controller 104. For example, as shown in FIG. 14A, the controller 104 (which in this case includes the control engine 106, the communication module 108, the timer 110, the power module 112, the storage repository 130, the hardware processor 120, the memory 122, the transceiver 124, the application interface 126, and the optional security module 128), the one or more sensor devices 165, an optional switch 145, one or more optional antennae 175, the power supply 140, and the electrical device components 142 are disposed in the cavity 101 formed by the housing 103. In alternative examples, any one or more of these or other components of the electrical device 102-1 can be disposed on the housing 103 and/or remotely from the housing 103.

The storage repository 130 can be a persistent storage device (or set of devices) that stores software and data used to assist the controller 104 in communicating with the user 150 (including a user system 155), the network manager 180, one or more of the objects 160, the sensor devices 165, one or more optional WACs 185, and one or more of the other electrical devices 102-N within the system 100a. In one or more examples, the storage repository 130 stores one or more protocols 132, one or more algorithms, 133, and object data 134.

The protocols 132 can be any procedures (e.g., a series of method steps) and/or other similar operational procedures that the control engine 106 of the controller 104 follows based on certain conditions at a point in time. The protocols 132 can also include any of a number of communication protocols that are used to send and/or receive data between the controller 104 and the user 150 (including a user system 155), the network manager 180, the one or more of the other electrical devices 102-N, the sensor devices 165, one or more optional WACs 185, and one or more of the objects 160. One or more of the protocols 132 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 132 used for communication can provide a layer of security to the data transferred within the system 100a.

The algorithms 133 can be any formulas, mathematical models, forecasts, simulations, and/or other similar tools that the control engine 106 of the controller 104 uses to reach a computational conclusion. An example of one or more algorithms 133 is calculating the strength of a communication signal 195 and comparing the strength of a communication signal 195 with a threshold value. Algorithms 133 can be used to analyze past data, analyze current data, and/or perform forecasts.

One or more particular algorithms 133 can be used in conjunction with one or more particular protocols 132. For example, one or more protocols 132 and/or one or more algorithms 133 can be used to determine whether an object 160 occupies a portion of the volume of space 199 based on measurements made by one or more sensor devices 165. As another example, one or more protocols 132 and/or one or more algorithms 133 can be used determine that an object 160 occupies the volume of space 199 using encoded IR signaling, which can involve one or more sensor devices 165.

As still another example, one or more protocols 132 and/or one or more algorithms 133 can be used to determine that an object 160 occupies the volume of space 199 based on a communication signal received from a communication device 190 of the object 160. Once occupancy information is determined, one or more protocols 132 and/or one or more algorithms 133 can be used to made adjustments to the frequency with which communications are made between components (e.g., sensor device 165 to controller 104, controller 104 to WAC 185, controller 104 to network manager 180, WAC 185 to network manager 180) in the system 100a and/or the frequency at which a sensor device 165 makes measurements relative to occupancy of the volume of space 199.

Object data 134 can be any data associated with each object 160 (including an associated communication device 190) that is communicably coupled to the controller 104. Such data can include, but is not limited to, a manufacturer of the communication device 190, a model number of the communication device 190, communication capability of the communication device 190 of an object 160, last known location of the object 160, gender of the object 160, and age of the object 160. Other types of data can also be stored in the storage repository 130, including but not limited to threshold values, historical data, forecasts, and user preferences.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, the algorithms 133, and/or the object data 134 according to some examples. Each storage unit or device can be physically located in the same or in a different geographic location.

The storage repository 130 can be operatively connected to the control engine 106. In one or more examples, the control engine 106 includes functionality to communicate with the user 150 (including a user system 155), the network manager 180, the objects 160, the sensor devices 165, one or more WACs 185, and the other electrical devices 102-N in the system 100a. More specifically, the control engine 106 sends information to and/or receives information from the storage repository 130 in order to communicate with the user 150 (including a user system 155), the network manager 180, the objects 160, the sensor devices 165, one or more WACs 185, and the other electrical devices 102-N. As discussed below, the storage repository 130 can also be operatively connected to the communication module 108 in certain examples.

In certain examples, the control engine 106 of the controller 104 controls the operation of one or more components (e.g., the communication module 108, the timer 110, the transceiver 124) of the controller 104. For example, the control engine 106 can put the communication module 108 in "sleep" mode when there are no communications between the controller 104 and another component (e.g., an object 160, a sensor device 165, a WAC 185, a user system 155) in the system 100*a* or when communications between the controller 104 and another component in the system 100*a* follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to send communication signals 195 (or other types of communication) and/or stop sending communication signals 195 (or other types of communication) to one or more sensor devices 165 and/or one or more WACs 185 in the system 100*a*. The control engine 106 can also instruct a sensor device 165 to communicate with an object 160 (or a communication device 190 thereof), with a WAC 185, and/or with the controller 104. This example provides another instance where the control engine 106 can conserve power used by the controller 104 and other components (e.g., the objects 160, the sensor devices 165) of the system 100*a*.

The control engine 106 can determine, using one or more algorithms 133 and/or protocols 132, whether an object 160 is occupying a portion of the volume of space 199. To determine whether an object 160 is occupying a portion of the volume of space 199, the control engine 106 can use one or more measurements (e.g., of infrared radiation, of sound, of movement) made by one or more sensor devices 165. Alternatively, the control engine 106 can base its determination on whether an object 160 is occupying a portion of the volume of space 199 using communication signals 195 sent to and/or received from the object 160 (including an associated communication device 190).

For example, if the controller 104 is communicating with the communication device 190 of an object 160, one or more communication signals 195 transmitted between the controller 104 and the communication device 190 can be analyzed to determine the identification of the object and/or whether the object 160 is moving in the volume of space 199, thereby indicating occupancy within the volume of space 199. The communication signals 195 can be tested in terms of any of a number of methods, including but not limited to RSSI, ToF, AoA, and AoD. For example, a change in RSSI of communication signals 195 received by the controller 104 over a period of time (e.g., 5 seconds) can be an indication that the object 160 has changed position within the volume of space, thereby indicating that the object 160 is occupying the volume of space 199. The control engine 106 can additionally perform one or more functions associated with locating one or more objects 160 in the volume of space 199.

When the control engine 106 determines whether an object 160 is occupying a portion of the volume of space 199, the control engine 106 can instruct the sensor device 165 as to how often (e.g., in terms of intervals of time) the sensor device 165 should measure its parameters to again determine whether an object 160 occupies the portion of the volume of space 199. This frequency can be based on a table stored in the storage repository. For example, if the control engine 106 determines that, based on measurements made by one or more sensor devices 165, that an object 160 occupies a portion of the volume of space, the control engine 106 can instruct those one or more sensor devices 165 to repeat its measurements every second and send the results to the control engine 106 for evaluation. Such a measurement rate can be accelerated from a normal or default measurement rate of the sensor device 165.

Alternatively, if the control engine 106 determines that no object 160 occupies the portion of the volume of space, then the control engine 106 can instruct those one or more sensor devices 165 to repeat its measurements every five seconds and send the results to the control engine 106 for evaluation. Such a measurement rate can be a normal or default measurement rate of the sensor device 165. As yet another alternative, if the control engine 106 determines that no object 160 has occupied the portion of the volume of space 199 for some period of time (e.g., an hour, 4 hours, 30 minutes), then the control engine 106 can instruct those one or more sensor devices 165 to repeat its measurements every 60 minutes and send the results to the control engine 106 for evaluation. Such a measurement rate can be increased relative to a normal or default measurement rate of the sensor device 165.

The rates at which the control engine 106 can instruct a sensor device 165 to take measurements for occupancy can vary based on one or more of a number of factors. Such factors can include, but are not limited to, time of day, day of the week, holidays, historical occupancy of the portion of the volume of space 199, recent measurements made by adjacent sensor devices 165, and parameter measured by a sensor device 165. By controlling the operation of the sensor devices 165 in this way, the control engine 106 can make more bandwidth available on the communication network (the communication links 105 in the system) by reducing the rate at which sensor devices 165 check for occupancy at locations where there is no recent occupancy.

Alternatively, rather than dictating how often a sensor device 165 takes measurements, the control engine 106 can use the occupancy information derived from measurements made by the sensor devices 165 to determine how often the control engine 106 reports the occupancy (or lack of occupancy) information to a WAC 185 and/or the network manager 180. In this way, rather than affecting the operation of the sensor devices 165, the control engine 106 can make more bandwidth available on the communication network (the communication links 105 in the system) by reducing its reporting rate as to occupancy at locations where there is no recent occupancy.

The control engine 106 can use one or more protocols 132 and/or one or more algorithms 133 to establish, modify, and/or implement one or more rules-based approaches to determining the reporting frequency (also called a rate of reporting herein) of one or more sensor devices 165. For example, if the number of sensor devices 165 that detect occupancy at a given point in time is ten or less, then the control engine 106 instructs those sensor devices 165 to take measurements and report every one second. If the number of sensor devices 165 that detect occupancy at a given point in time is between eleven and twenty, then the control engine 106 instructs those sensor devices 165 to take measurements and report every two seconds. If the number of sensor devices 165 that detect occupancy at a given point in time is greater than 21, then the control engine 106 instructs those sensor devices 165 to take measurements and report every three seconds.

In certain examples, the control engine 106 is selective as to when to instruct a sensor device 165 to change a rate of reporting. In some cases, a single controller 104 can be communicably coupled to a large number of sensor devices 165. In such a case, communications that flow from the control engine 106 to each of the various sensor devices 165 can generate an added burden to the system 100a and take a greater amount of bandwidth on the communication links 105 compared to not implementing examples. Therefore, a control engine 106 can use one or more protocols 132 and/or one or more algorithms 133 to determine when and how often to instruct a sensor device 165 to change a rate of reporting.

These examples examples use information provided by one or more sensor devices 165 and have the advantages of using less bandwidth of data. Also, examples are self-adjusting, and examples increase the accuracy and effectiveness of the system 100a. In some cases, the control engine 106 of the controller 104 can also use the protocols 132 and/or the algorithms 133 to extract the ID of an object 165 from a communication signal 195 received from the communication device 190 of the object 160 directly by the transceiver 124 or by an integrated sensor device 165.

The control engine 106 of the controller 104 can further use the protocols 132 and/or the algorithms 133 to interpret the measurements made by one or more of the sensors of a sensor device 165. For instance, if a sensor device 165 includes a PIR sensor, then the PIR sensor can detect motion within a sensing range and/or occupancy within a RTLS occupancy zone, both of which are discussed below with respect to FIGS. 20A and 20B. In such a case, the control engine 106 can interpret these detections by the PIR sensor.

The control engine 106 of the controller 104 of the electric device 102-1 (or, in some cases, a sensor device 165) can also use the protocols 132 and/or the algorithms 133 to generate a subsequent communication signal to a WAC 185 and/or the network manager 180 that is based on receipt of the first communication signal. For example, a subsequent communication signal can include a number of bits that are directed to information such as, for example, the ID of the controller 104, the ID of the sensor device 165, and whether occupancy has been detected by the sensor device 165.

As stated above, in some cases, control engine 106 of the controller 104 can further use the protocols 132 and/or the algorithms 133 to determine certain conditions that may call for a delay in a sensor device 165 taking measurements for occupancy and/or in the control engine 106 sending a communication regarding occupancy of a portion of the volume of space 199. For example, if there is no occupancy based on measurements by a sensor device 165, or if there continues to be no occupancy based on measurements by a sensor device 165, the control engine 106 can send communications to a WAC 185 at a default rate or reporting or a rate of reporting that is longer than the default rate based on the lack of occupancy.

The control engine 106 can provide control, communication, and/or other similar signals to the user 150 (including a user system 155), the network manager 180, the other electrical devices 102-N, the sensor devices 165, one or more WACs 185, and one or more of the objects 160. Similarly, the control engine 106 can receive control, communication, and/or other similar signals from the user 150 (including a user system 155), the network manager 180, the other electrical devices 102-N, the sensor devices 165, one or more WACs 185, and one or more of the objects 160. The control engine 106 can communicate with each object 160 automatically (for example, based on one or more algorithms 133 stored in the storage repository 130) and/or based on control, communication, and/or other similar signals received from another device (e.g., the network manager 180, another electrical device 102) using the communication signals 195. The control engine 106 may include a printed circuit board, upon which the hardware processor 120 and/or one or more discrete components of the controller 104 are positioned.

In certain examples, the control engine 106 can include an interface that enables the control engine 106 to communicate with one or more components (e.g., power supply 140) of the electrical device 102-1. For example, if the power supply 140 of the electrical device 102-1 operates under IEC Standard 62386, then the power supply 140 can include a digital addressable lighting interface (DALI). In such a case, the control engine 106 can also include a DALI to enable communication with the power supply 140 within the electrical device 102-1. Such an interface can operate in conjunction with, or independently of, the communication protocols 132 used to communicate between the controller 104 and the user 150 (including a user system 155), the network manager 180, the other electrical devices 102-N, the sensor devices 165, one or more WACs 185, and the objects 160.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

By using examples, while at least a portion (e.g., the control engine 106, the timer 110) of the controller 104 is always on, the remainder of the controller 104 and the objects 160 can be in sleep mode when they are not being used. In addition, the controller 104 can control certain aspects (e.g., sending Communication signals 195 to and receiving communication signals 195 from an object 160) of one or more other electrical devices 102-N in the system 100a.

The communication network (using the communication links 105) of the system 100a can have any type of network architecture. For example, the communication network of the system 100a can be a mesh network. As another example, the communication network of the system 100a can be a star network. When the controller 104 includes an energy storage device (e.g., a battery as part of the power module 112), even more power can be conserved in the operation of the system 100a. In addition, using time-synchronized communication protocols 132, the data transferred between the controller 104 and the user 150 (including a user system 155), the network manager 180, the sensor devices 165, one or more WACs 185, and the other electrical devices 102-N can be secure.

The communication module 108 of the controller 104 determines and implements the communication protocol (e.g., from the protocols 132 of the storage repository 130) that is used when the control engine 106 communicates with (e.g., sends signals to, receives signals from) the user 150 (including a user system 155), the network manager 180, the other electrical devices 102-N, the sensor devices 165, one or more WACs 185, and/or one or more of the objects 160. In some cases, the communication module 108 accesses the object data 134 to determine which communication protocol is within the capability of the object 160 for a communication signal 195 sent by the control engine 106. In addition, the communication module 108 can interpret the communication protocol of a communication signal 195 received by the controller 104 so that the control engine 106 can interpret the communication.

The communication module 108 can send data (e.g., protocols 132, object data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure the time of flight (ToF) of one or more communication signals 195, even simultaneously. The timer 110 can track time periods based on an instruction received from the control engine 106, based on an instruction received from the user 150 (including a user system 155), based on an instruction programmed in the software for the controller 104, based on some other condition or from some other component, or from any combination thereof.

The power module 112 of the controller 104 provides power to one or more other components (e.g., timer 110, control engine 106) of the controller 104. In addition, in certain examples, the power module 112 can provide power to the power supply 140 of the electrical device 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the electrical device 102 and generates power of a type (e.g., alternating current, direct current) and level (e.g., 12V, 24V, 120V) that can be used by the other components of the controller 104 and/or by the power supply 140. In addition, or in the alternative, the power module 112 can be a source of power in itself to provide signals to the other components of the controller 104 and/or the power supply 140. For example, the power module 112 can include an energy storage device (e.g., a battery). As another example, the power module 112 can include a localized photovoltaic power system.

The hardware processor 120 of the controller 104 executes software in accordance with one or more examples. Specifically, the hardware processor 120 can execute software on the control engine 106 or any other portion of the controller 104, as well as software used by the user 150 (including a user system 155), the network manager 180, the sensor devices 165, one or more WACs 185, and/or one or more of the other electrical devices 102-N. The hardware processor 120 can be an integrated circuit, a central processing unit, a multi-core processing chip, a multi-chip module including multiple multi-core processing chips, or other hardware processor in one or more examples. The hardware processor 120 is known by other names, including but not limited to a computer processor, a microprocessor, and a multi-core processor.

In one or more examples, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some examples. In certain configurations, the memory 122 can be integrated with the hardware processor 120.

In certain examples, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send (using a transmitter) and/or receive (using a receiver) control and/or communication signals, including communication signals 195. Specifically, the transceiver 124 can be used to transfer data between the controller 104 and the user 150 (including a user system 155), the network manager 180, the other electrical devices 102-N, one or more of the sensor devices 165, one or more WACs 185, and/or the objects 160. The transceiver 124 can use wired and/or wireless technology. The transceiver 124 can be configured in such a way that the control and/or communication signals sent and/or received by the transceiver 124 can be received and/or sent by another transceiver that is part of the user 150 (including a user system 155), the network manager 180, the other electrical devices 102-N, one or more sensor devices 165, one or more WACs 185, and/or the objects 160.

When the transceiver 124 uses wireless technology, any type of wireless technology can be used by the transceiver 124 in sending and receiving communication signals 195. Such wireless technology can include, but is not limited to, Wi-Fi, visible light communication, infrared (IR), cellular networking, Zigbee, BLE, and Bluetooth. For example, the transceiver 124 can include a Zigbee transmitter, a Zigbee receiver, a BLE receiver, a BLE transmitter, an active IR transmitter, and/or an active IR receiver. The transceiver 124 can use one or more of any number of suitable communication protocols (e.g., ISA100, HART) when sending and/or receiving communication signals 195. Such communication protocols can be stored in the protocols 132 of the storage repository 130. Further, any transceiver information for the user 150 (including a user system 155), the network manager 180, the other electrical devices 102-N, the sensor devices 165, one or more WACs 185, and/or the objects 160 can be part of the object data 134 (or similar areas) of the storage repository 130.

Optionally, in one or more examples, the security module 128 secures interactions between the controller 104, the user 150 (including a user system 155), the network manager 180, the other electrical devices 102-N, the sensor devices 165, one or more WACs 185, and/or the objects 160. More specifically, the security module 128 authenticates communication from software based on security keys verifying the identity of the source of the communication. For example, user software may be associated with a security key enabling the software of a user system 155 of a user 150 to interact with the controller 104 of the electrical device 102-1. Further, the security module 128 can restrict receipt of information, requests for information, and/or access to information in some examples.

As mentioned above, aside from the controller 104 and its components, the electrical device 102-1 can include a power supply 140, one or more sensor devices 165, one or more optional antennae 175, an optional switch 145, and one or more electrical device components 142. The electrical device components 142 of the electrical device 102-1 are devices and/or components typically found in the electrical device 102-1 to allow the electrical device 102-1 to operate. An electrical device component 142 can be electrical, electronic, mechanical, or any combination thereof. The electrical device 102-1 can have one or more of any number and/or type of electrical device components 142. For example, when the electrical device 102-1 is a light fixture, examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

The power supply 140 of the electrical device 102-1 provides power to one or more of the electrical device components 142, the controller 104, the sensor devices 165, the optional antennae 175, and the optional switches 145. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from or sends power to the power module 112 of the controller 104. The power supply can generate power of a type (e.g., alternating current, direct current) and level (e.g., 12V, 24V, 120V) that can be used by the recipients (e.g., the electrical device components 142, the controller 106, the sensor devices 165) of such power. In addition, or in the alternative, the power supply 140 can receive power from a source external to the electrical device 102-1. In addition, or in the alternative, the power supply 140 can be or include a source of power in itself. For example, the power supply 140 can include an energy storage device (e.g., a battery), a localized photovoltaic power system, or some other source of independent power.

Each of the one or more sensor devices 165 of the electrical device 102-1 can include any type of sensing device that measures one or more parameters. Examples of types of sensor devices 165 can include, but are not limited to, a passive infrared sensor, an ultrasonic sensor, a photocell, a camera, a pressure sensor, an air flow monitor, a gas detector, and a resistance temperature detector. Examples of a parameter that is measured by a sensor device 165 can include, but are not limited to, occupancy (e.g., based on infrared radiation, based on the reflection of ultrasonic waves, based on images captured by a camera of the sensor device 165, based on a change of position of the object (including an associated communication device 190) over time) in the volume of space 199, a temperature, a level of gas, a level of humidity, an amount of ambient light in the volume of space 199, and a pressure wave.

In some cases, the parameter or parameters measured by a sensor device 165 can be used to operate one or more of the electrical device components 142 of the electrical device 102-1. In addition, or in the alternative, the parameters measured by at least some of sensor devices 165 are used to detect occupancy of one or more objects 160 in the volume of space 199.

In some cases, a sensor device 165 can be an integrated sensor. An integrated sensor has both the ability to sense and measure at least one parameter and the ability to communicate with another component (e.g., the communication device 190 of an object 160, a WAC 185) of the system 100a. In such a case, an integrated sensor device 165 can include one or more components (e.g., a control engine 106, a transceiver 124, a hardware processor 120) that are substantially similar to the corresponding components of the controller 104 discussed above. In certain examples, an integrated sensor device 165 can be a stand-alone component in the system 100a that is not integrated with an electrical device 102.

The communication capability of a sensor device 165 that is an integrated sensor can include one or more communication devices that are configured to communicate with, for example, the controller 104 of the electrical device 102-1, a WAC 185, and/or a controller (substantially similar to the controller 104 described herein) of another electrical device 102-N. For example, an integrated sensor device 165 can include a passive infrared (PIR) sensor, a transceiver that sends and receives signals using Zigbee, a receiver that receives signals using BLE, and a receiver that actively receives IR signals. In such a case, the PIR sensor measures IR light radiating from objects in its field of view, often for the purpose of detecting motion.

Each sensor device 165 (whether integrated or not) can use one or more of a number of communication protocols. This allows a sensor device 165 to communicate with one or more components (e.g., the controller 104, a communication device 190 of an object 160, a WAC 185, one or more other integrated sensor devices 165) of the system 100a. The communication capability of a sensor device 165 that is an integrated sensor can be dedicated to the sensor device 165 and/or shared with the controller 104 of the electrical device 102-1. When the system 100a includes multiple integrated sensor devices 165, one integrated sensor device 165 can communicate, directly or indirectly, with one or more of the other integrated sensor devices 165 in the system 100a.

Figure 23A:
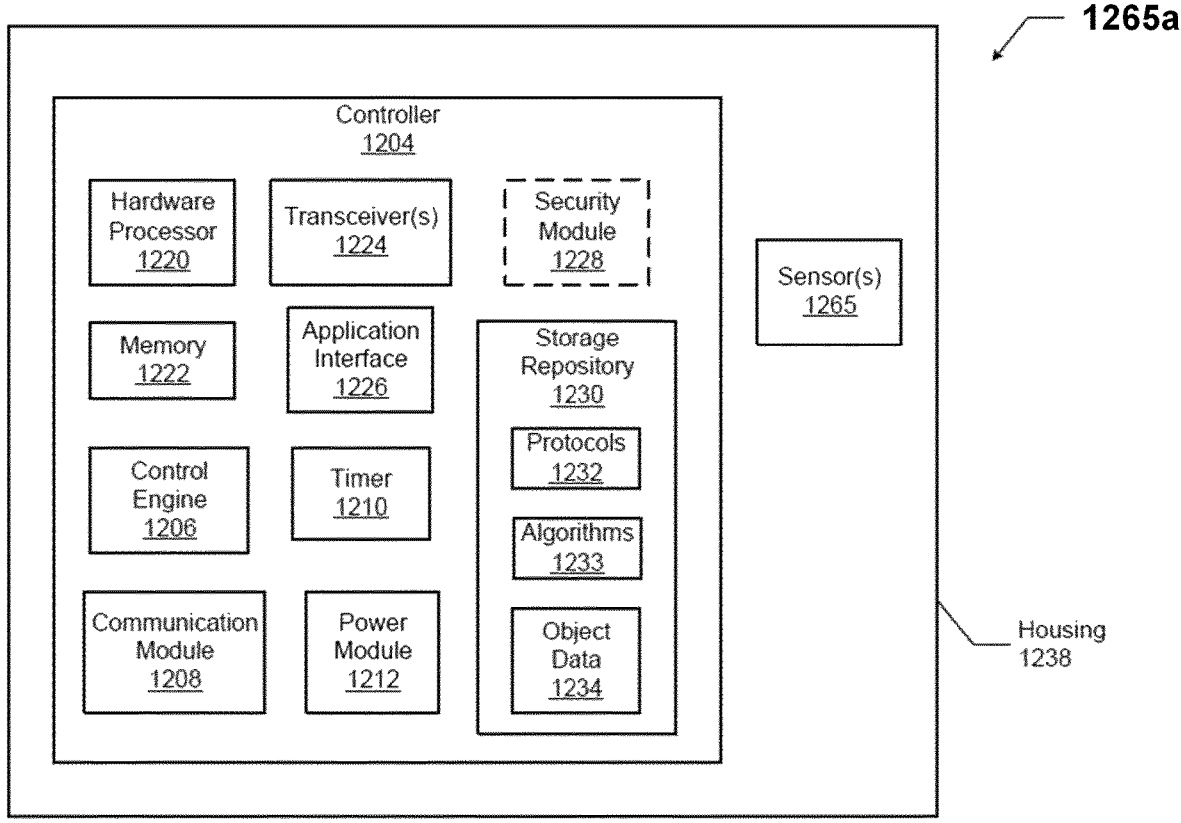
FIG. 23A shows a one example diagram of an integrated sensor module used for managing communication of electrical devices.

A sensor device 165 can be associated with the electrical device 102-1 and/or another electrical device 102 in the system 100a. A sensor device 165 can be located within the housing 103 of the electrical device 102-1, disposed on the housing 103 of the electrical device 102-1, or located outside the housing 103 of the electrical device 102-1. FIG. 23A below shows an example of an integrated sensor device that is independent of an electrical device 102.

In certain examples, a sensor device 165 can include an energy storage device (e.g., a battery) that is used to provide power, at least in part, to some or all of the sensor device 165. In such a case, the energy storage device can be the same as, or independent of, an energy storage device or other power supply 140 of the electrical device 102-1. The optional energy storage device of the sensor module 165 can operate at all times or when the power supply of the electrical device 102-1 is interrupted. Further, a sensor device 165 can utilize or include one or more components (e.g., memory 122, storage repository 130, transceiver 124)

found in the controller 104. In such a case, the controller 104 can provide the functionality of these components used by the sensor device 165. Alternatively, the sensor device 165 can include, either on its own or in shared responsibility with the controller 104, one or more of the components of the controller 104. In such a case, the sensor device 165 can correspond to a computer system as described below with regard to FIG. 15.

As discussed above, the electrical device 102 can include one or more optional antennae 175. An antenna 175 is an electrical device that converts electrical power to communication signals 195 (for transmitting) and communication signals 195 to electrical power (for receiving). In transmission, a radio transmitter (e.g., transceiver 124) supplies, through the optional switch 145 when multiple antenna 175 are involved, an electric current oscillating at radio frequency (i.e. a high frequency alternating current (AC)) to the terminals of the antenna 175, and the antenna 175 radiates the energy from the current as communication signals 195. In reception, an antenna 175, when included in the electrical device 102, intercepts some of the power of communication signals 195 in order to produce a tiny voltage at its terminals, that is applied to a receiver (e.g., transceiver 124), in some cases through an optional switch 145, to be amplified.

An antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse communication signal 195 (often an electromagnetic field wave). Conversely, during reception, the oscillating electric and magnetic fields of an incoming communication signal 195 exert force on the electrons in the body of the antenna 175, causing portions of the body of the antenna 175 to move back and forth, creating oscillating currents in the antenna 175.

In certain examples, an antenna 175 can be disposed at, within, or on any portion of the electrical device 102. For example, an antenna 175 can be disposed on the housing 103 of the electrical device 102 and extend away from the electrical device 102. As another example, an antenna 175 can be insert molded into a lens of the electrical device 102. As another example, an antenna 175 can be two-shot injection molded into the housing 103 of the electrical device 102. As yet another example, an antenna 175 can be adhesive mounted onto the housing 103 of the electrical device 102. As still another example, an antenna 175 can be pad printed onto a circuit board within the cavity 101 formed by the housing 103 of the electrical device 102. As yet another example, an antenna 175 can be a chip ceramic antenna that is surface mounted. As still another example, an antenna 175 can be a wire antenna.

When there are multiple antennae 175 (or other forms of multiple communication points) as part of the electrical device 102, there can also be an optional switch 145, which allows for selection of one communication point at a given point in time. In such a case, each antenna 175 can be electrically coupled to the switch 145, which in turn is electrically coupled to the transceiver 124. The optional switch 145 can be a single switch device or a number of switch devices arranged in series and/or in parallel with each other. The switch 145 determines which antenna 175 is coupled to the transceiver 124 at any particular point in time. A switch 145 can have one or more contacts, where each contact has an open state (position) and a closed state (position).

In the open state, a contact of the switch 145 creates an open circuit, which prevents the transceiver 124 from delivering a communication signal 195 to or receiving a communication signal 195 from the antenna 175 electrically coupled to that contact of the switch 145. In the closed state, a contact of the switch 145 creates a closed circuit, which allows the transceiver 124 to deliver a communication signal 195 to or receive a communication signal 195 from the antenna 175 electrically coupled to that contact of the switch 145. In certain examples, the position of each contact of the switch 145 is controlled by the control engine 106 of the controller 104.

If the switch 145 is a single device, the switch 145 can have multiple contacts. In any case, only one contact of the switch 145 can be active (closed) at any point in time in certain examples. Consequently, when one contact of the switch 145 is closed, all other contacts of the switch 145 are open in such examples.

Figure 15:
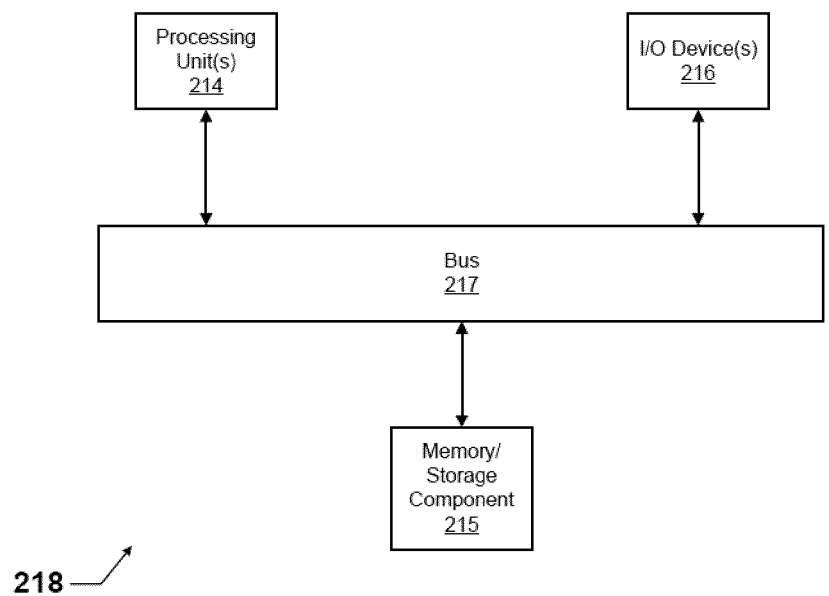
FIG. 15 shows a computing device in accordance with one example.

FIG. 15 illustrates one embodiment of a computing device 218 that implements one or more of the various techniques described herein, and which is representative, in whole or in part, of the elements described herein pursuant to certain exemplary examples. For example, computing device 218 can be implemented in the electrical device 102-1 of FIG. 14A in the form of the hardware processor 120, the memory 122, and the storage repository 130, among other components. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth). One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, or any other similar type of network) via a network interface connection (not shown) according to some exemplary examples. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary examples. Generally speaking, the computer system 218 includes at least the minimal processing, input, and/or output means necessary to practice one or more examples.

Further, those skilled in the art will appreciate that one or more elements of the aforementioned computer device 218 is located at a remote location and connected to the other elements over a network in certain exemplary examples. Further, one or more examples is implemented on a distributed system having one or more nodes, where each portion of the implementation (e.g., control engine 106) is located on a different node within the distributed system. In one or more examples, the node corresponds to a computer system. Alternatively, the node corresponds to a processor with associated physical memory in some exemplary examples. The node alternatively corresponds to a processor with shared memory and/or resources in some exemplary examples.

Figure 16:
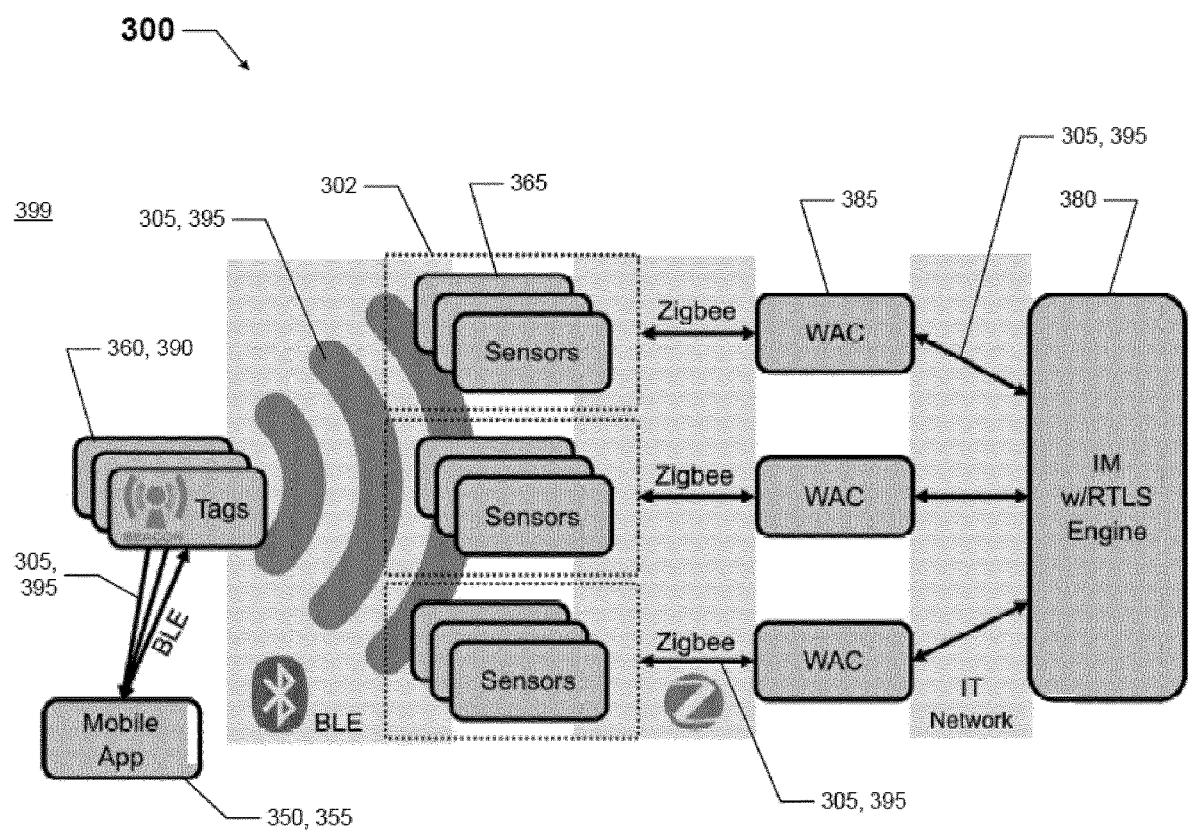
FIG. 16 shows a diagram of another system in accordance with a further example.

FIG. 16 shows a diagram of another RTLS system 300 in accordance with certain examples. Referring to FIG. 14A, FIG. 15, and FIG. 16, the RTLS system 300 includes a user 350 with a user system 355, multiple objects 360 each having an optional communication device 390 (in this case called a tag), a number of electrical devices 302 each having one or more sensor devices 365, three WACs 385, and a network manager 380 (in this case called an insight manager (IM) with a RTLS engine). Each of these components of the system 300 of FIG. 16 can be substantially the same as the corresponding component of the RTLS system 100a of FIG. 14A. For example, each sensor device 365 can be configured to detect occupancy and can include a Zigbee-enabled transceiver, a BLE-enabled receiver, a PIR sensor, and an active IR receiver.

In this particular case, the communication devices 390 of the objects 360 are the physical entities that are tracked by the RTLS system 300. From the perspective of a user 350, each communication device 390 is associated with an object 360. In this example, the communication devices 390 use BLE (a form of communication link 305 to "beacon" communication signals 395 at a certain rate. A beacon is a broadcast message that, at a minimum, identifies the object 360 associated with the sending communication device 390. The integrated sensor device 365 receives these communication signals 395 over the BLE-enabled communication links 305 and detects occupancy by the object 360 in the volume of space 399 based on data included in the communication signal 395.

This occupancy information is the key piece of data in a communication signal 390 that allows a controller of an electrical device 302, a WAC 385, and/or network manager 380 to manage, in real time, the communication network of the system 300. As used herein, "real time" refers to a user's perspective of the system and means that occupancy can be detected within the time in which the signals are transmitted and processed, such as a few milliseconds to within a few seconds, which time is virtually real time from the user's perspective. Integrated sensor devices 365 communicate with one or more controllers 385 (in this example, WACs 385) using Zigbee-enabled communication links 305. In this case, an integrated sensor device 365 is a Zigbee-enabled device as well as a BLE-enabled device, and so a sensor device 365 can be paired with a single WAC 385.

Communications between a sensor device 365 and a WAC 385 can be limited by one or more of a number of factors. For example, the bandwidth by existing Zigbee (or other communication method) protocols for the communication link(s) 305 between the sensor device 365 and the WAC 385 can limit communications capability. As another example, the capability (e.g., messages per second) of the WAC 385 can limit communications capability. As yet another example, the overall communication activity on the Zigbee-enabled communication links 305, involving all sensor device 365 and WACs 385 at a given point in time, can limit communications capability. With all of these potential constraints, intelligent use of the Zigbee-enabled communication links 305 is fundamental to the success of the RTLS system 300, and so examples manage how often communications are transmitted within the system 300 based on whether occupancy by an object 360 within the volume of space 399 is detected.

The WACs 385, upon receiving the signals from the sensor devices 365 on the Zigbee-enabled communication links 305, send the occupancy information at a rate determined by a component (e.g., the network manager 380) of the system 300 in real time. The network manager 380 (or other component of the system 300) can store this information and use it for trending analysis, predictive analysis, and/or any other analysis that may be useful.

Figure 4B:
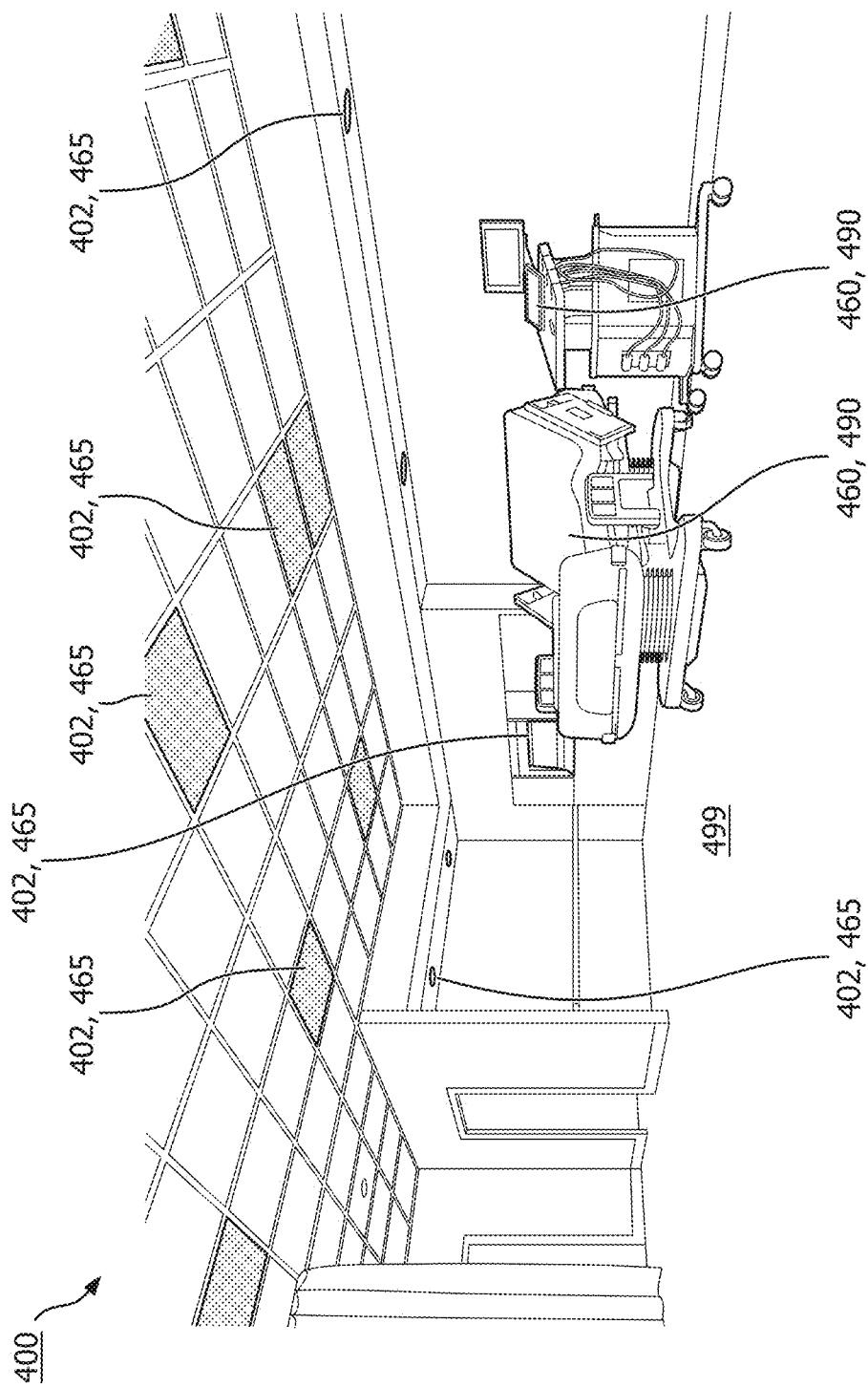
FIG. 4B illustrates a lighting and location system according to another example.

FIG. 4B shows a lighting system 400 that can be used for real-time location of an object 460 in accordance with certain examples. Referring to FIG. 14A, FIG. 15 and FIG. 16, the lighting system 400 includes a number of electrical devices 402, principally in the form of light fixtures, located in a volume of space 499 that includes a hospital room. A lighting system provides unique advantages for implementing an example RTLS because the density of the electrical devices (light fixtures) supports a dense network of sensors for locating and tracking objects. Of the electrical devices 402 that are light fixtures, there are seven troffer light fixtures and five down can light fixtures disposed in the ceiling. There is also an electrical device 402 in the form of a computer monitor. In this case, each electrical device 402 includes a sensor device 465, substantially similar to the sensor devices 165 discussed above. There is also a single object 460 (a human being in this case) shown in FIG. 4B. The object 460 in this case does not include a communication device (such as communication device 190).

FIG. 5B shows a lighting system 500 that can be used for real-time location of an object 560 in accordance with certain examples. Referring to FIG. 4B, FIG. 5B, FIG. 14A, FIG. 15, FIG. 16, the lighting system 500 includes a number of electrical devices 502, principally in the form of light fixtures, located in a volume of space 599 that includes a manufacturing facility. Of the electrical devices 502 that are light fixtures, there are at least 56 Hi-Bay light fixtures suspended from the ceiling and at least 30 work stations located on the floor. In this case, each electrical device 502 includes a sensor device 565, substantially similar to the sensor devices 165 discussed above. There is also an object 560 shown in FIG. 5B that is in the form of a cart. The object 560 in this case is a person that includes a communication device 590 (e.g., an employee badge) that is capable of communicating with the sensor devices 565.

Figure 17A:
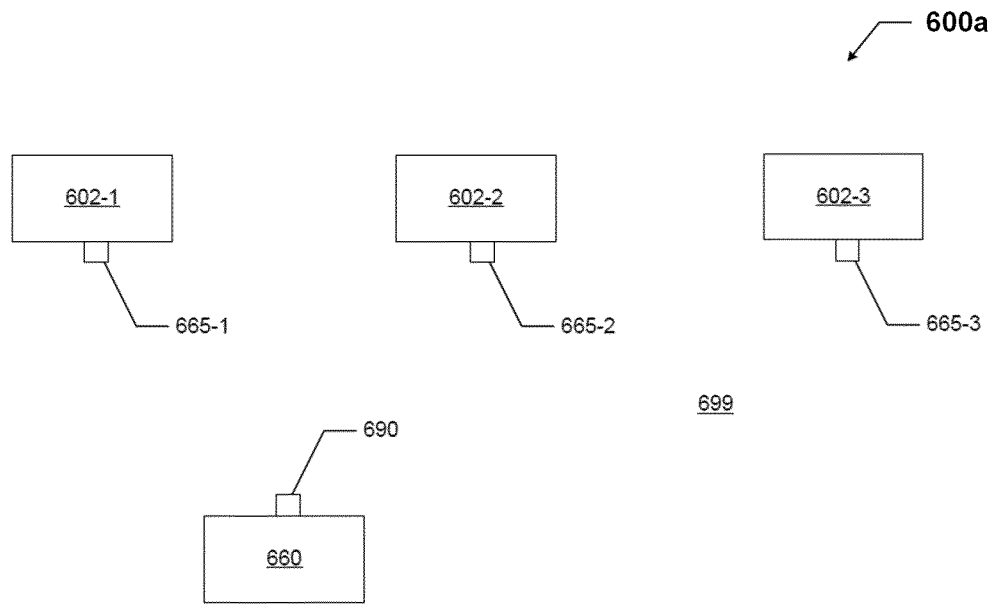
FIGS. 17A and 17B show a side and top view, respectively, of a system in which an object is located in a volume of space.
Figure 17B:
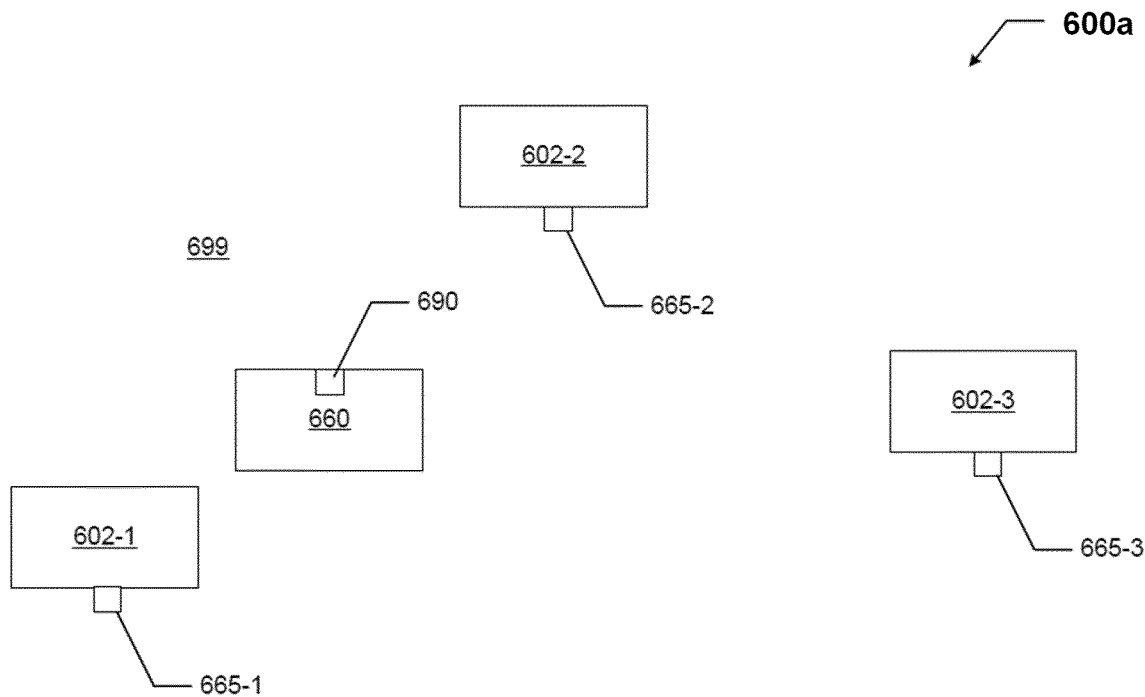

FIG. 17A and FIG. 17B show a side and top view, respectively, of a system 600a in which an object 660 (including its corresponding communication device 690) is located in volume of space 699 in accordance with certain examples. Referring to FIG. 4B and FIG. 5B, FIG. 14A through FIG. 17B, also located in the volume of space 699 of FIG. 17A and FIG. 17B are three light fixtures 602 (specifically, light fixture 602-1, light fixture 602-2, and light fixture 602-3), where the light fixtures 602 are types of electrical devices 102 of FIG. 14A. As discussed above, the volume of space 699 can be of any size and/or in any location. For example, the volume of space 699 can be one or more rooms in an office building.

As shown in FIG. 17A and FIG. 17B, all of the light fixtures 602 can be located in the volume of space 699. Alternatively, one or more of the light fixtures 602 can be located outside the volume of space 699, as long as the communication signals 195 sent by the transceiver (e.g., transceiver 124) of the light fixture 602 are received by the communication device 690 of the object 660, and as long as the communication signals sent by the communication device 690 of the object 660 are received by the transceiver of the corresponding light fixture 602, as applicable.

Each of the light fixtures 602 can include one or more sensor devices 665. In this example, light fixture 602-1 includes sensor device 665-1, light fixture 602-2 includes sensor device 665-2, and light fixture 602-3 includes sensor device 665-3. Such sensor devices 665 can include one or more components. For example, each of the sensor devices 665 of the light fixtures 602 of FIG. 17A and FIG. 17B can include a Zigbee-enabled transceiver, a BLE-enabled receiver, a PIR sensor, and an active IR receiver. In such a case, the BLE-enabled receiver of the sensor device 665, whether on its own or in conjunction with the controller (e.g., controller 104) of the light fixture 602, can determine the signal strength of the communication signals 195 (e.g., RF signals) received from the communication device 690 of the object 660.

If the sensor devices 665 of the light fixtures 602 are used to communicate with the communication device 690 of the object 660, then it is the sensor devices 665 that have the broadcasts ranges 782. In such a case, sensor device 665-1 of light fixture 602-1 has broadcast range 782-1 inside of which the sensor device 665-1 broadcasts communication signals (e.g., RF signals). Similarly, sensor device 665-2 of light fixture 602-2 has broadcast range 782-2 inside of which the sensor device 665-2 broadcasts signals, and sensor device 665-3 of light fixture 602-3 has broadcast range 782-3 inside of which the sensor device 665-3 broadcasts signals.

Figure 18:
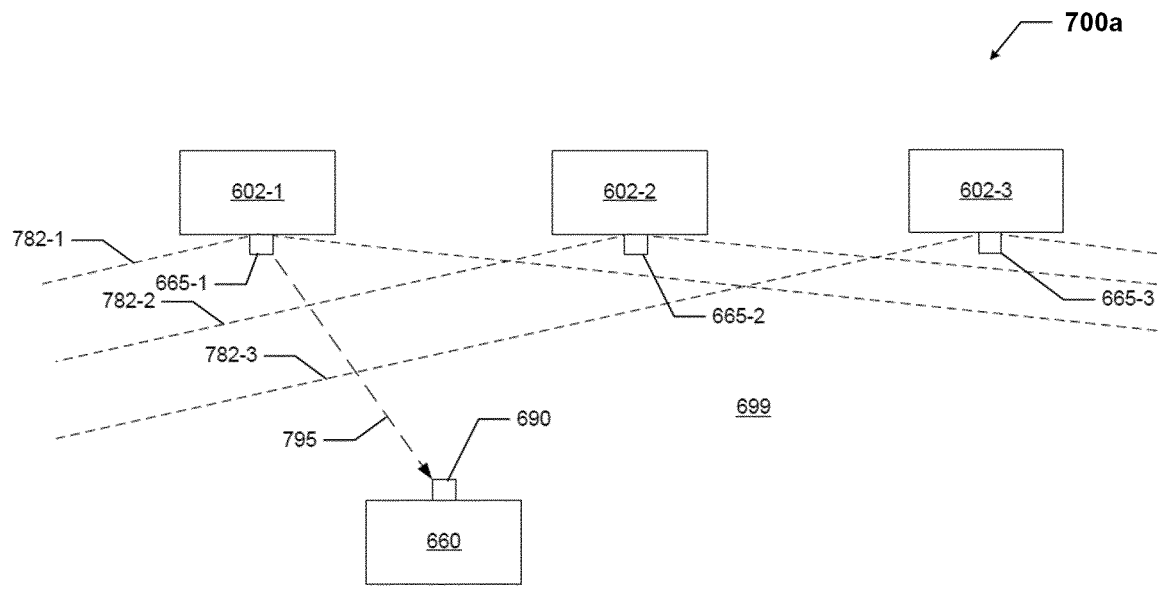
FIG. 18 shows the system of FIGS. 17A and 17B when a signal is sent by one of the light fixtures.

FIG. 18 shows the system 700a of FIG. 17A and FIG. 17B when a RF signal 795 is sent by one of the light fixtures 602 in accordance with certain examples. Referring to FIG. 14A through FIG. 18, light fixture 602-1 broadcasts a RF signal 795. Each light fixture 602 has a broadcast range 782. In this case, light fixture 602-1 has broadcast range 782-1, light fixture 602-2 has broadcast range 782-2, and light fixture 602-3 has broadcast range 782-3. Since the communication device 690 of the object 660 is located within the broadcast range 782-1 for light fixture 602-1, the communication device 690 of the object 660 receives communication signal 795.

In the event that the sensor devices 665 are used to communicate with the communication device 690 of the object 660, sensor device 665-1 can have broadcast range 782-1. In such a case, sensor device 665-1 can send (e.g., broadcast) communication signal 795 into the volume of space 699, and the communication device 690 of the object 660 receives the communication signal 795 because the communication device 690 of the object 660 is within the broadcast range 782-1. The communication signal 795 can be sent, as an example, using BLE.

Figure 19:
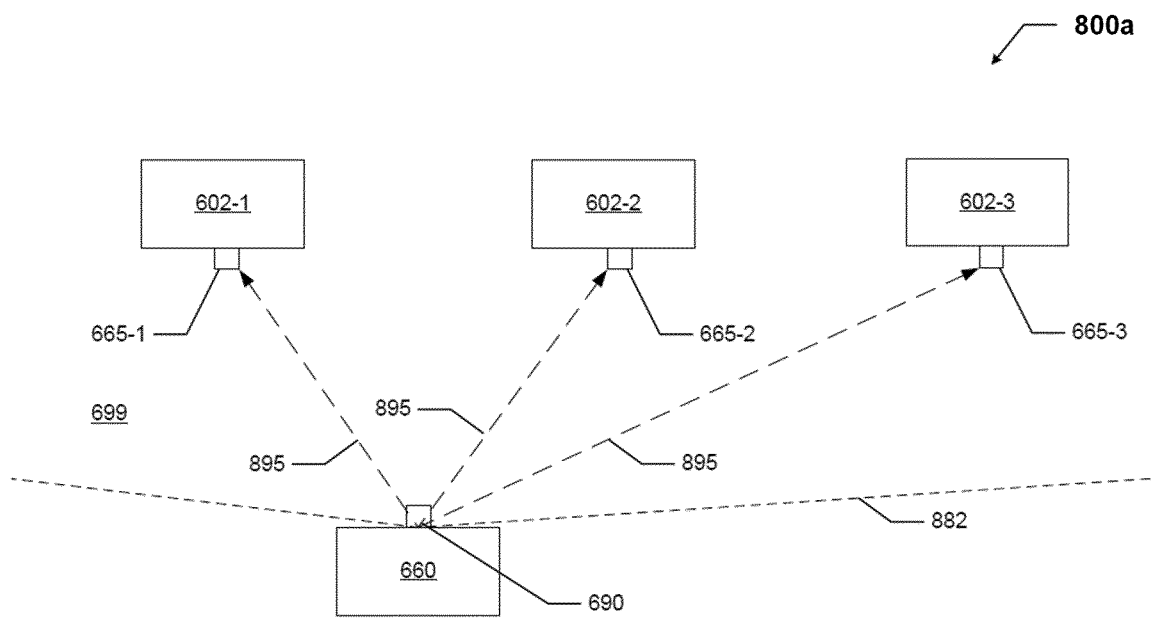
FIG. 19 shows the system of FIGS. 17A and 17B when a signal is sent by the object.

FIG. 19 shows the system 800a of FIG. 17A through FIG. 17B when another communication signal 895 is sent by the communication device 690 of the object 660 in accordance with certain examples. Referring to FIG. 14A through FIG. 19, the communication signal 895 sent by the communication device 690 of the object 660 can be in response to the communication signal 795 sent by light fixture 602-1, as shown in FIG. 18. Alternatively, the communication device 690 of the object 660 can send the communication signal 895 independent of any other component (e.g., a light fixture 602) or factor. As discussed above, the communication signal 895 broadcast by the communication device 690 of the object 660 can include the UUID of the object 660 (or portion thereof) as well as other code, such as, for example, identifying information of the light fixture 602-1 that sent the communication signal 795. By being able to identify the object 660, the controller of the light fixtures 602 can determine that the object 660 is a person, thereby establishing occupancy.

The communication device 690 of the object 660 has a broadcast range 882, and all three of the light fixtures 602 are located within the broadcast range 882 of the communication device 690 of the object 660. As a result, as shown in FIG. 19, all three of the light fixtures 602 receive the communication signal 895 broadcast by the communication device 690 of the object 660. When each light fixture 602 receives the communication signal 895 broadcast by the communication device 690 of the object 660, that light fixture 602 can measure the signal strength (e.g., the RSSI value) of the communication signal 895, for example to establish the location of the object 660 in the volume of space 699.

As discussed above, in the event that the sensor devices 665 are used to communicate with the communication device 690 of the object 660, sensor device 665-1, sensor device 665-2, and sensor device 665-3 can each receive the communication signal 895 broadcast by the communication device 690 of the object 660 because sensor device 665-1, sensor device 665-2, and sensor device 665-3 area all within the broadcast range 882 of the communication device 690 of the object 660. The communication signal 895 can be sent, as an example, using BLE.

Figure 20A:
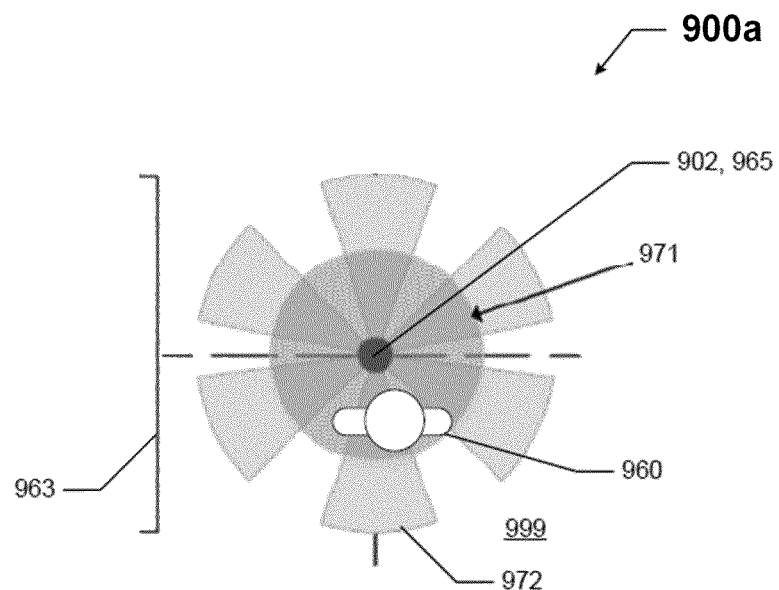
FIGS. 20A and 20B show a top view and a side view, respectively, of a sensor device that can used for detecting occupancy in a volume of space.
Figure 20B:
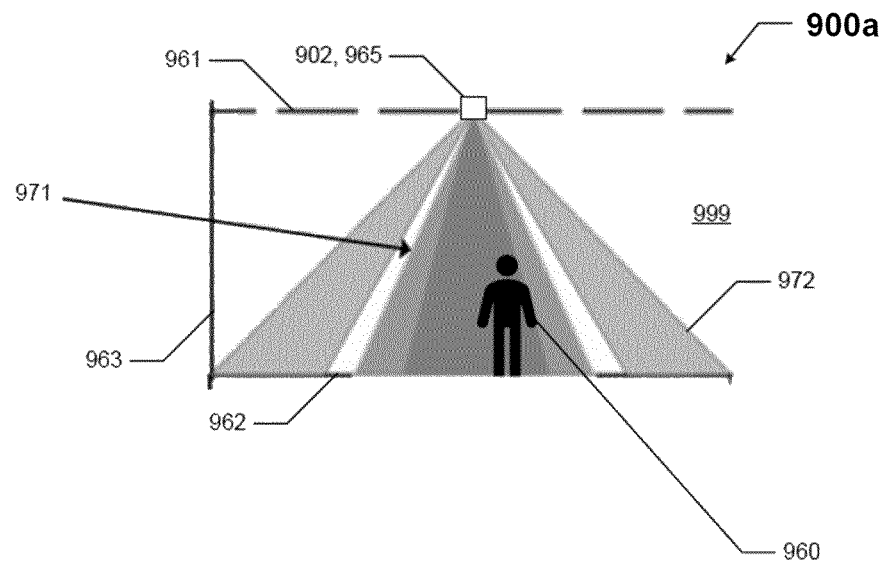

FIG. 20A and FIG. 20B show a top view and a side view, respectively, of part of a system 900*a* used for detecting occupancy in a volume of space 999 in accordance with certain examples. Referring to related figures, the part of the system 900*a* of FIG. 20A and FIG. 20B has a single electrical device 902 (e.g., a light fixture mounted on a ceiling 961) and a single object 960 in a volume of space 999. The electrical device 902 is part of a larger integrated network of electrical devices, such as what is shown and described above with respect to FIG. 14A, FIG. 16, FIG. 4B, and FIG. 5B. In this case, the electrical device 902 includes an integrated sensor device 965 that has (or shares with the controller of the electrical device 902) a Zigbee-enabled transceiver, a BLE-enabled receiver, and an active IR receiver. The sensor device 965 can also include a PIR sensor. In alternative examples, the sensor device 965 can be a stand-alone device.

The method used to establish occupancy by the object 960 in this case reduces communications traffic on the communication links (e.g., communication links 105) between the integrated sensor device 965 and a WAC (not shown in FIG. 20A and FIG. 20B, but substantially similar to the WAC 185 discussed above) and/or between other components in the system 900*a*. The PIR sensor of the integrated sensor device 965 (or any other sensor included with the sensor device 965) can have any of a number of configurations. For example, in this case, the PIR sensor of the sensor device 965 has a sensing range 972, which is somewhat similar to the broadcast ranges 682 discussed above in that the sensing range 972 defines the scope within the volume of space 999 in which the PIR sensor can measure passive infrared signals.

A method for tracking that is computationally light and also lower-impact to the ZigBee network (or other type of communication network) between the sensor device 965 and a WAC (e.g., WAC 185) is to push as much of the location computation as far down (toward the sensor device 965) the system 900*a* as possible. For example, as in this case, the integrated sensor device 965 can determine whether or not the object 960 is occupying a space within a certain proximity to the sensor device 965. In such a case, the sensor device 965 needs to send a status message more frequently to the WAC indicating that occupancy by the object 960 is detected by the sensor device 965. This proximity area is called the RTLS occupancy zone 971.

The RTLS occupancy zone 971 is located within the sensing range 972 of the PIR sensor of the sensor device 965. Unlike the sensing range 972 of the PIR sensor, the RTLS occupancy zone 971 is designed to be smaller and only minimally overlap with a corresponding RTLS occupancy zone of a PIR sensor of a neighboring sensor (not shown in FIG. 20A and FIG. 20B). The RTLS occupancy zone 971 is updated at a fast rate and generally detects very recent motion within a constrained physical area very close in proximity to the PIR sensor of the sensor device 965.

If the object 960 is within the RTLS occupancy zone 971 as well as the sensing range 972, then examples can increase the reporting rate by the sensor module 965 as to occupancy of the volume of space 999 by the object 960. Alternatively, if the object 960 is not within the RTLS occupancy zone 971, but is rather only within the sensing range 972, then examples can decrease or maintain the reporting rate by the sensor module 965 as to occupancy of the volume of space 999 by the object 960.

Effectively, a sensor device 965 that has not detected the object 960 (e.g., occupancy) for some period of time can be directed to decrease its reporting rate as to occupancy. Some level of "heartbeat" must be maintained for stationary objects 960. The method outlined above can be useful for objects 960 that move within the volume of space 999. The result is a zonal system which relies on the sensor devices 965 to report whether or not an object 960 is within a certain zone in the volume of space 999, rather than a system that has all of the sensor devices 965 constantly report, which requires large amounts of data to be processed farther up the network (e.g., by a WAC, by the network manager).

In some cases, occupancy information can be used at the application layer (e.g., by the sensor devices 965) to disallow reporting moving objects 960 in volumes of space 999 (or portions thereof) that are not occupied. In alternative examples, occupancy data, as generated by the sensor devices 965, can be collected by the WACs, which can subsequently send the occupancy data continually to the network manager. In such a case, since such messages can be time-stamped, the occupancy indicator bit of those messages would convey whether occupancy has been detected within some period of time (e.g., within the last 5 seconds).

Figure 21A:
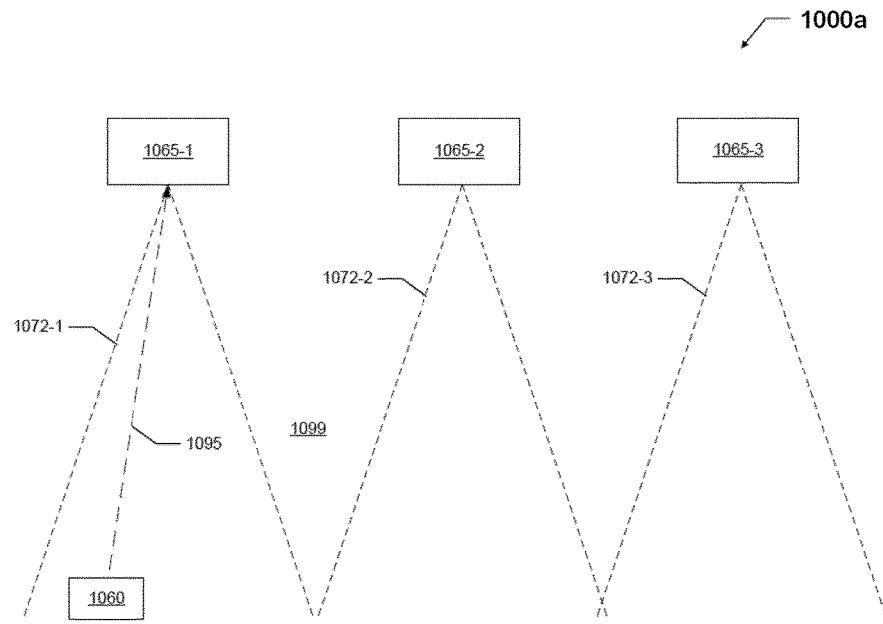
FIG. 21A shows another system in which occupancy is detected in a volume of space.

FIG. 21A shows another system 1000*a* in which occupancy is detected in a volume of space 1099 in accordance with certain examples. Referring to FIG. 14A, FIG. 4B, FIG. 5B, FIG. 15 through FIG. 19, FIG. 20A, FIG. 20B, FIG. 21A, the volume of space 1099 of FIG. 21A has disposed therein three sensor devices 1065 (specifically, sensor device 1065-1, sensor device 1065-2, and sensor device 1065-3), where each sensor device includes a PIR sensor. As discussed above, the volume of space 1099 can be of any size and/or in any location. For example, the volume of space 1099 can be a room in a museum.

In this case, the sensor devices 1065 are integrated (e.g., have the functionality of a controller 104), and so the sensor devices 1065 are types of electrical devices (e.g., electrical device 102) in this example. The PIR sensor of each sensor device 1065 has a sensing range 1072, as with the sensing ranges discussed above with respect to FIG. 20A and FIG. 20B. The sensing range 1072 defines the scope within the volume of space 1099 in which the PIR sensor can measure passive infrared signals that can emit from the object 1060. Sensor device 1065-1 has sensing range 1072-1, sensor device 1065-2 has sensing range 1072-2, and sensor device 1065-3 has sensing range 1072-3.

In this case, the object 1060 is located in the volume of space 1099 within the sensing range 1072-1 of sensor device 1065-1, but outside sensing range 1072-2 of sensor device 1065-2 and outside of sensing range 1072-3 of sensor device 1065-3. In this case, to detect occupancy by the object 1060, the PIR sensor of sensing device 1065-1 detects infrared radiation emitted by the object 1065, where the infrared radiation can be considered a type of communication signal 1095. Detection of infrared radiation by the PIR sensor of the sensing device 1065-1 indicates that there is occupancy within the sensing range 1072-1, but without additional information, identification and the specific location of the object 1060 cannot be obtained by sensor device 1065-1.

In this case, sensing device 1065-1 reports occupancy in the volume of space 1099, while sensing device 1065-2 and sensing device 1065-3 report no occupancy in the volume of space 1099. Examples can operate in one of a number of ways. For example, the controller of each sensing device 1065 can know whether to increase, maintain, or decrease its reporting of occupancy to the next-highest component (e.g., a WAC 185, the network manager 180) in the system 1000a. As another example, the controller of each sensing device 1065 can receive instructions from the next-highest component in the system 1000a as to whether to increase, maintain, or decrease its reporting of occupancy.

Figure 21B:
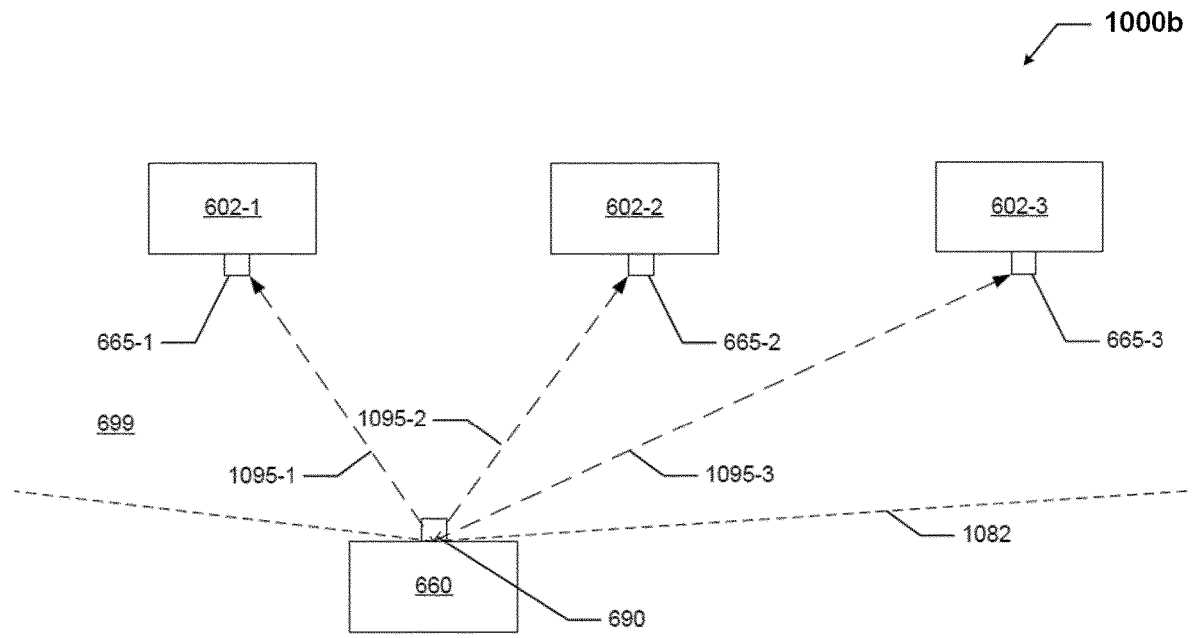
FIG. 21B shows the system of FIG. 17A through FIG. 19 where the frequency of the RF signals sent by the object are optimized in accordance with certain examples.
Figure 22A:
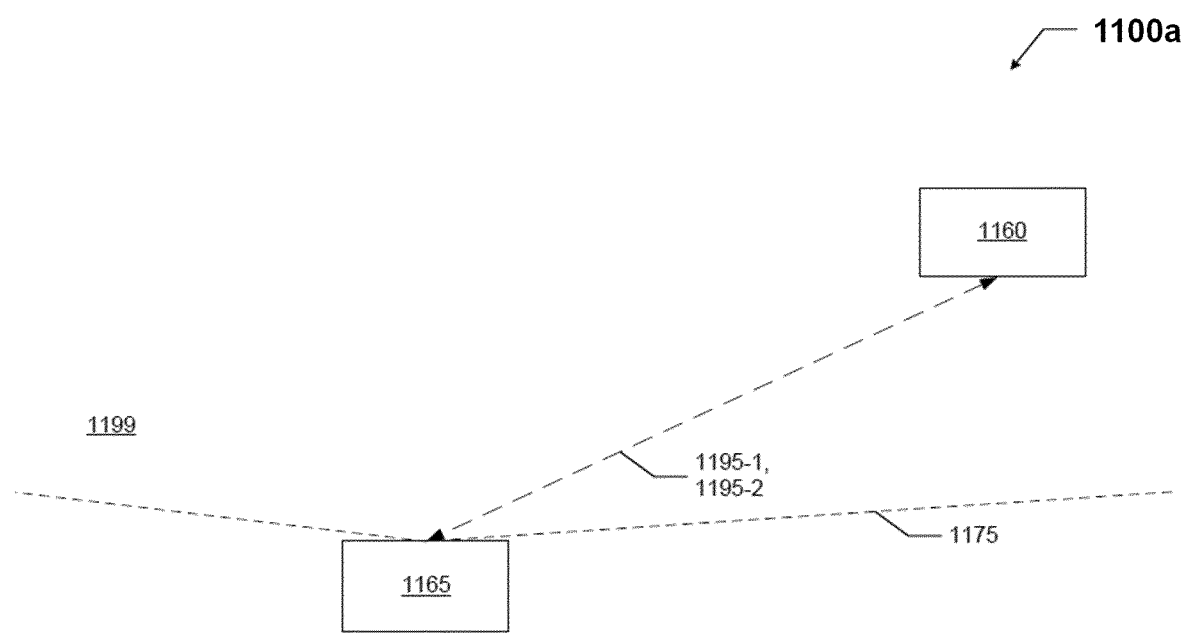
FIG. 22A shows yet another system in which occupancy is detected in a volume of space.

FIG. 22A shows yet another system 1100a in which occupancy is detected in a volume of space 1199 in accordance with certain examples. Referring to FIG. 14A through FIG. 22A, the volume of space 1199 of FIG. 22A has disposed therein one sensor devices 1165, which is an ultrasonic sensor. As discussed above, the volume of space 1199 can be of any size and/or in any location. For example, the volume of space 1199 can be a production floor at a factory.

In this case, the sensor device 1165 is integrated (e.g., includes the functionality of a controller 104), and so the sensor device 1165 is a type of electrical devices (e.g., electrical device 102) in this example. The ultrasonic sensor of the sensor device 1165 has a sensing range 1172, as with the sensing ranges discussed above. The sensing range 1172 defines the scope within the volume of space 1199 in which the ultrasonic sensor can emit ultrasonic sound waves (a type of communication signal 1095-1) and subsequently receive after bouncing off of the object 1160. By measuring the speed of the returning ultrasonic sound wave (a type of communication signal 1095-2), the sensor device 1165 can detect occupancy by the object 1160 in the volume of space.

While measuring the speed of the returning ultrasonic sound wave 1095-2 can indicate that there is occupancy within the sensing range 1072-1, without additional information, identification and the specific location of the object 1160 in the volume of space 1199 cannot be obtained by the sensor device 1165. As discussed above, the reporting rate of occupancy by the sensor device 1165 can be increased because occupancy is currently detected by the sensor module 1165.

FIG. 23A shows a diagram of an integrated sensor module 1265 in accordance with certain examples. The integrated sensor module 1265 of FIG. 23A can include one or more of a number of components. Such components, can include, but are not limited to, a controller 1204 (which can include, for example, a control engine 1206, a communication module 1208, a timer 1210, a power module 1212, a storage repository 1230, a hardware processor 1220, a memory 1222, one or more transceivers 1224, an application interface 1226, and, optionally, a security module 1228) and one or more sensors 1239. The components shown in FIG. 23A are not exhaustive, and in some examples, one or more of the components shown in FIG. 23A may not be included in an example integrated sensor device 1265. Any component of the example integrated sensor device 1265 can be discrete, combined with one or more other components of the integrated sensor device 1265, and/or shared with the controller 104 of the electrical device 102-1 associated with the integrated sensor device 1265.

The controller 1204, the control engine 1206, the communication module 1208, the timer 1210, the power module 1212, the storage repository 1230 (which can include protocols 1231, algorithms 1232, and object data 1234), the hardware processor 1220, the memory 1222, the one or more transceivers 1224, the application interface 1226, and the security module 1228 can be substantially the same as the corresponding components of the controller 104 discussed above with respect to FIG. 14A. In the case of the power module 1212 of the integrated sensor device 1265, the power module 1212 can be substantially the same as, at least in part, the power module 112 and/or the power supply 140 of the electrical device 102-1. Each of the one or more sensors 1239 of the integrated sensor device 1265 are the components that actually measure one or more parameters. An example of a sensor 1239 is a PIR sensor. Each component of the integrated sensor device 1265 can be disposed within, on, or external from a housing 1238 of the integrated sensor device 1265.

Figure 24:
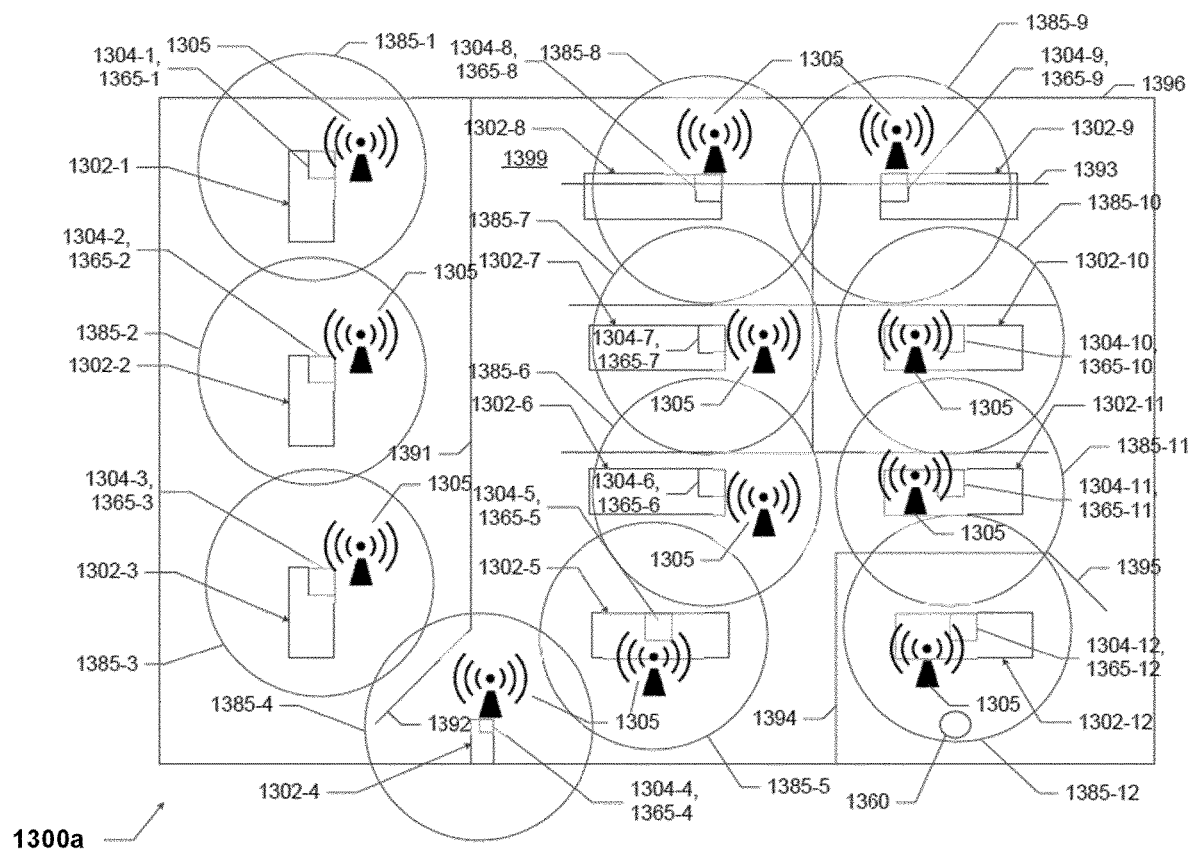
FIG. 24 shows a system of multiple electrical devices used for locating an object in a volume of space.

FIG. 24 shows a system of multiple electrical devices used for locating an object in a volume of space 1399 in accordance with certain examples. Specifically, FIG. 24 shows a system 1300a that includes a number of interconnected electrical devices 1302. Referring to FIG. 14A through 13, the system 1300a of FIG. 24 includes twelve electrical devices 1302, where each electrical device 1302 of FIG. 24 is a type of light fixture, such as the light fixture (electrical device 302) of FIG. 16. Specifically, the system 1300a includes light fixture 1302-1, light fixture 1302-2, light fixture 1302-3, light fixture 1302-4, light fixture 1302-5, light fixture 1302-6, light fixture 1302-7, light fixture 1302-8, light fixture 1302-9, light fixture 1302-10, light fixture 1302-11, and light fixture 1302-12. In this case, light fixture 1302-4 is an exit light, and the other 11 light fixtures of FIG. 24 are troffer lights.

Each electrical device 1302 in the system 1300a of FIG. 24 includes a sensor device 165 that detects occupancy. Specifically, in this example, light fixture 1302-1 includes a controller 1304-1 and sensor device 1365-1. Light fixture 1302-2 includes a controller 1304-2 and a sensor device 1365-2. Light fixture 1302-3 includes a controller 1304-3 and sensor device 1365-3. Light fixture 1302-4 includes a controller 1304-4 and sensor device 1365-4. Light fixture 1302-5 includes a controller 1304-5 and sensor device 1365-5. Light fixture 1302-6 includes a controller 1304-6 and sensor device 1365-6. Light fixture 1302-7 includes a controller 1304-7 and sensor device 165-7. Light fixture 1302-8 includes a controller 1304-8 and sensor device 1365-8. Light fixture 1302-9 includes a controller 1304-9 and sensor device 1365-9. Light fixture 1302-10 includes a controller 1304-10 and sensor device 1365-10. Light fixture 1302-11 includes a controller 1304-11 and sensor device 1365-11. Light fixture 1302-12 includes a controller 1304-12 and sensor device 1365-12.

Each electrical device 1302 includes its own controller 1304, and each electrical device 1302 includes a sensor device 1365. In alternative examples, a sensor device 1365 can be an integrated sensor that includes its own controller (e.g., controller 1304). Each controller 1304 includes a transceiver that uses a wireless communication link 1305. The sensor of each sensor device 1365 has a range 1385 (e.g., 10 meters) that defines a maximum volume within the volume of space 1399 in which the sensor can detect occupancy within the volume of space. Each range 1385 is a portion of the volume of space 1399. Specifically, the sensor of sensor device 1365-1 has range 1385-1, the sensor of sensor device 1365-2 has range 1385-2, sensor of sensor device 1365-3 has range 1385-3, the sensor of sensor device 1365-4 has range 1385-4, the sensor of sensor device 1365-5 has range 1385-5, the sensor of sensor device 1365-6 has range 1385-6, the sensor of sensor device 1365-7 has range 1385-7, the sensor of sensor device 1365-8 has range 1385-8, the sensor of sensor device 1365-9 has range 1385-9, the sensor of sensor device 1365-10 has range 1385-10, the sensor of sensor device 1365-11 has range 1385-11, and the sensor of sensor device 1365-12 has range 1385-12. A sensor device 1365 can communicate with a controller 1304 of an associated electrical device 1302, and the controller 1304 of that electrical device 1302 can communicate with a controller 1304 of another electrical device 1302 and/or a WAC (not shown in FIG. 24) and/or a network manager (not shown in FIG. 24).

In this example, range 1385-1 intersects range 1385-2, which intersects range 1385-3, which intersects range 1385-4, which intersects range 1385-5, which intersects range 1385-6, which intersects range 1385-7, which intersects range 1385-8, which intersects range 1385-9, which intersects range 1385-10, which intersects range 1385-11, which intersects range 1385-12. As shown in FIG. 24, three is a slight overlap between adjacent ranges 1385 to provide coverage for substantially all of the volume of space 1399.

The electrical devices 1302 (including the associated sensor devices 13650 of the system 1300a of FIG. 24 are located within a volume of space 1399. A volume of space 1399 can be any interior and/or exterior space in which one or more electrical devices of the system 1300a can be located. In this case, the volume of space 1399 is part of an office space that is defined by exterior walls 1396 that form the outer perimeter of the volume of space 1399. The volume of space 1399 in this case is divided into a number of areas. For example, a wall 1391 and a door 1392 separate a hallway (in which light fixture 1302-1, light fixture 1302-2, and light fixture 1302-3 are located) from a work space (in which the remainder of the light fixtures 1302 are located). A small office, defined by wall 1394 and door 1395, and in which light fixture 1302-12 is located, subdivides the work space within the volume of space 1399. Light fixture 1302-4, the exit sign, is located above the door 1392 within the work space. A number of cubicle walls 1393 are located within the work space. The communication links 1305, as in this case using radio frequency waves, can be capable of having a range (not shown) that extend beyond a wall, door, or other boundary within the volume of space 1399.

The system 1300a also includes an object 1360 (in this case, a human being). The object 1360 is located in the volume of space 1399, and more specifically in the small office within the work space within the range 1385-12 of sensor device 1365-12. Depending on the technology (e.g., PIR, ultrasonic wave) of the sensor of the sensor device 1365-12, the sensor of the sensor device 1365-12 can detect occupancy of that portion of the volume of space 1399 by the object 1360. Conversely, since the object 1360 is not located within the range 1385 of the sensors of any of the other sensor devices 1365 (specifically, sensor device 1365-1 through sensor device 1365-11), none of these other sensor devices 1365 can detect occupancy of the volume of space by the object 1360.

Since the object 1360 is the only one in the volume of space at the time captured by FIG. 24, sensor device 1365-1 through sensor device 1365-11 report no occupancy, and sensor device 1365-12 reports occupancy in the volume of space 1399 by the object 1360. As a result, to better utilize the limited bandwidth of the communication links 1305 in the system, a controller (e.g., controller 1304-12, a WAC (e.g., WAC 185) that communicates with all of the controllers 1304 of FIG. 24, a network manager (e.g., network manager 180 that communicates with all of the controllers 1304 of FIG. 24) can manage the rate of reporting of each controller 1304 based on the detection of occupancy in the volume of space 1399 by an associated sensor device 1365 according to examples.

For example, since the sensor of sensor device 1365-12 detects occupancy, a controller can instruct the sensor device 1365-12 to take measurements for occupancy more frequently (e.g., from every 5 seconds to ever second) and/or can instruct the controller 1304 associated with sensor device 1365-12 to send communication signals to the controller more frequently. At the same time, because the sensor of sensor device 1365-1 through sensor device 1365-11 do not detect occupancy, the same controller (or a different controller) can keep the rate of measurement by the sensor of sensor device 1365-1 through sensor device 1365-11 and/or reporting of occupancy by the associated controllers 1304 the same.

Alternatively, if the sensor of sensor device 1365-1 through sensor device 1365-11 have not detected occupancy for some time (e.g., 30 minutes, 2 hours), then one or more controllers can slow the rate of measurement by the sensor of sensor device 1365-1 through sensor device 1365-11 (e.g., from every 5 minutes to every 10 minutes) and/or the rate of reporting of occupancy by the associated controllers 1304.

In one or more examples, communication networks for systems used to locate objects in real time (RTLS) can be managed so that bandwidth is not unnecessarily used, helping to ensure that important information continues to be communicated while having less important or unimportant information be sent at lower frequencies. Example embodiments can manage communications within a system based on occupancy. If occupancy is detected, the frequency of communications regarding such occupancy can be increased. If occupancy is not detected, the frequency of communications regarding such occupancy can be maintained or even decreased. Using examples described herein can improve communication, safety, maintenance, costs, and operating efficiency.

In accordance with this second aspect, the following embodiments are disclosed:

Embodiment 1: A system for managing communications within a real-time location system (RTLS), the system comprising:
a first movable object disposed in a first portion of a plurality of portions of a volume of space;
a plurality of sensor devices configured to detect occupancy in the volume of space, wherein each sensor device is configured to detect occupancy in one of the plurality of portions of the volume of space; and
a controller in communication with the plurality of sensor devices, wherein the controller:
receives a plurality of first communications at a first time from the plurality of sensor devices, wherein the plurality of first communications report whether occupancy is detected in the plurality of portions of the volume of space;
determines, based on the plurality of first communications, that a first sensor device detects occupancy of the first movable object in the first portion of the volume of space and that a remainder of the plurality of sensor devices fail to detect occupancy by the first movable object;
sends, in response to the plurality of first communications, a second communication to the first sensor device to increase a rate of reporting occupancy in the first portion of the volume of space from a first rate to a second rate.

Embodiment 2: The system of Embodiment 1, wherein the controller further:
determines, based on the plurality of first communications, that at least one sensor device of the plurality of sensor devices has failed to detect occupancy in a first period of time threshold; and
sends, in response to the plurality of first communications, a third communication to the at least one sensor device to decrease the rate of reporting occupancy in the volume of space from the first rate to a third rate.

Embodiment 3: The system of Embodiment 1, wherein the first sensor device comprises a passive infrared sensor.

Embodiment 4: The system of Embodiment 1, wherein the first sensor device comprises an ultrasonic sound wave emitter and detector.

Embodiment 5: The system of Embodiment 1, wherein the first sensor device comprises a camera that captures multiple images of the first portion of the volume of space.

Embodiment 6: The system of Embodiment 1, wherein the first object is a human being.

Embodiment 7: The system of Embodiment 1, wherein the first object comprises a communication device that communicates with the first sensor to identify the object.

Embodiment 8: The system of Embodiment 1, wherein the controller is part of the first sensor device.

Figure 14B:
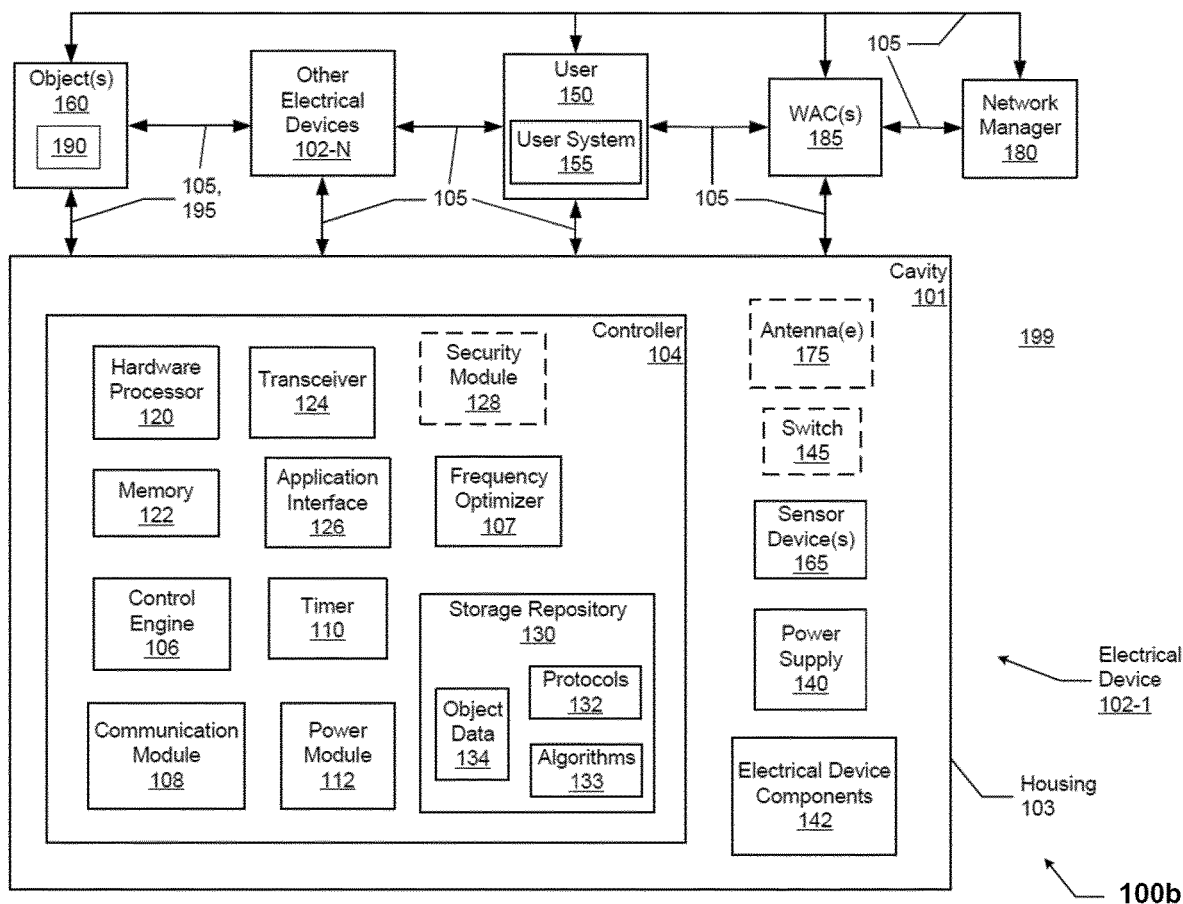
FIG. 14B shows a diagram of a system in accordance with another example.

Third aspect: Frequency Optimization for Communication Signals of a Real-Time Location System FIG. 14B shows a diagram of a system 100b that includes multiple electrical devices 102 and one or more objects 160 in a volume of space 199 in accordance with certain example embodiments. The system 100 can also include a user 150, a network manager 180, and one or more wireless access controllers 185 (WACs 185). Each electrical device 102 (e.g., electrical device 102-1) can include a controller 104, one or more sensor devices 165, one or more optional antennae 175, an optional switch 145, a power supply 140, and a number of electrical device components 142. The controller 104 can include one or more of a number of components. Such components, can include, but are not limited to, a control engine 106, a frequency optimizer 107, a communication module 108, a timer 110, a power module 112, a storage repository 130, a hardware processor 120, a memory 122, a transceiver 124, an application interface 126, and, optionally, a security module 128.

The components shown in FIG. 14B are not exhaustive, and in some embodiments, one or more of the components shown in FIG. 14B may not be included in an example electrical device 102. Any component of the example electrical device 102 can be discrete or combined with one or more other components of the electrical device 102. For example, each electrical device 102 in the system 100b can have its own controller 104. Alternatively, one controller 104 can be used to control multiple electrical devices 102 in the system. As yet another alternative, a sensor device 165 can be integrated, meaning that the sensor device 165 includes its own controller, as discussed below. An electrical device 102 is any device that uses electricity, at least in part, to operate. A list of some potential electrical devices 102 is described above.

A user 150 may be any person that interacts with an electrical device 102 and/or object 160 in the volume of space 199. Specifically, a user 150 may program, operate, install, maintain, and/or interface with one or more components (e.g., a controller, a network manager) associated with the system 100 using example embodiments. Examples of a user 150 can include, but are not limited to, an employee, an engineer, an electrician, a technician, an operator, a consultant, a contractor, an asset, a network manager, and a manufacturer's representative.

The user 150 can use a user system 155, which may include a display (e.g., a GUI). The user 150 (including a user system 155) interacts with (e.g., sends data to, receives data from) the controller 104 of an electrical device 102 via the application interface 126 (described below). The user 150 (including a user system 155) can also interact with a network manager 180, the optional WACs 185, the sensor devices 165, and/or one or more of the objects 160. Interaction (including transmission of RF signals 195) between the user 150 (including a user system 155) and the electrical device 102, the network manager 180, the sensor devices 165, the optional WACs 185, and the objects 160 can be facilitated using communication links 105. (As defined herein, the electrical device 102-1 and the other electrical devices 102-N can collectively be called electrical devices 102.)

Each communication link 105 can include wired (e.g., Class 1 electrical cables, Class 2 electrical cables, electrical connectors) and/or wireless (e.g., Wi-Fi, visible light communication, cellular networking, Bluetooth, Bluetooth Low Energy (BLE), Zigbee, WirelessHART, ISA100, Power Line Carrier, RS485, DALI) technology. For example, a communication link 105 can be (or include) one or more electrical conductors that are coupled to the housing 103 of an electrical device 102 and to the network manager 180.

The communication links 105 can transmit signals (e.g., power signals, RF signals 195, control signals, data) between the electrical devices 102, the user 150 (including a user system 155), the sensor devices 165, the objects 160, the optional WACs 185, and/or the network manager 180. For example, the electrical devices 102 of the system 100 can interact with the one or more objects 160 by transmitting RF signals 195 over one or more communication links 105, as discussed below. The signals transmitted over the communication links 105 are made up of bits of data. RF signals 195 can be transmitted using any of a number of radio technologies, such as BLE and Bluetooth.

The network manager 180 is a device or component that controls all or a portion of the system 100 that includes the controller 104 of at least one of the electrical devices 102 and the WACs 185. The network manager 180 can be substantially similar to, at least in part, the controller 104 and/or a WAC 185. Alternatively, the network manager 180 can include one or more of a number of features in addition to, or altered from, the features of the controller 104 and/or a WAC 185, both described below. There can be more than one network manager 180 and/or one or more portions of a network manager 180.

In some cases, a network manager 180 can be called an insight manager or a RTLS engine. In such a case, the network manager 180 receives data from the WACs 185 and processes this data (e.g., using algorithms 133 and/or protocols 132) to determine the location of one or more objects 160 in real time. If the WACs 185 are optional, then the network manager 180 can communicate directly with the electrical devices 102 and/or the sensor devices 165. The network manager 180 can be located in the volume of space 199 or remotely from the volume of space 199. The network manager 180 can use the various communications received from the WACs 185 (or, alternatively, the electrical devices 102 and/or the sensor devices 165) to locate an object 160 in two dimensions or in three dimensions within the volume of space 199.

Each optional WAC 185 (sometimes more simply called an access controller, as a generic term and/or when wired communication links 105 are involved) performs a number of different functions. For example, a WAC 185 can help communicate with and control the controller 104 of one or more electrical devices 102 and/or one or more sensor devices 165 to help control the operation of those electrical devices 102. For RTLS applications, the WAC 185 can be responsible for pairing with the Zigbee-enabled sensor devices 165, providing configuration data to the sensor devices 165, synchronizing the timing of those sensor devices 165, supporting the firmware of those sensor devices 165, upgrading those sensor devices 165, receiving location/telemetry data (e.g., using a Zigbee-enabled communication links 105) from the sensor devices 165, and/or performing any other function with respect to those sensor devices 165 to support RTLS activities.

When a WAC 185 receives data (e.g., packed egress data that arrives as ingress data) from a sensor device 165, the WAC 185 can convert the data into a different format (e.g., ECAPI). The WAC 185 can then send the newly-formatted data to the network manager 180. To help diagnose issues, a WAC 185 can maintain counters for each paired sensor device 165 and include, for example, the number of received packed data messages from a particular sensor device 165, the number of formatted messages successfully transmitted to the network manager 180 that pertain to the packed data from a particular sensor device 165, and the number of formatted messages pertaining to the packed data from a particular sensor device 165 that failed to transmit to the network manager 180.

In some cases, a WAC 185 maintains the average and maximum latency introduced between the receipt of a message from a sensor device 165 and transmission of a formatted message to the network manager 180. The WAC 185 can also notify the network manager 180 when the average or maximum latency exceeds a threshold value. Further, a WAC 185 can communicate to the network manager 180 when there is a significant discrepancy (e.g., as determined by the WAC 185) between the ingress and egress packets with respect to a sensor device 165. When there are multiple WACs 185, they can all be time-synchronized with each other. In some cases, the functionality of a WAC 185 can be the same as, or at least partially combined with, the functionality of the controller 104 of an electrical device 102. A WAC 185 can be located in the volume of space 199 or remotely from the volume of space 199.

As defined herein, an object 160 can be any unit or group of units. An object 160 can move on its own, is capable of being moved, or is stationary. Examples of an object 160 can include, but are not limited to, a person (e.g., a user 150, such as a visitor or an employee), a part (e.g., a motor stator, a cover), a piece of equipment (e.g., a fan, a container, a table, a chair), and a group of parts or equipment (e.g., a pallet stacked with inventory). A system 100 can have one object 160 or multiple objects 160 in the volume of space 199.

Each object 160 can include a communication device 190 (also sometimes called a tag, a beacon, or other name known in the art, depending on the configuration of the communication device 190), which can receive RF signals 195 from and/or send RF signals 195 to one or more electrical devices 102. The communication device 190 of an object 160 can broadcast RF signals 195 that can be received by any electrical devices 102 within range of the broadcast or send RF signals 195 addressed to one or more specific electrical devices 102.

A communication device 190 can include one or more of a number of components (e.g., transmitter, receiver, antenna, switch, power module) and/or have the functionality described below with respect to a controller 104 and/or an associated electrical device 102. For example, a communication device 190 can include a control engine, a transceiver, and an antenna to allow the communication device 190 to send RF signals 195 to and/or receive RF signals 195 from one or more electrical devices 102 in the system 100. As another example, a communication device 190 of an object 160 can include its own frequency optimizer that is substantially similar to the frequency optimizer 107 discussed below.

Using example embodiments, a communication device 190 of an object 160 can be in sleep mode for a predefined interval, at which point it stays awake for a period of time or until the communication device 190 receives a RF signal 195 broadcast by one or more electrical devices 102. When this occurs, the communication device 190 can turn on long enough to interpret the initial RF signal 195, and then generate and send its own RF signal 195 to one or more of the electrical devices 102 in response to the initial RF signal 195. This response RF signal 195 can include a UUID as well as a reference (e.g., signal code) to the initial RF signal 195 and/or the electrical device 102 that sent the initial RF signal 195, if any. Once the response RF signal 195 is sent by a communication device 190, the communication device 190 can go back into sleep mode, thereby reserving a considerable amount of power.

The communication device 190 can use one or more of a number of communication protocols in sending RF signals 195 to and/or receiving RF signals 195 from the electrical devices 102. In certain example embodiments, an object 160 (or a portion thereof, such as the communication device 190) can include a battery (a form of power supply or power module) that is used to provide power, at least in part, to some or all of the rest of the object 160, including the communication device 190.

A user 150 (including a user system 155), the network manager 180, one or more sensor devices 165, one or more WACs 185, and/or the other electrical devices 102-N can interact with the controller 104 of the electrical device 102-1 using the application interface 126 in accordance with one or more example embodiments. Specifically, the application interface 126 of the controller 104 receives data (e.g., information, communications, instructions) from and sends data (e.g., information, communications, instructions) to the user 150 (including a user system 155), the network manager 180, the sensor devices 165, one or more WACs 185, and/or one or more of the other electrical devices 102-N. The user 150 (including a user system 155), the network manager 180, the sensor devices 165, one or more WACs 185, and/or one or more of the other electrical devices 102-N can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150 (including a user system 155), the network manager 180, the sensor devices 165, one or more WACs 185, and/or one or more of the other electrical devices 102-N can use their own system or share a system in certain example embodiments. Such a system can be, or contain a form of, an Internet-based or an intranet-based computer system that is capable of communicating with various software.

The electrical device 102-1 can include a housing 103. The housing 103 can include at least one wall that forms a cavity 101. In some cases, the housing 103 can be designed to comply with any applicable standards so that the electrical device 102-1 can be located in a particular environment (e.g., a hazardous environment). The housing 103 of the electrical device 102-1 can be used to house one or more components of the electrical device 102-1, including one or more components of the controller 104. For example, as shown in FIG. 14B, the controller 104 (which in this case includes the control engine 106, the frequency optimizer 107, the communication module 108, the timer 110, the power module 112, the storage repository 130, the hardware processor 120, the memory 122, the transceiver 124, the application interface 126, and the optional security module 128), the one or more sensor devices 165, an optional switch 145, one or more optional antennae 175, the power supply 140, and the electrical device components 142 are disposed in the cavity 101 formed by the housing 103. In alternative embodiments, any one or more of these or other components of the electrical device 102-1 can be disposed on the housing 103 and/or remotely from the housing 103.

The storage repository 130 can be a persistent storage device (or set of devices) that stores software and data used to assist the controller 104 in communicating with the user 150 (including a user system 155), the network manager 180, one or more of the objects 160, the sensor devices 165, one or more WACs 185, and one or more of the other electrical devices 102-N within the system 100. In one or more example embodiments, the storage repository 130 stores one or more protocols 132, one or more algorithms, 133, and object data 134.

The protocols 132 can be any procedures (e.g., a series of method steps) and/or other similar operational procedures that the control engine 106 of the controller 104 follows based on certain conditions at a point in time. The protocols 132 can also include any of a number of communication protocols that are used to send and/or receive data between the controller 104 and the user 150 (including a user system 155), the network manager 180, the one or more of the other electrical devices 102-N, the sensor devices 165, one or more WACs 185, and one or more of the objects 160. One or more of the protocols 132 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 132 used for communication can provide a layer of security to the data transferred within the system 100.

The algorithms 133 can be any formulas, mathematical models, forecasts, simulations, and/or other similar tools that the control engine 106 of the controller 104 uses to reach a computational conclusion. An example of one or more algorithms 133 is calculating the strength of a RF signal 195 and comparing the strength of a RF signal 195 with a threshold value. Another example of one or more algorithms 133 is evaluating multiple RF signals 195 of close but varying frequencies with respect to a single object 160 and determine which frequency is optimal. Algorithms 133 can be used to analyze past data, analyze current data, and/or perform forecasts.

One or more particular algorithms 133 can be used in conjunction with one or more particular protocols 132. For example, one or more protocols 132 and one or more algorithms 133 can be used in conjunction with each other to track an object 160 using occupancy information measured by one or more sensor devices 165. As another example, one or more protocols 132 and one or more algorithms 133 can be used in conjunction with each other to track an object 160 using encoded IR signaling, which can involve one or more sensor devices 165. As still another example, one or more protocols 132 and one or more algorithms 133 can be used in conjunction with each other to track an object 160 based on a temporal separation of objects 160 based on RSSI, which can be measured using one or more sensor devices 165.

As yet another example, one or more protocols 132 and one or more algorithms 133 can be used in conjunction with each other to determine whether an object 160 that is stationary can be moved to a different position in the volume of space 199 to provide a more accurate and consistent signal strength reading. As still another example As still another example, one or more protocols 132 and one or more algorithms 133 can be used in conjunction with each other to determine the optimal frequency at which communication signals 195 are transmitted with respect to a particular object 160.

Object data 134 can be any data associated with each object 160 (including an associated communication device 190) that is communicably coupled to the controller 104. Such data can include, but is not limited to, a manufacturer of the object 160, a model number of the object 160, RSSI values for previous RF signals 195, communication capability of the communication device 190 of an object 160, last known location of the object 160, and age of the object 160. Examples of a storage repository 130 can include, but are not limited to, a database (or a number of databases), a file system, a hard drive, flash memory, some other form of solid state data storage, or any suitable combination thereof.

The storage repository 130 can also store one or more other types of data. Examples of such data can include, but are not limited to, threshold values, user preferences, historical data (e.g., past results of algorithms 133, measurements made by one or more sensor devices 165), and forecasts. The storage repository 130 can be located on multiple physical machines, each storing all or a portion of the protocols 132, the algorithms 133, and/or the object data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150 (including a user system 155), the network manager 180, the objects 160, the sensor devices 165, one or more WACs 185, and the other electrical devices 102-N in the system 100. More specifically, the control engine 106 sends information to and/or receives information from the storage repository 130 in order to communicate with the user 150 (including a user system 155), the network manager 180, the objects 160, the sensor devices 165, one or more WACs 185, and the other electrical devices 102-N. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can put the communication module 108 in "sleep" mode when there are no communications between the controller 104 and another component (e.g., an object 160, a sensor device 165, a WAC 185, a user system 155) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to send RF signals 195 (or other types of communication) and/or stop sending RF signals 195 (or other types of communication) to one or more sensor devices 165, the network manager 180, and/or one or more WACs 185 in the system 100. The control engine 106 can also instruct a sensor device 165 to communicate with an object 160 (or a communication device 190 thereof), with the network manager 180, with a WAC 185, and/or with the controller 104. This example provides another instance where the control engine 106 can conserve power used by the controller 104 and other components (e.g., the objects 160, the sensor devices 165) of the system 100.

The control engine 106 can determine when to broadcast one or more RF signals 195 in an attempt to locate an object 160. To conserve energy, the control engine 106 does not constantly broadcast RF signals 195, but rather only does so at discrete times. The control engine 106 can broadcast a RF signal 195 based on one or more of a number of factors, including but not limited to passage of time, the occurrence of an event, instructions from a user 150 (including a user system 155), and a command received from a WAC 185 or the network manager 180. The control engine 106 can coordinate with the controllers 104 of one or more of the other electrical devices 102-N and/or directly control one or more of the other electrical devices 102-N to broadcast multiple RF signals 195. In such a case, the control engine 106 can share optimal frequencies, using the frequency optimizer 107, used to communicate with particular objects 160. The control engine 106 can also determine the signal strength (e.g., RSSI) of one or more of the RF signals 195 that are broadcast by the object 160, in some cases in response to the RF signal 195 broadcast by the electrical device 102-1.

In some cases, the control engine 106 of the electrical device 102-1 (or, in some cases, the network manager 180 or a WAC 185 communicating with the controller 104) can locate the object 160 based on the multiple RF signals 195 sent by the object 160, in some cases in response to the multiple RF signals 195 broadcast by the electrical devices 102. To accomplish this, the control engine 106 obtains the multiple RF signals 195 (directly and/or from another control engine 106 from one or more of the other electrical devices 102-N) broadcast by the object 160 and uses one or more protocols 132 and/or algorithms 133 to determine the location of the object 160. According to example embodiments, the control engine 106, using the protocols 132 and/or algorithms 133 in conjunction with the frequency optimizer 107, can use (and in some cases share) the optimal frequency for RF signals 195 transmitted with respect to particular objects 160 to get the most accurate RSSI values of such RF signals 195.

To determine whether a RSSI value of a RF signal 195 is accurate, the control engine 106 can used data stored in the storage repository 130 (e.g., known location of the object 160 in the volume of space 199, historical information (e.g., frequencies, a RSSI values) associated with RF signals 195 received from the object 160, environmental conditions in the volume of space 199, other communication systems operating in the volume of space 199) to determine whether the RSSI value for a currently-received RF signal 195 is deemed to be reasonably accurate. If not, the control engine 106 can enlist the frequency optimizer 107 to find a more optimal frequency, if any.

For example, the protocols 132 and/or algorithms 133 used by the control engine 106 can track an object 160 using occupancy information. As another example, the protocols 132 and/or algorithms 133 used by the control engine 106 can track an object 160 using encoded IR signaling. As yet another example, the protocols 132 and/or algorithms 133 used by the control engine 106 can track an object 160 using a temporal separation of objects 160 based on RSSI. Examples embodiments use information provided by one or more sensor devices 165 to evaluate whether RSSI values of RF signals are accurate and/or consistent across multiple frequencies.

The control engine 106 of the controller 104 can also use the protocols 132 and/or the algorithms 133 to extract the ID of an object 165 from a communication signal (e.g., RF signal 195) received from the communication device 190 of the object 160 directly by the transceiver 124 or by an integrated sensor device 165. The control engine 106 of the controller 104 can also use the storage repository 130, the protocols 132, and/or the algorithms 133 to determine if the ID of the object 165 is part of a list of IDs known in the system 100. Such a list can be used to determine whether subsequent communication generated by the control engine 106 is sent to a WAC 185.

The control engine 106 of the controller 104 can further use the protocols 132 and/or the algorithms 133 to interpret the measurements made by one or more of the sensors of the integrated sensor module 165. For instance, if the integrated sensor device 165 includes a PIR sensor, then the PIR sensor can detect motion within a sensing range and/or occupancy within a RTLS occupancy zone. In such a case, the control engine 106 can interpret these detections by the PIR sensor.

The control engine 106 of the controller 104 can also use the protocols 132 and/or the algorithms 133 to generate a subsequent communication signal to a WAC 185 or the network manager 180 that is based on receipt of the first communication signal. For example, a subsequent communication signal can include a number of bits that are directed to information such as, for example, the ID of the object 160, the ID of the sensor device 165, and the RSSI value of the communication signal (e.g., RF signal 195) received by the sensor device 165. The control engine 106, working with the frequency optimizer 107, can repeat this process multiple times using different frequencies for the RF signals 195, compare the RSSI values of those RF signals 195, and determine the best frequency to use for RF signals 195 used to communicate with a particular object 160 in the future.

In some cases, control engine 106 of the controller 104 can further use the protocols 132 and/or the algorithms 133 to determine certain conditions that may call for using a different frequency for a RF signal 195 for a second communication signal to a WAC 185 or the network manager 180 after receiving a first communication signal from the communication device 190 of an object 160. For example, if the RSSI value of the first communication signal from the communication device 190 of an object 160 is below a minimum threshold or expected value, then the control engine 106, working with the frequency optimizer 107, can determine that a subsequent second communication signal (another RF signal 195) is transmitted to the object 160 at a different frequency based on the first communication signal.

This process can be repeated multiple times until the control engine 106, working with the frequency optimizer 107, to determine an optimal frequency at which future RF signals 195 should be used in communicating with the object 160. In certain example embodiments, in addition to being applied to communications with objects 160 or as an alternative to communications with objects 160, the control engine 106, working with the frequency optimizer 107, can evaluate and optimize frequencies of radio-based communication signals (e.g., RF signals 195) between any components (e.g., between a WAC 185 and a sensor device 165, between a WAC 185 and the network manager 180) of the system 100.

The control engine 106 can provide control, communication, and/or other similar signals to the user 150 (including a user system 155), the network manager 180, the other electrical devices 102-N, the sensor devices 165, one or more WACs 185, and one or more of the objects 160. Similarly, the control engine 106 can receive control, communication, and/or other similar signals from the user 150 (including a user system 155), the network manager 180, the other electrical devices 102-N, the sensor devices 165, one or more WACs 185, and one or more of the objects 160. The control engine 106 can communicate with each object 160 automatically (for example, based on one or more algorithms 133 stored in the storage repository 130) and/or based on control, communication, and/or other similar signals received from another device (e.g., the network manager 180, another electrical device 102) using the RF signals 195. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the electrical device 102-1. For example, if the power supply 140 of the electrical device 102-1 operates under IEC Standard 62386, then the power supply 140 can include a digital addressable lighting interface (DALI). In such a case, the control engine 106 can also include a DALI to enable communication with the power supply 140 within the electrical device 102-1. Such an interface can operate in conjunction with, or independently of, the communication protocols 132 used to communicate between the controller 104 and the user 150 (including a user system 155), the network manager 180, the other electrical devices 102-N, the sensor devices 165, one or more WACs 185, and the objects 160.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

By using example embodiments, while at least a portion (e.g., the control engine 106, the timer 110) of the controller 104 is always on, the remainder of the controller 104 and the objects 160 can be in sleep mode when they are not being used. In addition, the controller 104 can control certain aspects (e.g., sending RF signals 195 to and receiving RF signals 195 from an object 160) of one or more other electrical devices 102-N in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112), even more power can be conserved in the operation of the system 100. In addition, using time-synchronized communication protocols 132, the data transferred between the controller 104 and the user 150 (including a user system 155), the network manager 180, the sensor devices 165, one or more WACs 185, and the other electrical devices 102-N can be secure.

The frequency optimizer 107 of the controller 104 can establish a frequency at which a communication signal 195 is sent by the transceiver 124. In addition, or in the alternative, the frequency optimizer 107 of the controller can measure the frequency of a communication signal 195 received by the transceiver 124. This frequency information can be used by the control engine 106 to evaluate the optimal frequency that should be used to communicate with certain specific objects 160 in the volume of space 199. In some cases, the frequency optimizer 107 also performs the task of evaluating the various frequencies used for communication signals transmitted between the transceiver 124 and an object 160 and determining the optimal frequency for communicating with that object. The frequency optimizer 107 can be configured to perform such evaluations and determinations between two components (e.g., between the electrical device 102-1 and an object 160) at a single time (e.g., during commissioning) and/or on a periodic, ongoing basis.

The communication module 108 of the controller 104 determines and implements the communication protocol (e.g., from the protocols 132 of the storage repository 130) that is used when the control engine 106 communicates with (e.g., sends signals to, receives signals from) the user 150 (including a user system 155), the network manager 180, the other electrical devices 102-N, the sensor devices 165, one or more WACs 185, and/or one or more of the objects 160. In some cases, the communication module 108 accesses the object data 134 to determine which communication protocol is within the capability of the object 160 for a RF signal 195 sent by the control engine 106. In addition, the communication module 108 can interpret the communication protocol of a communication (e.g., a RF signal 195) received by the controller 104 so that the control engine 106 can interpret the communication.

The communication module 108 can send data (e.g., protocols 132, object data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure the time of flight (ToF) of one or more RF signals 195, even simultaneously. The timer 110 can track time periods based on an instruction received from the control engine 106, based on an instruction received from the user 150 (including a user system 155), based on an instruction programmed in the software for the controller 104, based on some other condition or from some other component, or from any combination thereof.

The power module 112 of the controller 104 provides power to one or more other components (e.g., timer 110, control engine 106) of the controller 104. In addition, in certain example embodiments, the power module 112 can provide power to the power supply 140 of the electrical device 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the electrical device 102 and generates power of a type (e.g., alternating current, direct current) and level (e.g., 12V, 24V, 120V) that can be used by the other components of the controller 104 and/or by the power supply 140. In addition, or in the alternative, the power module 112 can be a source of power in itself to provide signals to the other components of the controller 104 and/or the power supply 140. For example, the power module 112 can include an energy storage device (e.g., a battery). As another example, the power module 112 can include a localized photovoltaic power system.

The hardware processor 120 of the controller 104 executes software in accordance with one or more example embodiments. Specifically, the hardware processor 120 can execute software on the control engine 106 or any other portion of the controller 104, as well as software used by the user 150 (including a user system 155), the network manager 180, the sensor devices 165, one or more WACs 185, and/or one or more of the other electrical devices 102-N. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send (using a transmitter) and/or receive (using a receiver) control and/or communication signals, including RF signals 195. Specifically, the transceiver 124 can be used to transfer data between the controller 104 and the user 150 (including a user system 155), the network manager 180, the other electrical devices 102-N, one or more of the sensor devices 165, one or more WACs 185, and/or the objects 160. The transceiver 124 can use wired and/or wireless technology. The transceiver 124 can be configured in such a way that the control and/or communication signals sent and/or received by the transceiver 124 can be received and/or sent by another transceiver that is part of the user 150 (including a user system 155), the network manager 180, the other electrical devices 102-N, one or more sensor devices 165, one or more WACs 185, and/or the objects 160.

When the transceiver 124 uses wireless technology, any type of wireless technology can be used by the transceiver 124 in sending and receiving signals (e.g., RF signals 195). Such wireless technology can include, but is not limited to, Wi-Fi, visible light communication, infrared (IR), cellular networking, Zigbee, BLE, and Bluetooth. For example, the transceiver 124 can include a Zigbee transmitter, a Zigbee receiver, a BLE receiver, a BLE transmitter, an active IR transmitter, and/or an active IR receiver. The transceiver 124 can use one or more of any number of suitable communication protocols (e.g., ISA100, HART) when sending and/or receiving signals, including RF signals 195. Such communication protocols can be stored in the protocols 132 of the storage repository 130. Further, any transceiver information for the user 150 (including a user system 155), the network manager 180, the other electrical devices 102-N, the sensor devices 165, one or more WACs 185, and/or the objects 160 can be part of the object data 134 (or similar areas) of the storage repository 130.

Optionally, in one or more example embodiments, the security module 128 secures interactions between the controller 104, the user 150 (including a user system 155), the network manager 180, the other electrical devices 102-N, the sensor devices 165, one or more WACs 185, and/or the objects 160. More specifically, the security module 128 authenticates communication from software based on security keys verifying the identity of the source of the communication. For example, user software may be associated with a security key enabling the software of a user system 155 of a user 150 to interact with the controller 104 of the electrical device 102-1. Further, the security module 128 can restrict receipt of information, requests for information, and/or access to information in some example embodiments.

As mentioned above, aside from the controller 104 and its components, the electrical device 102-1 can include a power supply 140, one or more sensor devices 165, one or more optional antennae 175, an optional switch 145, and one or more electrical device components 142. The electrical device components 142 of the electrical device 102-1 are devices and/or components typically found in the electrical device 102-1 to allow the electrical device 102-1 to operate. An electrical device component 142 can be electrical, electronic, mechanical, or any combination thereof. The electrical device 102-1 can have one or more of any number and/or type of electrical device components 142. For example, when the electrical device 102-1 is a light fixture, examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

The power supply 140 of the electrical device 102-1 provides power to one or more of the electrical device components 142. The power supply 140 can be substantially the same as, or different than, the power module 112 of the controller 104. The power supply 140 can include one or more of a number of single or multiple discrete components (e.g., a transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from or sends power to the power module 112 of the controller 104. The power supply can generate power of a type (e.g., alternating current, direct current) and level (e.g., 12V, 24V, 120V) that can be used by the recipients (e.g., the electrical device components 142, the controller 106) of such power. In addition, or in the alternative, the power supply 140 can receive power from a source external to the electrical device 102-1. In addition, or in the alternative, the power supply 140 can be or include a source of power in itself. For example, the power supply 140 can include an energy storage device (e.g., a battery), a localized photovoltaic power system, or some other source of independent power.

Each of the one or more sensor devices 165 of the electrical device 102-1 can include any type of sensing device that measures one or more parameters. Examples of types of sensor devices 165 can include, but are not limited to, a passive infrared sensor, a photocell, a pressure sensor, an air flow monitor, a gas detector, signal strength, and a resistance temperature detector. Examples of a parameter that is measured by a sensor device 165 can include, but are not limited to, occupancy in the volume of space 199, motion in the volume of space 199, a temperature, a level of gas, a level of humidity, a RSSI value of a RF signal 195, an amount of ambient light in the volume of space 199, and a pressure wave.

In some cases, the parameter or parameters measured by a sensor device 165 can be used to operate one or more of the electrical device components 142 of the electrical device 102-1. In addition, or in the alternative, the one or more parameters measured by a sensor device 165 can be used to locate one or more objects 160 in accordance with certain example embodiments. For example, if a sensor device 165 is configured to detect the presence of an object 160, that information can be used to determine whether a communication (e.g., a RF signal 195) received from a communication device 190 of an object 160 should be forwarded to a network manager 180.

A sensor device 165 can be an integrated sensor. In integrated sensor has both the ability to sense and measure at least one parameter and the ability to communicate with another component (e.g., the communication device 190 of an object 160, a WAC 185). The communication capability of a sensor device 165 that is an integrated sensor can include one or more communication devices that are configured to communicate with, for example, the controller 104 of the electrical device 102-1, a WAC 185, and/or a controller (substantially similar to the controller 104 described herein) of another electrical device 102-N. For example, an integrated sensor device 165 can include a passive infrared (PIR) sensor, a transceiver that sends and receives signals using Zigbee, a receiver that receives signals using BLE, and a receiver that actively receives IR signals. In such a case, the PIR sensor measures IR light radiating from objects in its field of view, often for the purpose of detecting motion.

Each sensor device 165 can use one or more of a number of communication protocols. This allows a sensor device 165 to communicate with one or more components (e.g., a communication device 190 of an object 160, a WAC 185, one or more other integrated sensor devices 165) of the system 100. The communication capability of a sensor device 165 that is an integrated sensor can be dedicated to the sensor device 165 and/or shared with the controller 104 of the electrical device 102-1. When the system 100 includes multiple integrated sensor devices 165, one integrated sensor device 165 can communicate, directly or indirectly, with one or more of the other integrated sensor devices 165 in the system 100.

If the communication capability of a sensor device 165 is an integrated sensor is dedicated to the sensor device 165, then the sensor device 165 can include one or more components (e.g., a transceiver 124, a communication module 108, a frequency optimizer 107), or portions thereof, that are substantially similar to the corresponding components described above with respect to the controller 104. A sensor device 165 can be associated with the electrical device 102-1 and/or another electrical device 102 in the system 100. A sensor device 165 can be located within the housing 103 of the electrical device 102-1, disposed on the housing 103 of the electrical device 102-1, or located outside the housing 103 of the electrical device 102-1.

In certain example embodiments, a sensor device 165 can include an energy storage device (e.g., a battery) that is used to provide power, at least in part, to some or all of the sensor device 165. In such a case, the energy storage device can be the same as, or independent of, an energy storage device or other power supply 140 of the electrical device 102-1. The optional energy storage device of the sensor module 165 can operate at all times or when the power supply of the electrical device 102-1 is interrupted. Further, a sensor device 165 can utilize or include one or more components (e.g., memory 122, storage repository 130, transceiver 124) found in the controller 104. In such a case, the controller 104 can provide the functionality of these components used by the sensor device 165. Alternatively, the sensor device 165 can include, either on its own or in shared responsibility with the controller 104, one or more of the components of the controller 104. In such a case, the sensor device 165 can correspond to a computer system as described below with regard to FIG. 15. A sensor device 165 can be considered an electrical device 102 in some cases.

As discussed above, the electrical device 102 can include one or more optional antennae 175. An antenna 175 is an electrical device that converts electrical power to RF signals 195 (for transmitting) and RF signals 195 to electrical power (for receiving). In transmission, a radio transmitter (e.g., transceiver 124) supplies, through the optional switch 145 when multiple antenna 175 are involved, an electric current oscillating at radio frequency (i.e. a high frequency alternating current (AC)) to the terminals of the antenna 175, and the antenna 175 radiates the energy from the current as RF signals 195. In reception, an antenna 175, when included in the electrical device 102, intercepts some of the power of RF signals 195 in order to produce a tiny voltage at its terminals, that is applied to a receiver (e.g., transceiver 124), in some cases through an optional switch 145, to be amplified.

An antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse RF signal 195 (often an electromagnetic field wave). Conversely, during reception, the oscillating electric and magnetic fields of an incoming RF signal 195 exert force on the electrons in the body of the antenna 175, causing portions of the body of the antenna 175 to move back and forth, creating oscillating currents in the antenna 175.

In certain example embodiments, an antenna 175 can be disposed at, within, or on any portion of the electrical device 102. For example, an antenna 175 can be disposed on the housing 103 of the electrical device 102 and extend away from the electrical device 102. As another example, an antenna 175 can be insert molded into a lens of the electrical device 102. As another example, an antenna 175 can be two-shot injection molded into the housing 103 of the electrical device 102. As yet another example, an antenna 175 can be adhesive mounted onto the housing 103 of the electrical device 102. As still another example, an antenna 175 can be pad printed onto a circuit board within the cavity 101 formed by the housing 103 of the electrical device 102. As yet another example, an antenna 175 can be a chip ceramic antenna that is surface mounted. As still another example, an antenna 175 can be a wire antenna.

When there are multiple antennae 175 (or other forms of multiple communication points) as part of the electrical device 102, there can also be an optional switch 145, which allows for selection of one communication point at a given point in time.

In such a case, each antenna 175 can be electrically coupled to the switch 145, which in turn is electrically coupled to the transceiver 124. The optional switch 145 can be a single switch device or a number of switch devices arranged in series and/or in parallel with each other. The switch 145 determines which antenna 175 is coupled to the transceiver 124 at any particular point in time. A switch 145 can have one or more contacts, where each contact has an open state (position) and a closed state (position).

In the open state, a contact of the switch 145 creates an open circuit, which prevents the transceiver 124 from delivering a RF signal 195 to or receiving a RF signal 195 from the antenna 175 electrically coupled to that contact of the switch 145. In the closed state, a contact of the switch 145 creates a closed circuit, which allows the transceiver 124 to deliver a RF signal 195 to or receive a RF signal 195 from the antenna 175 electrically coupled to that contact of the switch 145. In certain example embodiments, the position of each contact of the switch 145 is controlled by the control engine 106 of the controller 104.

If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments. FIG. 16 shows a diagram of another RTLS system 300 in accordance with certain example embodiments. The RTLS system 300 includes a user 350 with a user system 355, multiple objects 360 each having a communication device 390 (in this case called a tag), a number of electrical devices 302 each having one or more sensor devices 365, a number of controllers 385 (in this case called wireless access controllers (WACs)), and a network manager 380 (in this case called an insight manager (IM) with a RTLS engine). Each of these components of the system 300 of FIG. 16 can be substantially the same as the corresponding component of the RTLS system 100b of FIG. 14B. For example, each sensor device 365 can include a Zigbee-enabled transceiver, a BLE-enabled receiver, a PIR sensor, and an active IR receiver.

In this particular case, the communication devices 390 of the objects 360 are the physical entities that are tracked by the RTLS system 300. From the perspective of a user 350, each communication device 390 is associated with an object 360 (also sometimes called an asset). In this example, the communication devices 390 use BLE (a form of communication link 305 to "beacon" RF signals 395 at a certain rate. A beacon is a broadcast message that, at a minimum, identifies the object 360 associated with the sending communication device 390. The integrated sensor device 365 receives these RF signals 395 over the BLE-enabled communication links 305 and measures the RSSI along with other data included in the RF signal 395.

This RSSI information is the key piece of data in a RF signal 390 that allows a WAC 385 and/or network manager 380 to locate, in real time, the communication device 390 (and corresponding object 360) within a volume of space 399 (e.g., in X-Y coordinates, in X-Y-Z coordinates). The RSSI values can also be used by an example frequency optimizer (e.g., frequency optimizer 107) to determine which frequency should be used for RF signals 390 transmitted between an object 360 and an electrical device 302.

As used herein, "real time" refers to a user's perspective of the system and means that objects can be located within the time in which the signals are transmitted and processed, such as a few milliseconds to within a few seconds, which time is virtually real time from the user's perspective. Integrated sensor devices 365, when applicable, communicate with one or more controllers 385 (in this example, WACs 385) using Zigbee-enabled communication links 305. In this example, an integrated sensor device 365 is a Zigbee-enabled device as well as a BLE-enabled device, and so a sensor device 365 can be paired with a single WAC 385.

The WACs 385, upon receiving the signals from the sensor devices 365 on the Zigbee-enabled communication links 305, send the information in these signals to the network manager 380, which process all of this information (e.g., using one or more algorithms 133) to locate each object 360 within the volume of space 399 in real time. The network manager 380 can store this information and use it for trending analysis, predictive analysis, and/or any other analysis that may be useful.

BLE proximity methods are widely used in the industry to estimate the distance between a BLE transmitter (in this case, a communication device 390 of an object 360) and a BLE receiver (in this case, a sensor device 365). In a dense and uniformly distributed infrastructure of electrical devices 302 (e.g., a lighting system), these methods can be optimized to achieve greater accuracy by comparing the RSSI at many BLE receivers and performing various calculations (by a WAC 385 or network manager 380) to estimate the location of an object 360.

A number of significant challenges can be encountered using BLE communication systems. For example, the large number of electrical devices 302 (sensor devices 365 or nodes) creates large amounts of data, and the communication network of the system 300 has limited bandwidth. As another example, which is addressed by example embodiments, is that a slight change in frequency of RF signals 395 can result in significantly more consistent and accurate RSSI values, and so evaluating variations in frequency of RF values can result in more accurate location of objects 360 in the volume of space 399 in real time. Example embodiments can also suggest moving one or more objects 360 and/or electrical devices 302 within the volume of space 399 to more accurately and reliably locate the objects 360 in the volume of space 399 in real time.

FIG. 4B shows a lighting system 400 that can be used for real-time location of an object 460 in accordance with certain example embodiments. The lighting system 400 includes a number of electrical devices 402, principally in the form of light fixtures, located in a volume of space 499 that includes a hospital room. A lighting system provides unique advantages for implementing an example RTLS because the density of the electrical devices (light fixtures) supports a dense network of sensors for locating and tracking objects. Of the electrical devices 402 that are light fixtures, there are seven troffer light fixtures and five down can light fixtures disposed in the ceiling. There is also an electrical device 402 in the form of a computer monitor.

In this case, each electrical device 402 includes a sensor device 465, substantially similar to the sensor devices 165 discussed above. Each electrical device can include a controller (such as controller 104), including an example frequency optimizer (such as frequency optimizer 107). There are also two objects 460 shown in FIG. 4B. One object 460 is a test cart, and the other object 460 is a bed. Each object 460 in this case includes a communication device 490 that is capable of communicating with the sensor devices 465. FIG. 5B shows a lighting system 500 that can be used for real-time location of an object 560 in accordance with certain example embodiments. The lighting system 500 includes a number of electrical devices 502, principally in the form of light fixtures, located in a volume of space 599 that includes a manufacturing facility. Of the electrical devices 502 that are light fixtures, there are at least 56 Hi-Bay light fixtures suspended from the ceiling and at least 30 work stations located on the floor. In this case, each electrical device 502 includes a sensor device 565, substantially similar to the sensor devices 165 discussed above. Also, each electrical device can include a controller (such as controller 104), including an example frequency optimizer (such as frequency optimizer 107). There is also an object 560 shown in FIG. 5B that is in the form of a cart. The object 560 in this case includes a communication device 590 that is capable of communicating with the sensor devices 565.

FIG. 17A and FIG. 17B show a side and top view, respectively, of a system 600a in which an object 660 (including its corresponding communication device 690) is located in volume of space 699 in accordance with certain example embodiments. Located in the volume of space 699 of FIG. 17A and FIG. 17B are three light fixtures 602 (specifically, light fixture 602-1, light fixture 602-2, and light fixture 602-3), where the light fixtures 602 are types of electrical devices 102 of FIG. 14B above. As discussed above, the volume of space 699 can be of any size and/or in any location. For example, the volume of space 699 can be one or more rooms in an office building.

As shown in FIG. 17A and FIG. 17B, all of the light fixtures 602 can be located in the volume of space 699. Alternatively, one or more of the light fixtures 602 can be located outside the volume of space 699, as long as the RF signals (e.g., RF signals 195) sent by the transceiver (e.g., transceiver 124) of the light fixture 602 are received by the communication device 690 of the object 660, and as long as the RF signals sent by the communication device 690 of the object 660 are received by the transceiver of the corresponding light fixture 602, as applicable.

Each of the light fixtures 602 can include one or more sensor devices 665. In this example, light fixture 602-1 includes sensor device 665-1, light fixture 602-2 includes sensor device 665-2, and light fixture 602-3 includes sensor device 665-3. Such sensor devices 665 can include one or more components. For example, each of the sensor devices 665 of the light fixtures 602 of FIG. 17A and FIG. 17B can include a Zigbee-enabled transceiver, a BLE-enabled receiver, a PIR sensor, and an active IR receiver.

In such a case, the BLE-enabled receiver of the sensor device 665, whether on its own or in conjunction with the controller (e.g., controller 104) of the light fixture 602, can determine the signal strength of the RF signals (e.g., RF signals 195) received from the communication device 690 of the object 660. The controller of the light fixtures 602 can include a frequency optimizer (such as the frequency optimizer 107 discussed above).

If the sensor devices 665 of the light fixtures 602 are used to communicate with the communication device 690 of the object 660, then it is the sensor devices 665 that have the broadcasts ranges 682. In such a case, sensor device 665-1 of light fixture 602-1 has broadcast range 782-1 inside of which the sensor device 665-1 broadcasts signals (e.g., RF signals). Similarly, sensor device 665-2 of light fixture 602-2 has broadcast range 782-2 inside of which the sensor device 665-2 broadcasts signals, and sensor device 665-3 of light fixture 602-3 has broadcast range 782-3 inside of which the sensor device 665-3 broadcasts signals.

FIG. 18 shows the system 700a of FIG. 17A and FIG. 17B when a RF signal 795 is sent by one of the light fixtures 602 in accordance with certain example embodiments. Light fixture 602-1 broadcasts a RF signal 795. Each light fixture 602 has a broadcast range 782. In this case, light fixture 602-1 has broadcast range 782-1, light fixture 602-2 has broadcast range 782-2, and light fixture 602-3 has broadcast range 782-3. Since the communication device 690 of the object 660 is located within the broadcast range 782-1 for light fixture 602-1, the communication device 690 of the object 660 receives RF signal 795.

In the event that the sensor devices 665 are used to communicate with the communication device 690 of the object 660, sensor device 665-1 can have broadcast range 782-1. In such a case, sensor device 665-1 can send (e.g., broadcast) RF signal 795 into the volume of space 699, and the communication device 690 of the object 660 receives the RF signal 795 because the communication device 690 of the object 660 is within the broadcast range 782-1. The RF signal 795 can be sent, as an example, using BLE.

FIG. 19 shows the system 800a of FIG. 17A and FIG. 17B when a RF signal 895 is sent by the communication device 690 of the object 660 in accordance with certain example embodiments. The RF signal 895 sent by the communication device 690 of the object 660 can be in response to the RF signal 795 sent by light fixture 602-1, as shown in FIG. 18. Alternatively, the communication device 690 of the object 660 can send the RF signal 895 independent of any other component (e.g., a light fixture 602) or factor. As discussed above, the RF signal 895 broadcast by the communication device 690 of the object 660 can include the UUID of the object 660 (or portion thereof) as well as other code, such as, for example, identifying information of the light fixture 602-1 that sent the RF signal 795.

The communication device 690 of the object 660 has a broadcast range 882, and all three of the light fixtures 602 (including the sensor device 665 thereof) are located within the broadcast range 882 of the communication device 690 of the object 660. As a result, as shown in FIG. 19, all three of the light fixtures 602 receive the RF signal 895 broadcast by the communication device 690 of the object 660. When each light fixture 602 receives the RF signal 895 broadcast by the communication device 690 of the object 660, that light fixture 602 measures the signal strength (e.g., the RSSI value) of the RF signal 895. In this case, the RF signal 895 broadcast by the communication device 690 can be at 2400 MHz using BLE.

For example, since the communication device 690 of the object 660 appears to be equidistant between light fixture 602-1 and light fixture 602-2, the signal strength of the RF signal 895 measured by light fixture 602-1 (or the sensor device 665-1 thereof) and light fixture 602-2 (or the sensor device 665-2 thereof) should be substantially the same. Also, since light fixture 602-3 is further away from the communication device 690 of the object 660 compared to light fixture 602-1 and light fixture 602-2, the signal strength of the RF signal 895 measured by light fixture 602-3 (or the sensor device 665-3 thereof) should be less than what is measured by light fixture 602-1 and light fixture 602-2.

However, in reality, the RSSI value of the RF signal 895 received by the light fixtures 602 and/or the sensor devices 665 may not be accurate. For example, the RSSI value measured at light fixture 602-1 can be −50 dBm, while the RSSI value measured at light fixture 602-2 can be −54 dBm, even though, as explained above, these RSSI values should be the same. Such variances can be attributable to one or more of a number of factors, including but not limited to location of other objects (e.g., walls, ceiling, floor) in the volume of space 399, material of and/or disposed on those objects, the material and positioning of the housing of the light fixture 602 and/or sensor device 665, and the overlap of other wireless protocols (e.g., Zigbee) using the same or substantially similar frequencies (also sometimes called channels herein). In this latter case, for example, BLE channels 38 and 39 often overlap with ZigBee channels 15 and 26, respectively.

Figure 20C:
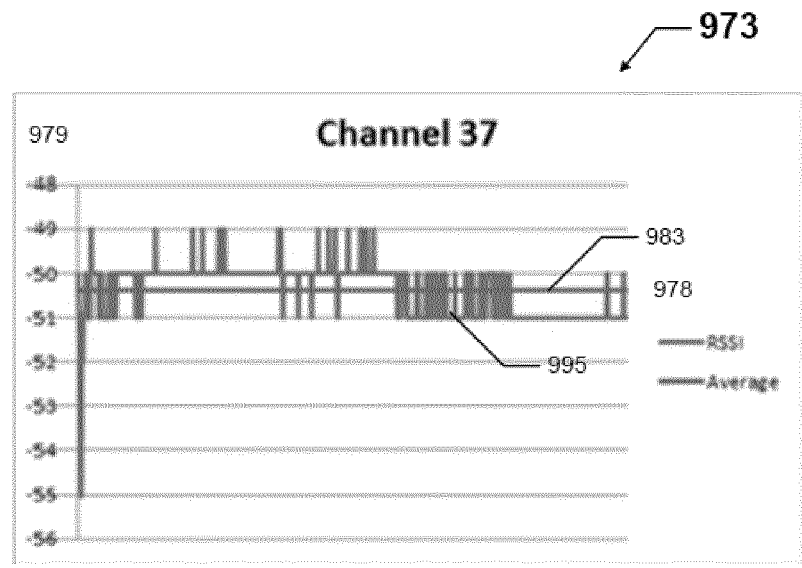
FIGS. 20C through 20F show charts of RSSI values of RF signals over time.
Figure 20D:
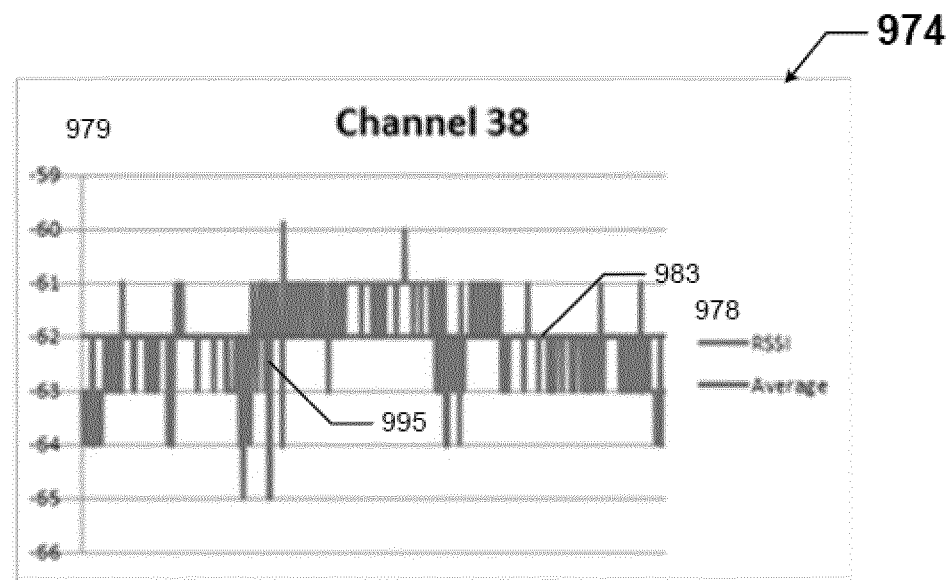
Figure 20E:
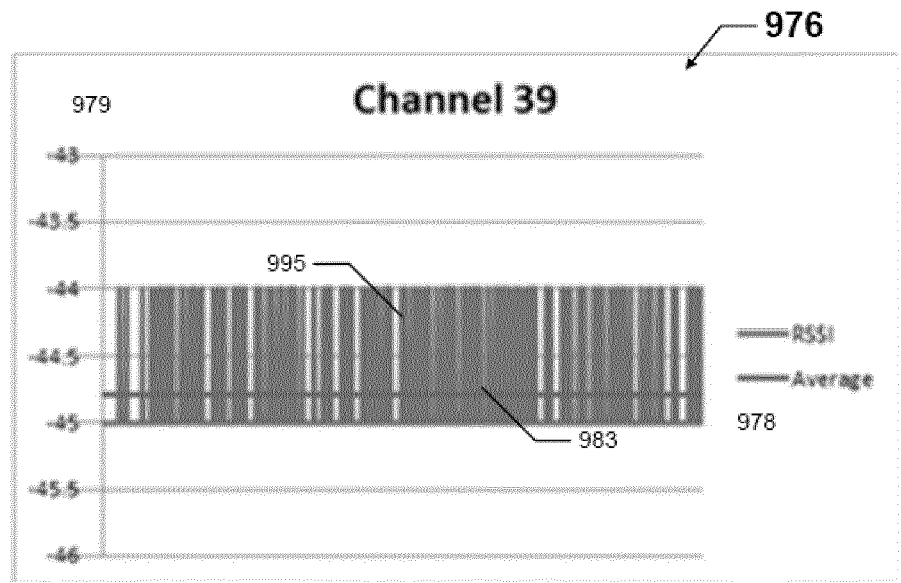
Figure 20F:
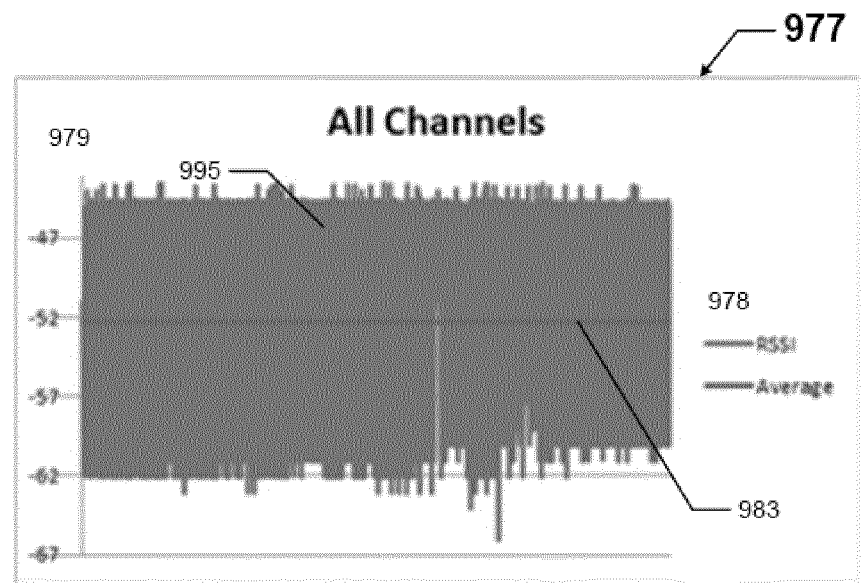

FIG. 20C to FIG. 20F are graphs that show how the RSSI values 979 of RF signals 995 for an object that is stationary can change drastically over time for RF signals transmitted using various frequencies (channels). Specifically, FIG. 20C shows a graph 973 of signals transmitted over time 978 on channel 37 (2402 MHz). FIG. 20D shows a graph 974 of signals transmitted over time 978 on channel 38 (2426 MHz). FIG. 20E shows a graph 976 of signals transmitted over time 978 on channel 39 (2480 MHz). FIG. 20F shows a graph 977 of all signals transmitted over time 978 on all channels.

For all of these cases shown in FIG. 20C to FIG. 20F, the same stationary transmitter and the same stationary receiver were used. The graphs of FIG. 20C to FIG. 20F are only examples that can vary based on one or more of a number of factors, including but not limited to location of other objects (e.g., walls, ceiling, floor) in the volume of space relative to the transmitter (e.g., an object 160) and the receiver (e.g., an electrical device 102) over time, material of and/or disposed on those objects, the material and positioning of the housing of the transmitter and/or the receiver, and the overlap of other wireless protocols (e.g., Zigbee) using the same or substantially similar frequencies (also sometimes called channels herein).

The graph 973 of FIG. 20C shows that the average RSSI value 983 of the RF signals 995 transmitted on channel 37 using BLE is approximately −50.3 dBm, while the range of the RSSI values 979 of the RF signals 995 measured over the time 978 was between approximately −49 dBm and approximately −51 dBm (with one outlier at approximately −55 dBm). The graph 974 of FIG. 20D shows that the average RSSI value 983 of the RF signals 995 transmitted on channel 38 using BLE is approximately −62 dBm, while the range of the RSSI values 979 of the RF signals 995 measured over the time 978 was between approximately −59.9 dBm and approximately −65 dBm.

The graph 976 of FIG. 20E shows that the average RSSI value 983 of the RF signals 995 transmitted on channel 39 using BLE is approximately −44.8 dBm, while the range of the RSSI values 979 of the RF signals 995 measured over the time 978 was between approximately −44 dBm and approximately −45 dBm. The graph 977 of FIG. 20F shows that the average RSSI value 983 of the RF signals 995 transmitted on channel 39 using BLE is approximately −53 dBm, while the range of the RSSI values 979 of the RF signals 995 measured over the time 978 was between approximately −43 dBm and approximately −66 dBm.

Example embodiments can be used to find the optimal frequency (channel) for sending RF signals 995 between a given receiver and transmitter so that the RSSI value (or other parameter or characteristic of the RF signal 995 being transmitted) is relatively consistent and accurate over time 978. FIG. 21B shows an example of how example embodiments can be used to optimize the frequency of the RF signals 1095 being transmitted. Specifically, FIG. 21B shows the system of FIG. 17A through FIG. 19 where the frequency of the RF signals 1095 sent by the object 1060 are optimized in accordance with certain example embodiments.

As an example, a frequency optimizer (such as frequency optimizer 107 of FIG. 14B above) in each of the light fixtures 1060 can cause a number of RF signals (e.g., RF signal 895, RF signal 1095-1) to be transmitted between the communication device 690 of the object 660 and each of the light fixtures (in this case, light fixture 602-1, light fixture 602-2, and light fixture 602-3). Each sensor device 665 (in this case, sensor device 665-1, sensor device 665-2, and sensor device 665-3) can be involved in this process. Any of a number of established channels (e.g., 2402 MHz, 2426 MHz, 2480 MHz) can be tested, as can any of a number of non-established channels.

In this case, the ultimate determination of example embodiments is that RF signal 1095-1 is sent by the communication device 690 of the object 660 to light fixture 602-1 using a first channel (e.g., 2480 MHz), that RF signal 1095-2 is sent by the communication device 690 of the object 660 to light fixture 602-2 using a second channel (e.g., 2402 MHz), and that RF signal 1095-3 is sent by the communication device 690 of the object 660 to light fixture 602-3 using a third channel (e.g., 2345 MHz). The associated controllers can periodically test these frequencies (channels) to determine if one or more changes should be made to provide better accuracy of RSSI values for the RF signals 1095 that are transmitted.

Figure 22B:
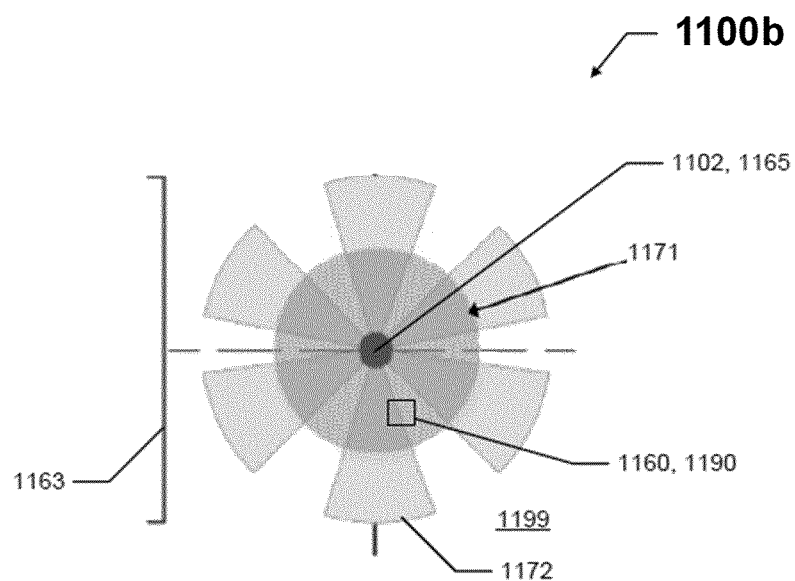
FIGS. 22B and 22C show a top view and a side view, respectively, of a system used for locating an object in a volume of space.
Figure 22C:
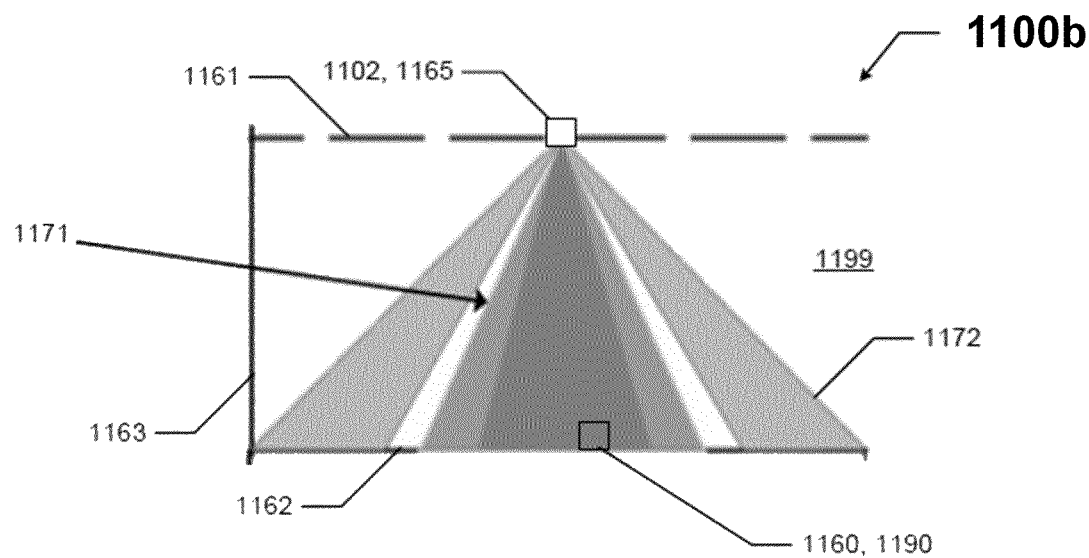

FIG. 22B and FIG. 22C show some alternative sensor devices that can be used in example embodiments. Specifically, FIG. 22B and FIG. 22C show a top view and a side view, respectively, of part of a system 1100 used for locating an object in a volume of space 1199 in accordance with certain example embodiments. The part of the system 1100*b* of FIG. 22B and FIG. 22C has a single electrical device 1102 (e.g., a light fixture mounted on a ceiling 1161) and a single object 1160 in a volume of space 1199. The electrical device 1102 is part of a larger integrated network of electrical devices, such as what is shown and described above. In this case, the electrical device 1102 includes an integrated sensor device 1165 that has (or shares with the controller of the electrical device 1102) a Zigbee-enabled transceiver, a BLE-enabled receiver, and an active IR receiver. The sensor device 1165 can also include a PIR sensor. In alternative embodiments, the sensor device 1165 can be a stand-alone device.

The method used to locate the object 1160 in this case reduces communications traffic on the communication links (e.g., communication links 105) between the integrated sensor device 1165 and a WAC (not shown in FIG. 22B and FIG. 22C, but substantially similar to the WAC 185 discussed above). The PIR sensor of the integrated sensor device 1165 (or any other sensor included with the sensor device 1165) can have any of a number of configurations. For example, in this case, the PIR sensor of the sensor device 1165 has a sensing range 1172, which is somewhat similar to the broadcast ranges (e.g., broadcast ranges 682) discussed above in that the sensing range 1172 defines the scope within the volume of space 1199 in which the PIR sensor can measure passive infrared signals.

In some cases, the integrated sensor device 1165 can be configured to determine whether or not the object 1160 is within a certain proximity to the sensor device 1165. In such a case, the sensor device 1165 needs only to send a status message to the WAC indicating the object 1160 is in fact very close to that sensor device 1165. This proximity area is called the RTLS occupancy zone 1171. The RTLS occupancy zone 1171 is located within the sensing range 1172 of the PIR sensor of the sensor device 1165. Unlike the sensing range 1172 of the PIR sensor, the RTLS occupancy zone 1171 is designed to be smaller and only minimally overlap with a corresponding RTLS occupancy zone of a PIR sensor of a neighboring sensor (not shown in FIG. 22B and FIG. 22C). The RTLS occupancy zone 1171 can be updated at a relatively fast rate and generally detects very recent motion within a constrained physical area very close in proximity to the PIR sensor of the sensor device 1165. Even with a sensor device 1165 of this configuration, channel fading of the RF signals transmitted between the sensor device 1165 and another component (e.g., a WAC 185) of a system can lead to an inaccurate RSSI value, which in turn can lead to failing to accurately locate the object 1160 in the volume of space 1199.

Figure 23B:
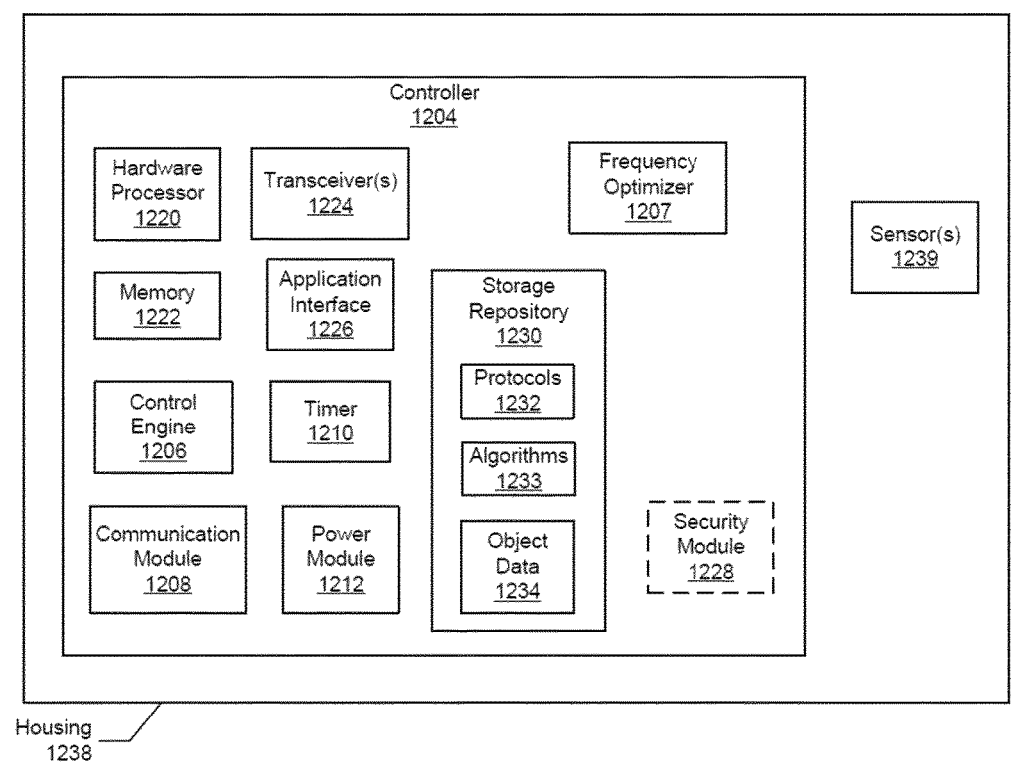
FIG. 23B shows another example diagram of an integrated sensor module.

FIG. 23B shows a diagram of an integrated sensor module 1265 in accordance with certain example embodiments. The integrated sensor module 1265 of FIG. 23B can include one or more of a number of components. Such components, can include, but are not limited to, a controller 1204 (which can include, for example, a control engine 1206, a frequency optimizer 1207, a communication module 1208, a timer 1210, a power module 1212, a storage repository 1230, a hardware processor 1220, a memory 1222, one or more transceivers 1224, an application interface 1226, and, optionally, a security module 1228) and one or more sensors 1239. The components shown in FIG. 23B are not exhaustive, and in some embodiments, one or more of the components shown in FIG. 23B may not be included in an example integrated sensor device 1265. Any component of the example integrated sensor device 1265 can be discrete, combined with one or more other components of the integrated sensor device 1265, and/or shared with the controller 104 of the electrical device 102-1 associated with the integrated sensor device 1265.

The controller 1204, the control engine 1206, the frequency optimizer 1207, the communication module 1208, the timer 1210, the power module 1212, the storage repository 1230 (which can include protocols 1231, algorithms 1232, and object data 1234), the hardware processor 1220, the memory 1222, the one or more transceivers 1224, the application interface 1226, and the security module 1228 can be substantially the same as the corresponding components of the controller 104 discussed above with respect to FIG. 14B. In the case of the power module 1212 of the integrated sensor device 1265, the power module 1212 can be substantially the same as, at least in part, the power module 112 and/or the power supply 140 of the electrical device 102-1. Each of the one or more sensors 1239 of the integrated sensor device 1265 are the components that actually measure one or more parameters. An example of a sensor 1239 is a PIR sensor. Each component of the integrated sensor device 1265 can be disposed within, on, or external from a housing 1238 of the integrated sensor device 1265.

In accordance with this third aspect, the following embodiments are disclosed:

Embodiment 1: A system for improving accuracy in locating an object in a volume of space, comprising:
a communication device of the object disposed in the volume of space, wherein the communication device comprises a transmitter that sends a plurality of first communication signals into the volume of space;
a receiver that receives the plurality of first communication signals;
a frequency optimizer coupled to the receiver, wherein the frequency optimizer:
establishes a plurality of frequencies at which the plurality of first communication signals are sent by the communication device;
evaluates a signal strength for each of the plurality of first communication signals;
selects, based on evaluating the signal strength, a first frequency of the plurality of frequencies; and
instructs the communication device to send subsequent communication signals using the first frequency.

Embodiment 2: The system of Embodiment 1, where in the receiver and the frequency optimizer are part of a controller.

Embodiment 3: The system of Embodiment 2, wherein the controller is integrated with an electrical device.

Embodiment 4: The system of Embodiment 3, wherein the electrical device comprises a light fixture.

Embodiment 5: The system of Embodiment 3, wherein the electrical device comprises a sensor device.

Embodiment 6: The system of Embodiment 1, wherein the plurality of first communication signals is a radio frequency signal.

Embodiment 7: The system of Embodiment 1, wherein the plurality of first communication signals comprises a first identification of the object.

Embodiment 8: The system of Embodiment 1, wherein the frequency optimizer evaluates the signal strength using historical data of a plurality of second communication signals sent by the communication device.

Embodiment 9: The system of Embodiment 1, wherein the plurality of first communication signals is transmitted using Bluetooth Low Energy.

The invention claimed is:

1. A method of operating a lighting and location system, comprising:
receiving, by a sensor, beacon signals from an asset tag during a time window;
determining, by a processor, signal strengths of the beacon signals received during the time window;

after the time window, identifying only a representative beacon signal from among the beacon signals received from the asset tag, during the time window based on a comparison of the signal strengths of the beacon signals in which a signal strength of the representative beacon signal is higher than remaining signal strengths of remaining beacon signals of the beacon signals during the time window; and transmitting, by a transmitter, identification (ID) information of the only representative beacon signal and signal strength information of the representative beacon signal such that the ID information is validated against a list of valid ID information upon reception of the transmitted ID information.

2. The method of claim 1, wherein the beacon signals are Bluetooth Low Energy (BLE) beacon signals and wherein the ID information and the signal strength information are transmitted using a ZigBee compliant signal.

3. A method of operating a lighting and location system, comprising:

receiving, by a sensor, beacon signals from asset tags during a time window;

processing, by a processor, the beacon signals by filtering out one or more of the beacon signals based on signal strengths, the one or more of the beacon signals that are filtered out each having a signal strength that is less than a threshold signal strength with respect to remaining beacon signals from the beacon signals;

after the time window, identifying, by the processor, only representative beacon signals from among the remaining beacon signals, wherein each representative beacon signal is associated with a respective asset tag of the asset tags, during the time window;

identifying, by the processor, one or more representative beacon signals from among the representative beacon signals; and transmitting identification (ID) information and signal strength information of the only one or more representative beacon signals such that the ID information is validated against a list of valid ID information upon reception of the transmitted ID information.

* * * * *